(12) United States Patent
Paul et al.

(10) Patent No.: US 11,995,615 B2
(45) Date of Patent: May 28, 2024

(54) USER INTERFACES FOR INDICATING TIME AND/OR DATE ON AN ELECTRONIC DEVICE

(71) Applicant: Apple Inc., Cupertino, CA (US)

(72) Inventors: Grant R. Paul, San Francisco, CA (US); Cas G. Lemmens, San Francisco, CA (US); Christian X. Dalonzo, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 63 days.

(21) Appl. No.: 17/352,145

(22) Filed: Jun. 18, 2021

(65) Prior Publication Data

US 2021/0398085 A1    Dec. 23, 2021

Related U.S. Application Data

(60) Provisional application No. 63/041,977, filed on Jun. 21, 2020.

(51) Int. Cl.
| | |
|---|---|
| *G06Q 10/1093* | (2023.01) |
| *G06F 3/01* | (2006.01) |
| *G06F 3/0482* | (2013.01) |
| *G06F 3/0484* | (2022.01) |
| *G06F 3/04847* | (2022.01) |
| *G06F 3/0485* | (2022.01) |
| *G06F 3/04886* | (2022.01) |

(52) U.S. Cl.
CPC ......... *G06Q 10/1093* (2013.01); *G06F 3/016* (2013.01); *G06F 3/0482* (2013.01); *G06F 3/0484* (2013.01); *G06F 3/04847* (2013.01); *G06F 3/0485* (2013.01); *G06F 3/04886* (2013.01)

(58) Field of Classification Search
CPC .................. G06Q 10/1093; G06F 3/0485
See application file for complete search history.

(56) References Cited

U.S. PATENT DOCUMENTS

| | | |
|---|---|---|
| 6,323,846 B1 | 11/2001 | Westerman et al. |
| 6,570,557 B1 | 5/2003 | Westerman et al. |
| 6,677,932 B1 | 1/2004 | Westerman |

(Continued)

FOREIGN PATENT DOCUMENTS

| | | |
|---|---|---|
| WO | 2013169849 A2 | 11/2013 |
| WO | 2014105276 A1 | 7/2014 |

*Primary Examiner* — Cesar B Paula
*Assistant Examiner* — Sajeda Muhebbullah
(74) *Attorney, Agent, or Firm* — Kubota & Basol LLP

(57) ABSTRACT

In some embodiments, an electronic device displays an editable time input element, including a first field and a second field. In some embodiments, the electronic device receives a selection input directed to the editable time input element. In some embodiments, after receiving the selection input, the electronic device receives one or more editing inputs. In some embodiments, in response to receiving the first set of one or more editing inputs, in accordance with a determination that the selection input was a first type of input, the electronic device edits content of the first field based on the one or more editing inputs and in accordance with a determination that the selection input was a second type of input, different from the first type, the electronic device edits content of the first field and the second field based on the one or more editing inputs.

60 Claims, 53 Drawing Sheets

(56) References Cited

U.S. PATENT DOCUMENTS

| | | |
|---|---|---|
| 7,614,008 B2 | 11/2009 | Ording |
| 7,633,076 B2 | 12/2009 | Huppi et al. |
| 7,653,883 B2 | 1/2010 | Hotelling et al. |
| 7,657,849 B2 | 2/2010 | Chaudhri et al. |
| 7,663,607 B2 | 2/2010 | Hotelling et al. |
| 7,671,840 B2 | 3/2010 | Migos et al. |
| 7,844,914 B2 | 11/2010 | Andre et al. |
| 7,957,762 B2 | 6/2011 | Herz et al. |
| 8,006,002 B2 | 8/2011 | Kalayjian et al. |
| 8,239,784 B2 | 8/2012 | Hotelling et al. |
| 8,279,180 B2 | 10/2012 | Hotelling et al. |
| 8,381,135 B2 | 2/2013 | Hotelling et al. |
| 8,479,122 B2 | 7/2013 | Hotelling et al. |
| 9,348,458 B2 | 5/2016 | Hotelling et al. |
| 9,720,583 B2 * | 8/2017 | Rampson .............. G06F 3/0488 |
| 9,933,937 B2 | 4/2018 | Lemay et al. |
| 2002/0015024 A1 | 2/2002 | Westerman et al. |
| 2005/0190059 A1 | 9/2005 | Wehrenberg |
| 2006/0017692 A1 | 1/2006 | Wehrenberg et al. |
| 2006/0033724 A1 | 2/2006 | Chaudhri et al. |
| 2006/0197753 A1 | 9/2006 | Hotelling |
| 2008/0252597 A1 * | 10/2008 | Heynen ................. G06F 3/0362 |
| | | 345/157 |
| 2011/0080351 A1 * | 4/2011 | Wikkerink .......... G06F 3/04847 |
| | | 715/764 |
| 2021/0109642 A1 * | 4/2021 | Li ...................... G01N 29/0609 |

* cited by examiner

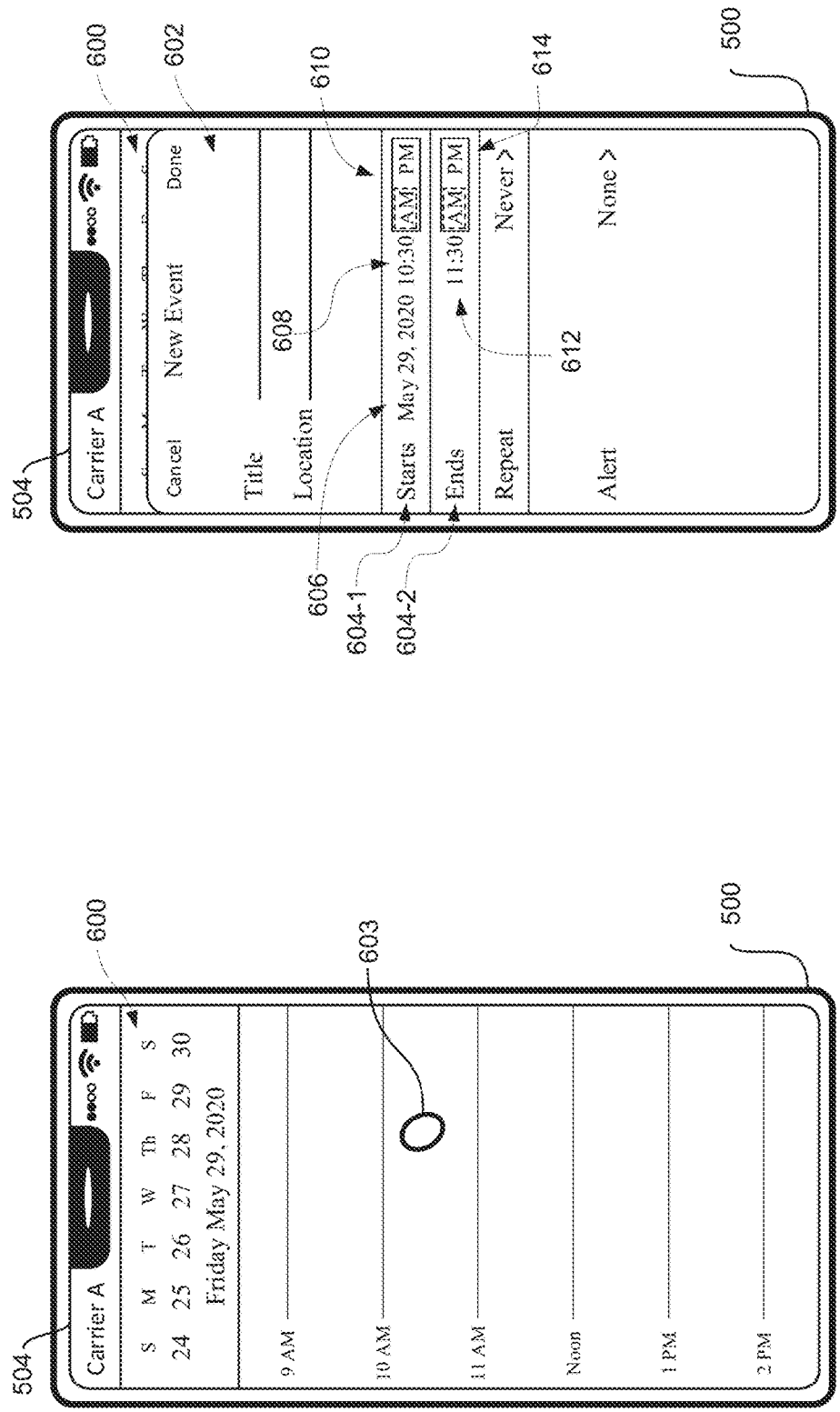

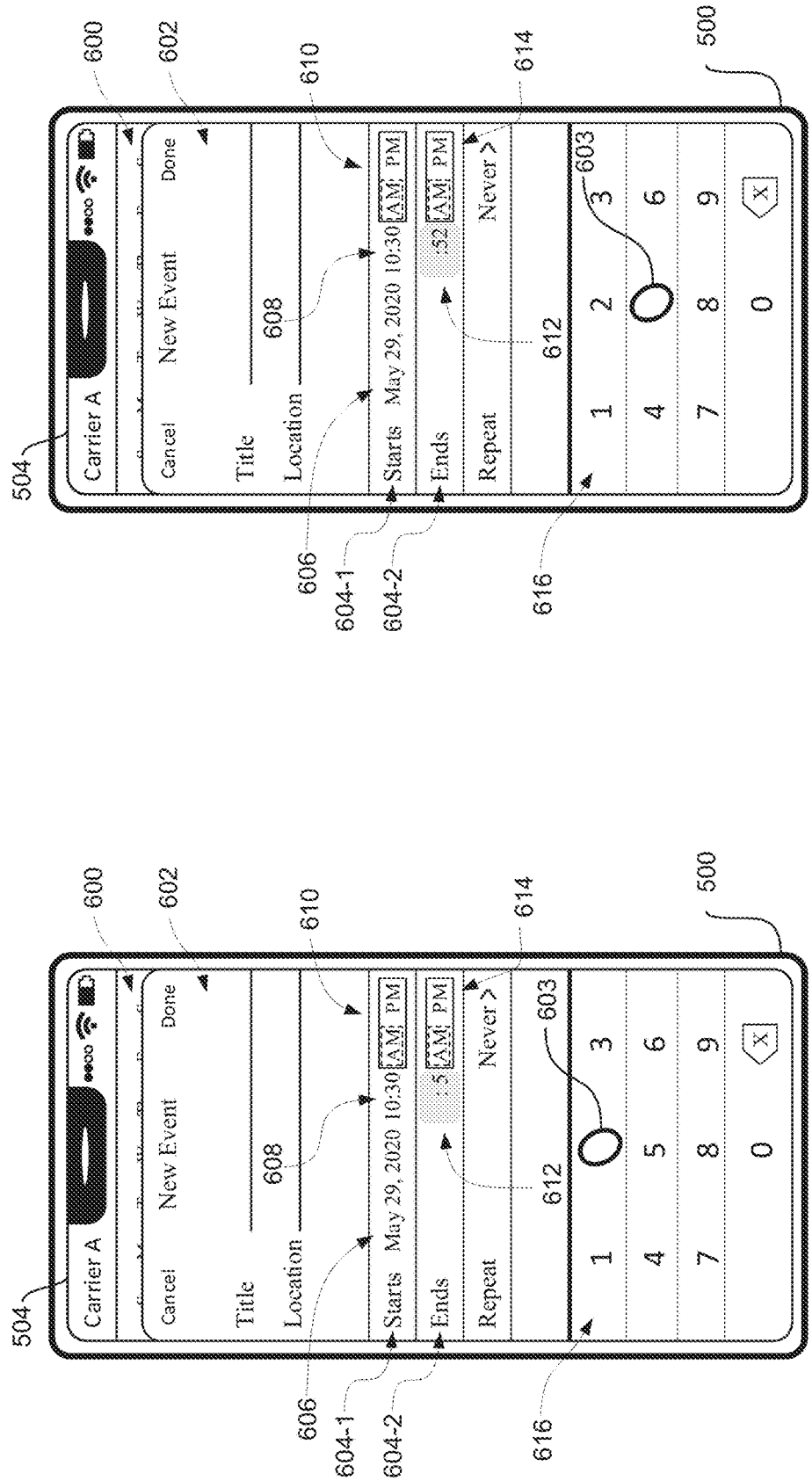

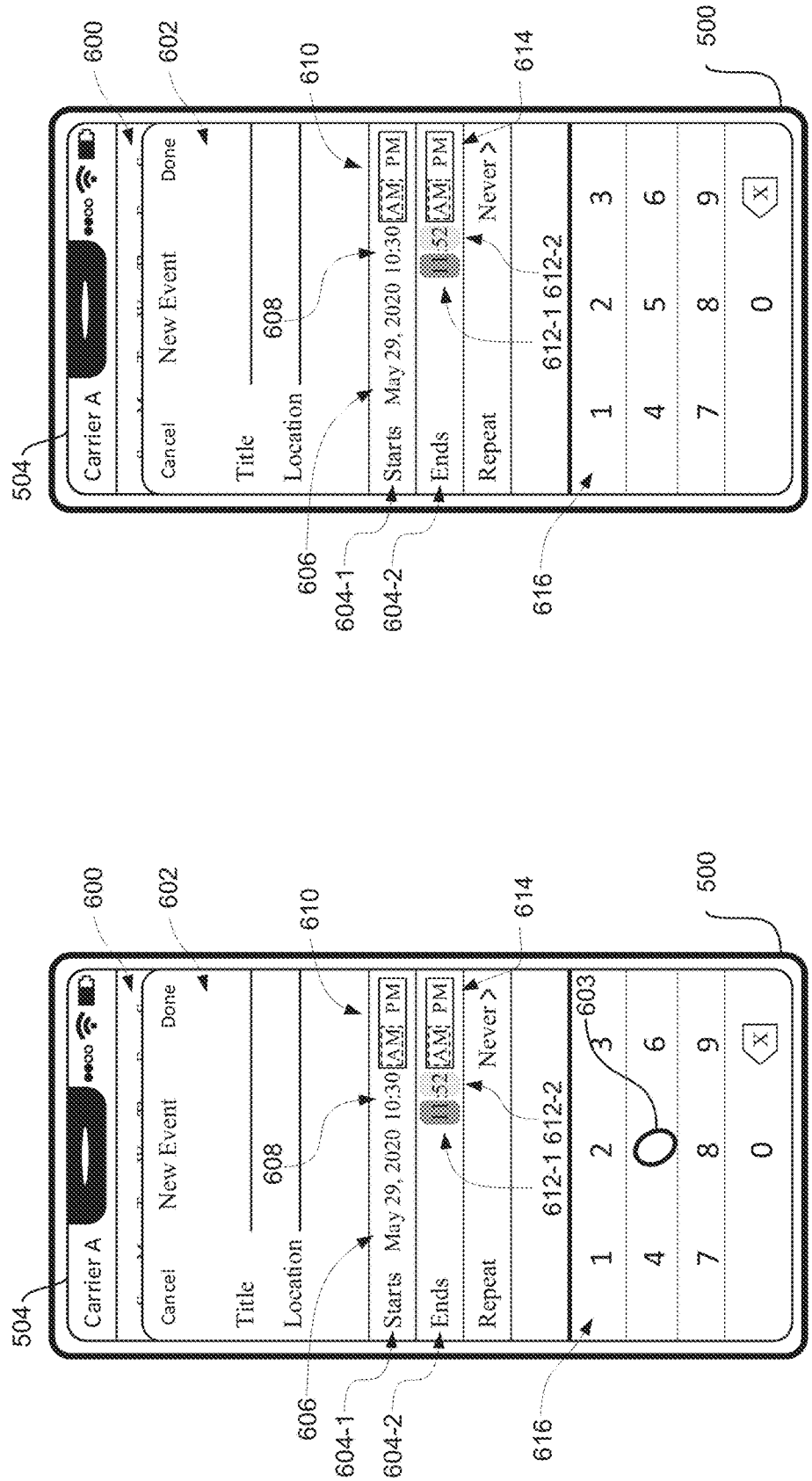

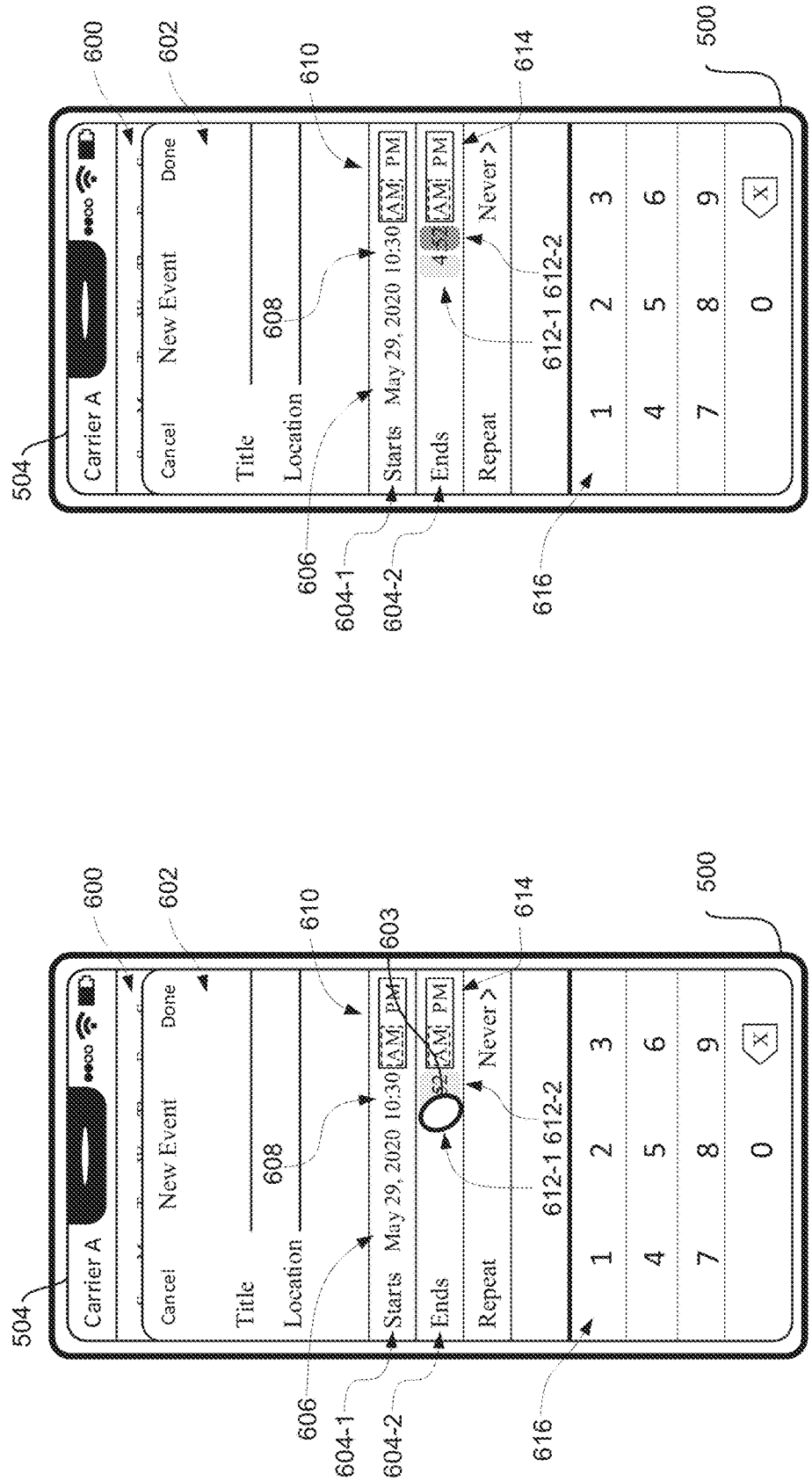

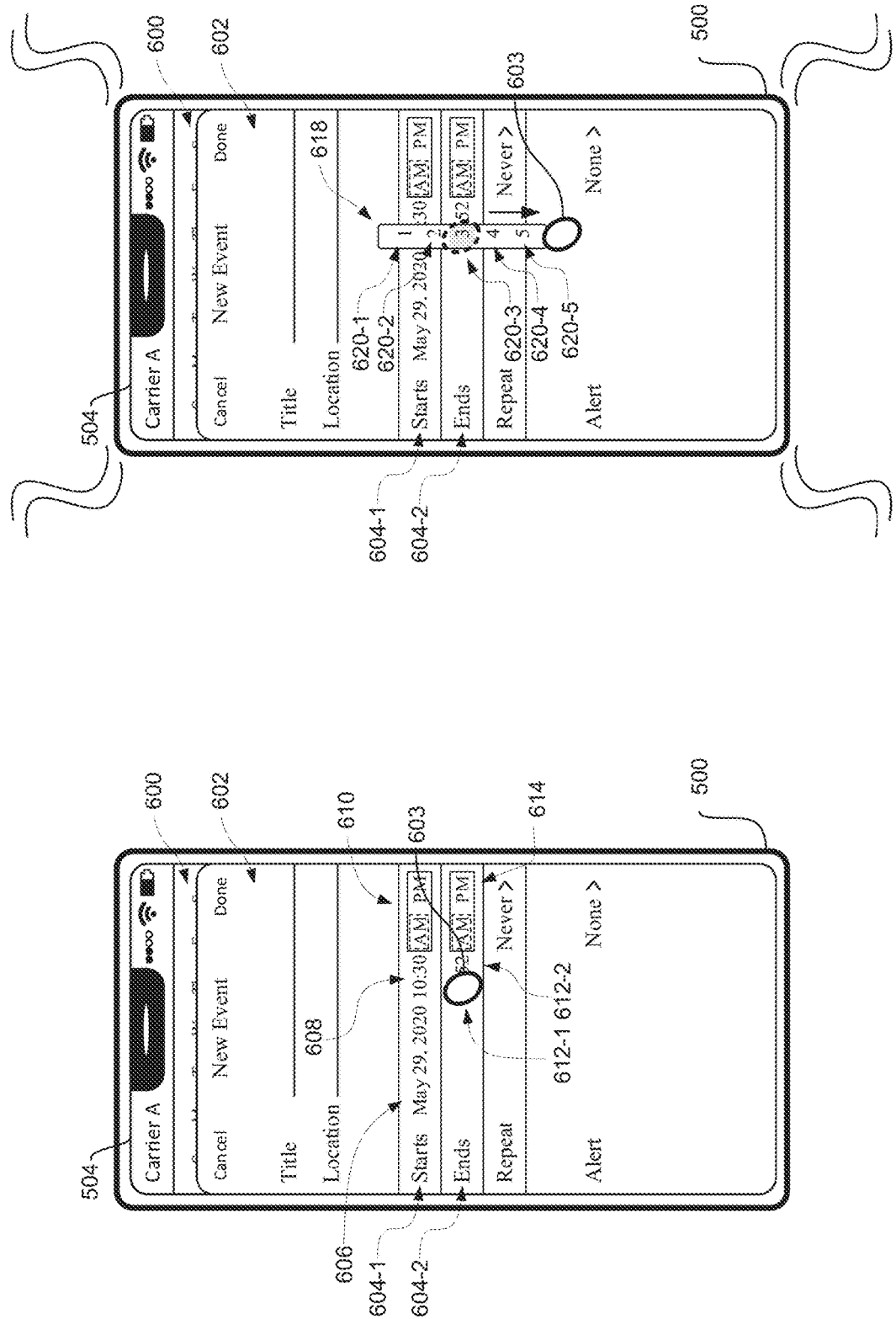

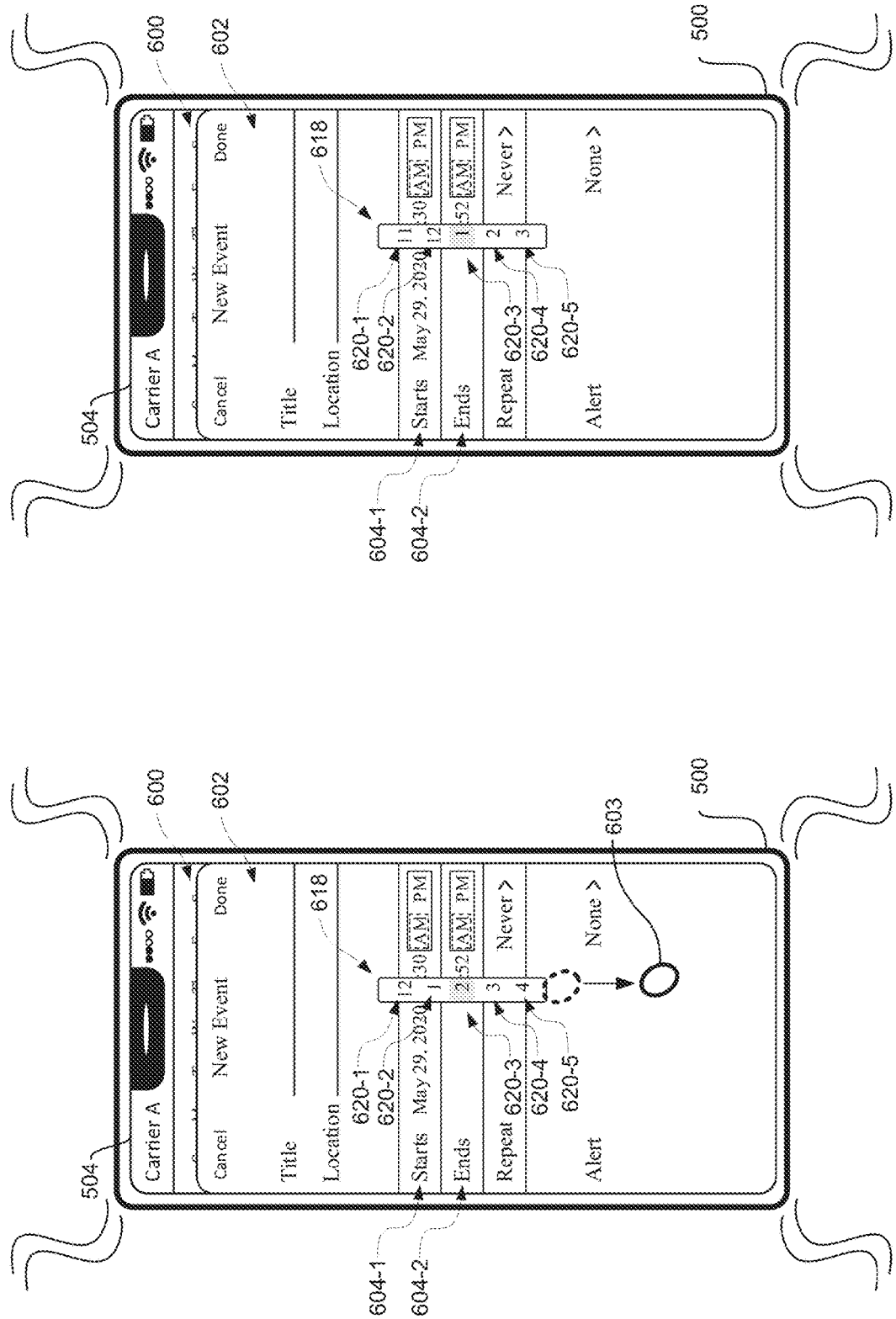

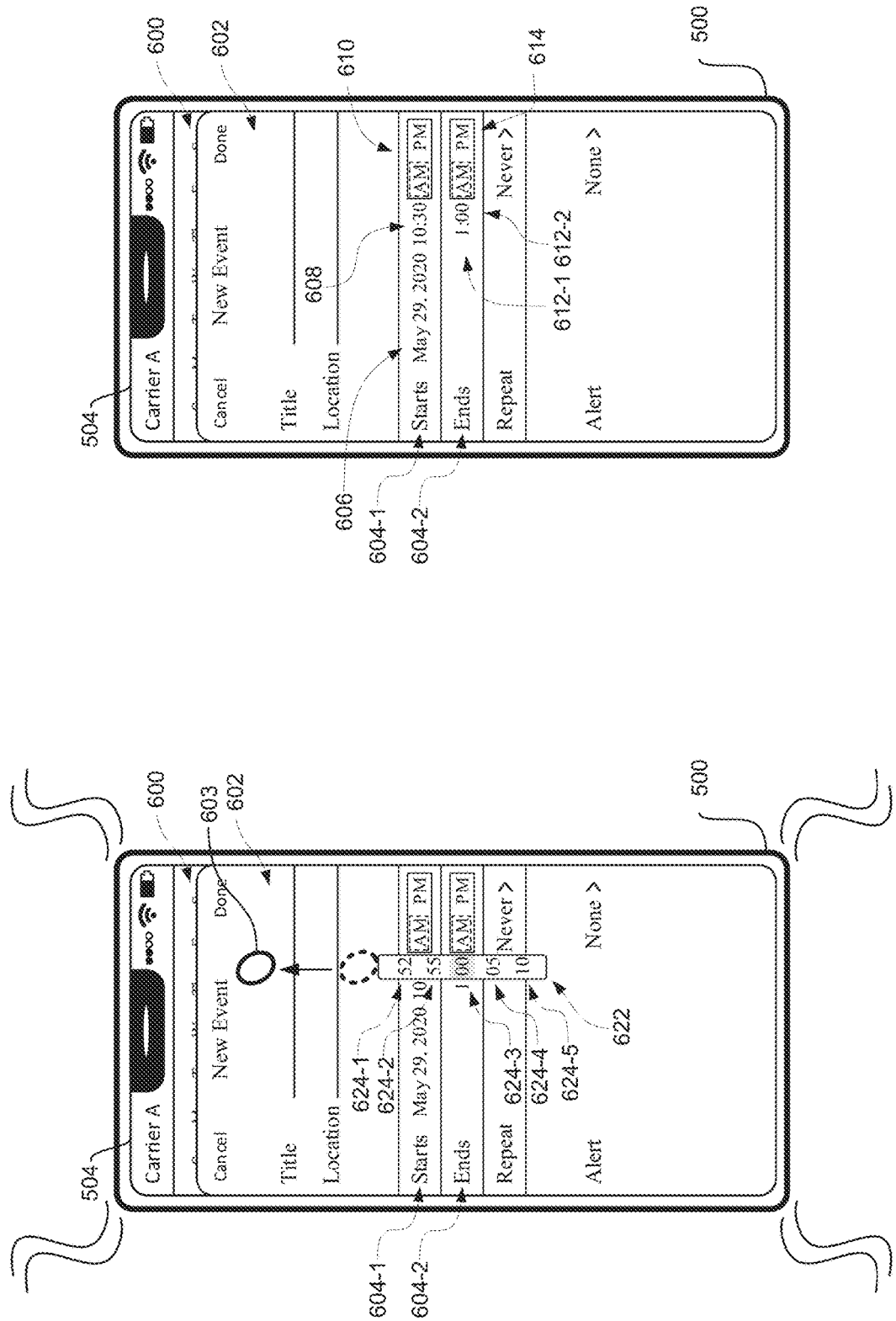

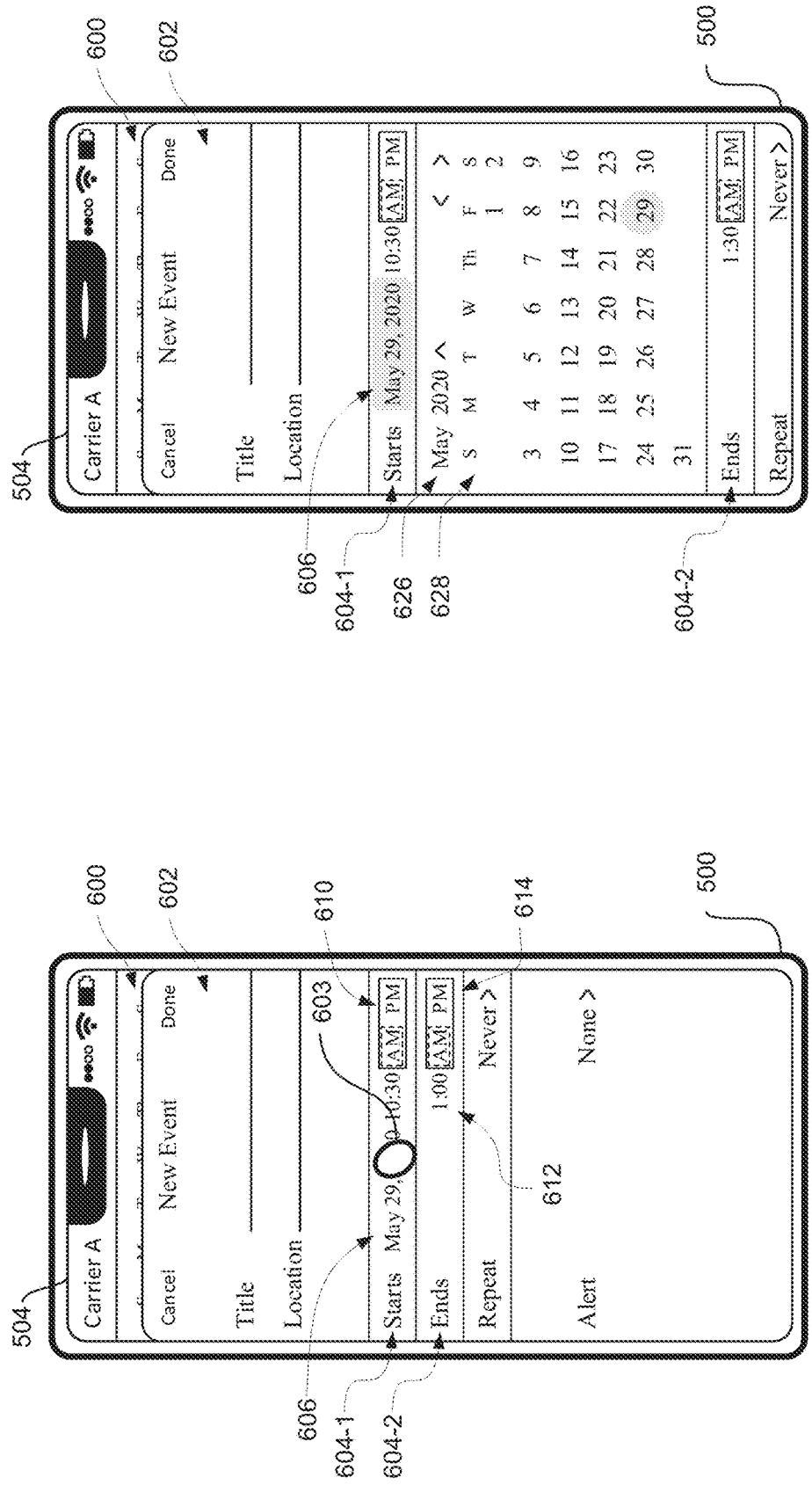

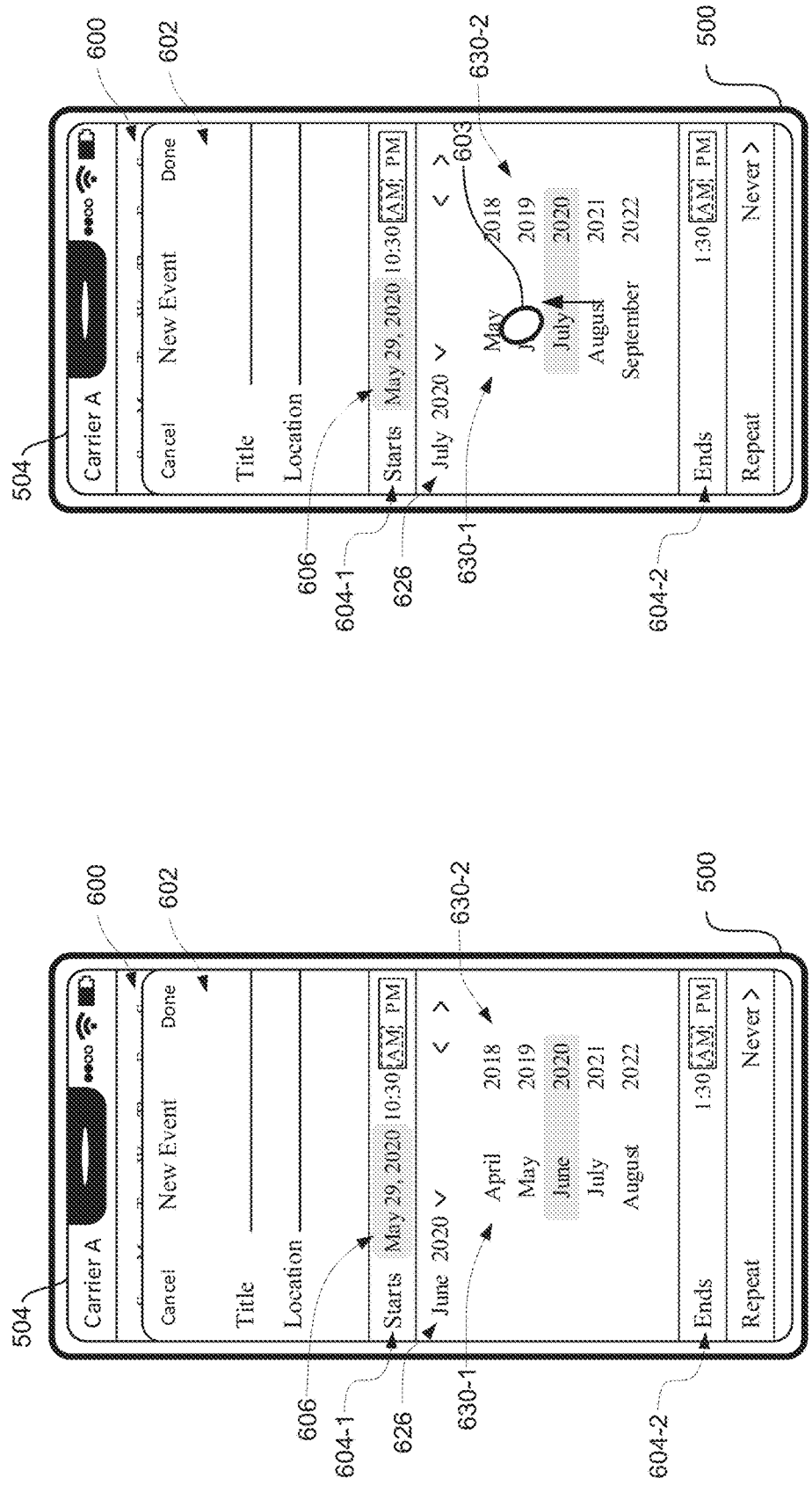

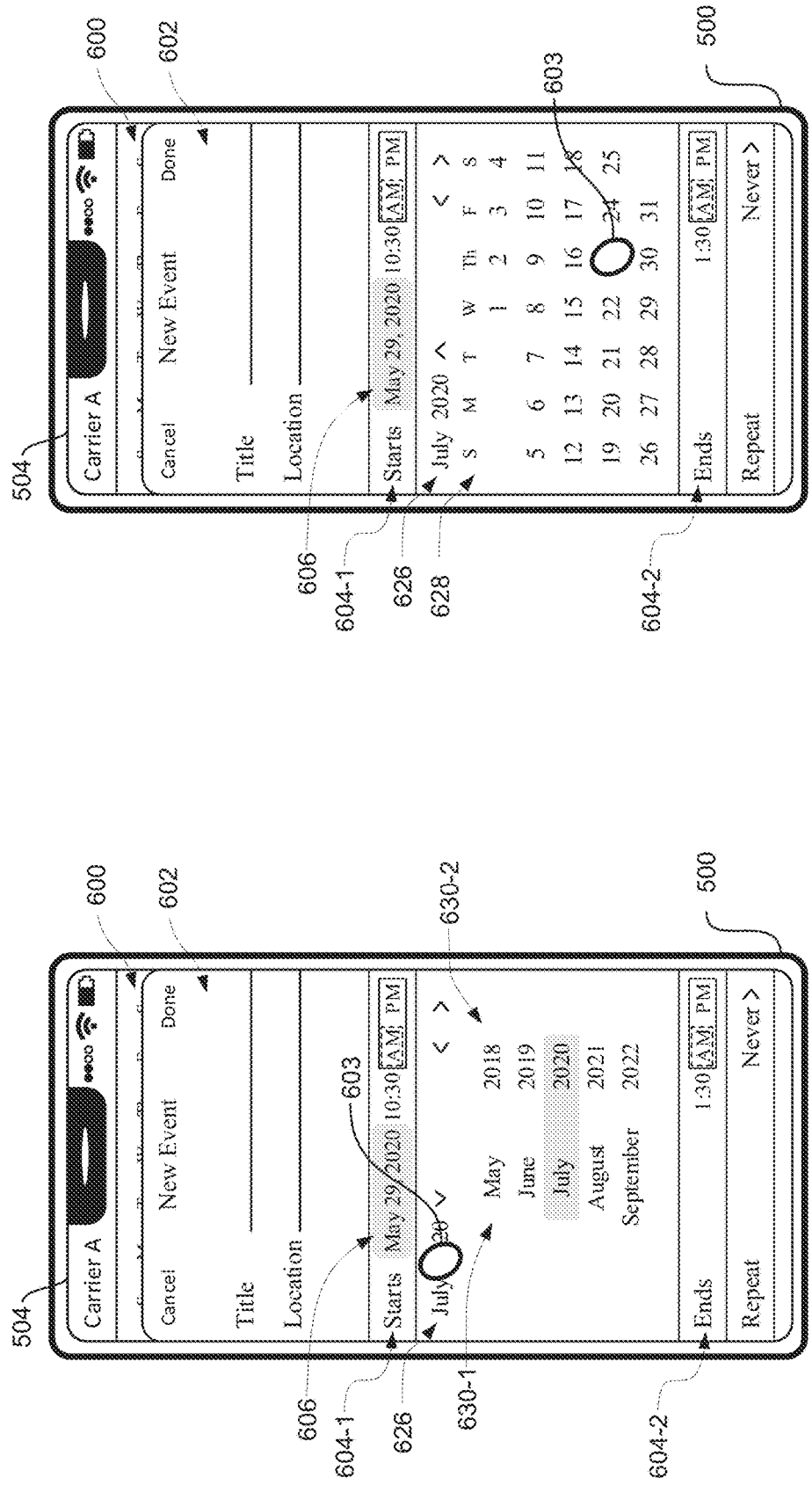

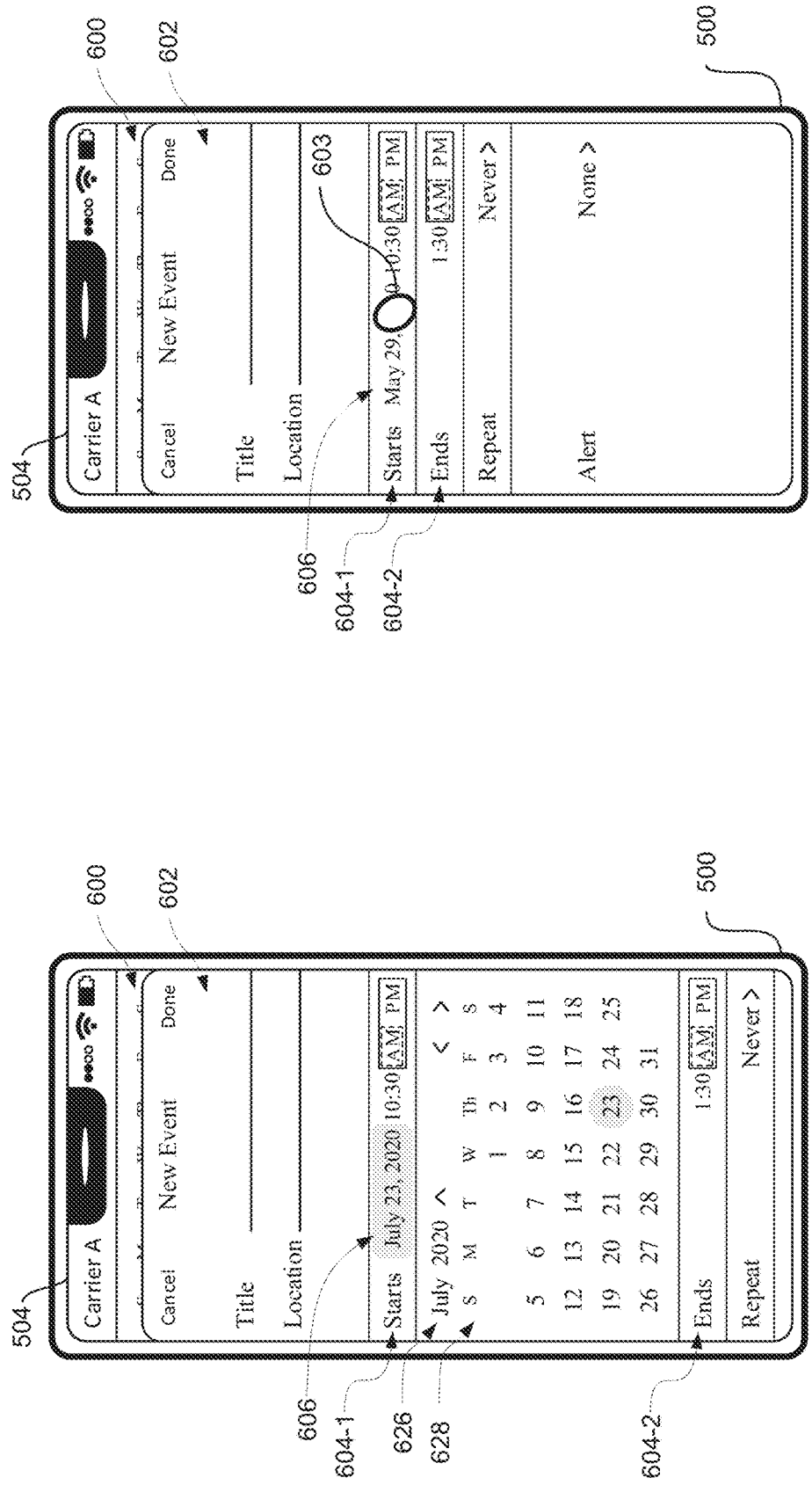

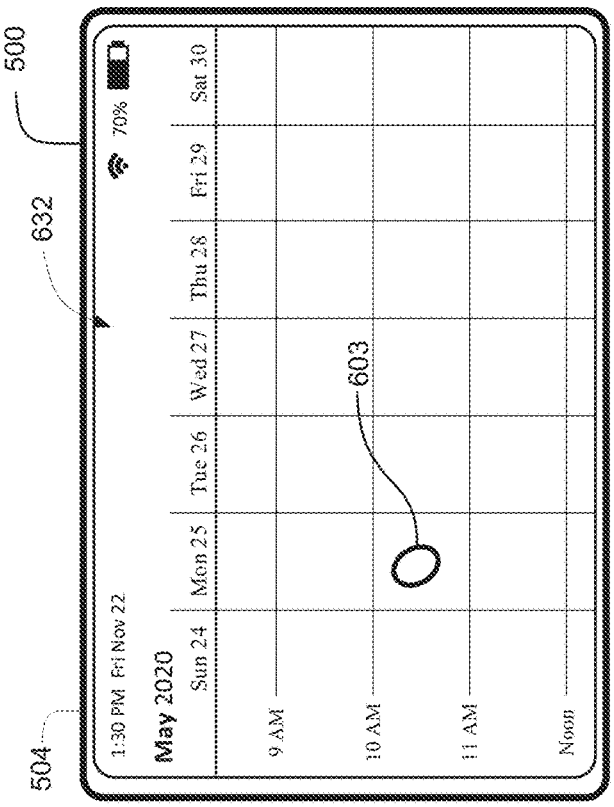
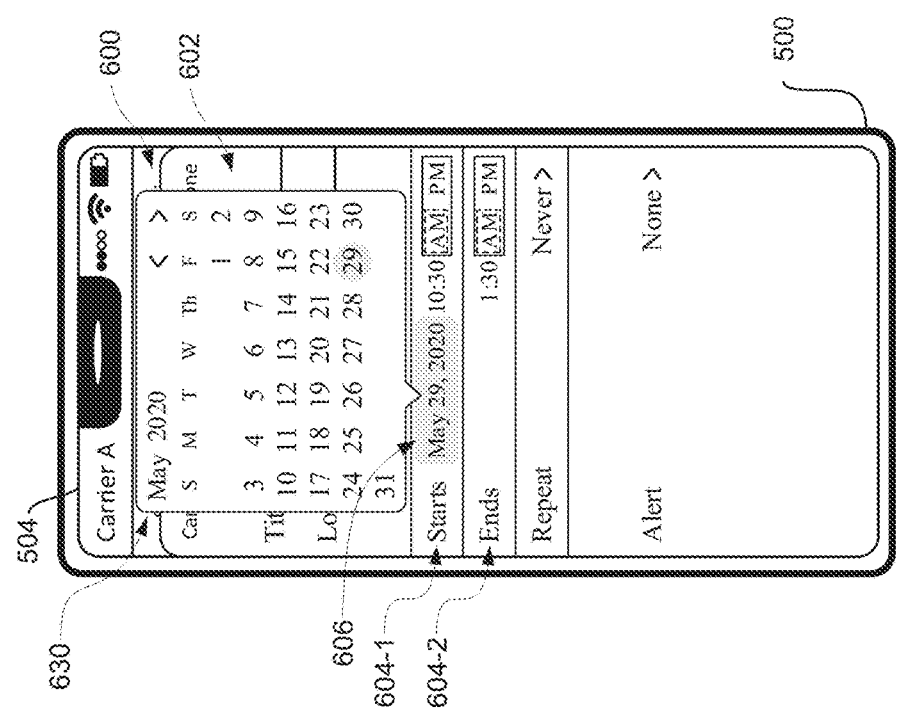
FIG. 6PP
FIG. 6OO

USER INTERFACES FOR INDICATING TIME AND/OR DATE ON AN ELECTRONIC DEVICE

CROSS-REFERENCE TO RELATED APPLICATIONS

This application claims the benefit of U.S. Provisional Application No. 63/041,977, filed Jun. 21, 2020, the content of which is incorporated herein by reference in its entirety for all purposes.

FIELD OF THE DISCLOSURE

This relates generally to electronic devices that display editable time and/or date input fields, and user interactions with such devices.

BACKGROUND

User interaction with electronic devices has increased significantly in recent years. These devices can be devices such as computers, tablet computers, televisions, multimedia devices, mobile devices, and the like.

In some circumstances, a user interface includes an editable time field or an editable date field. In some circumstances, users wish to edit these editable time or editable date fields. Enhancing these interactions improves the user's experience with the device and decreases user interaction time, which is particularly important where input devices are battery-operated.

SUMMARY

Some embodiments described in this disclosure are directed to interactions with editable time and/or editable date input fields. The full descriptions of the embodiments are provided in the Drawings and the Detailed Description, and it is understood that the Summary provided herein does not limit the scope of the disclosure in any way.

BRIEF DESCRIPTION OF THE DRAWINGS

For a better understanding of the various described embodiments, reference should be made to the Detailed Description below, in conjunction with the following drawings in which like reference numerals refer to corresponding parts throughout the figures.

DETAILED DESCRIPTION

Figure 1A:
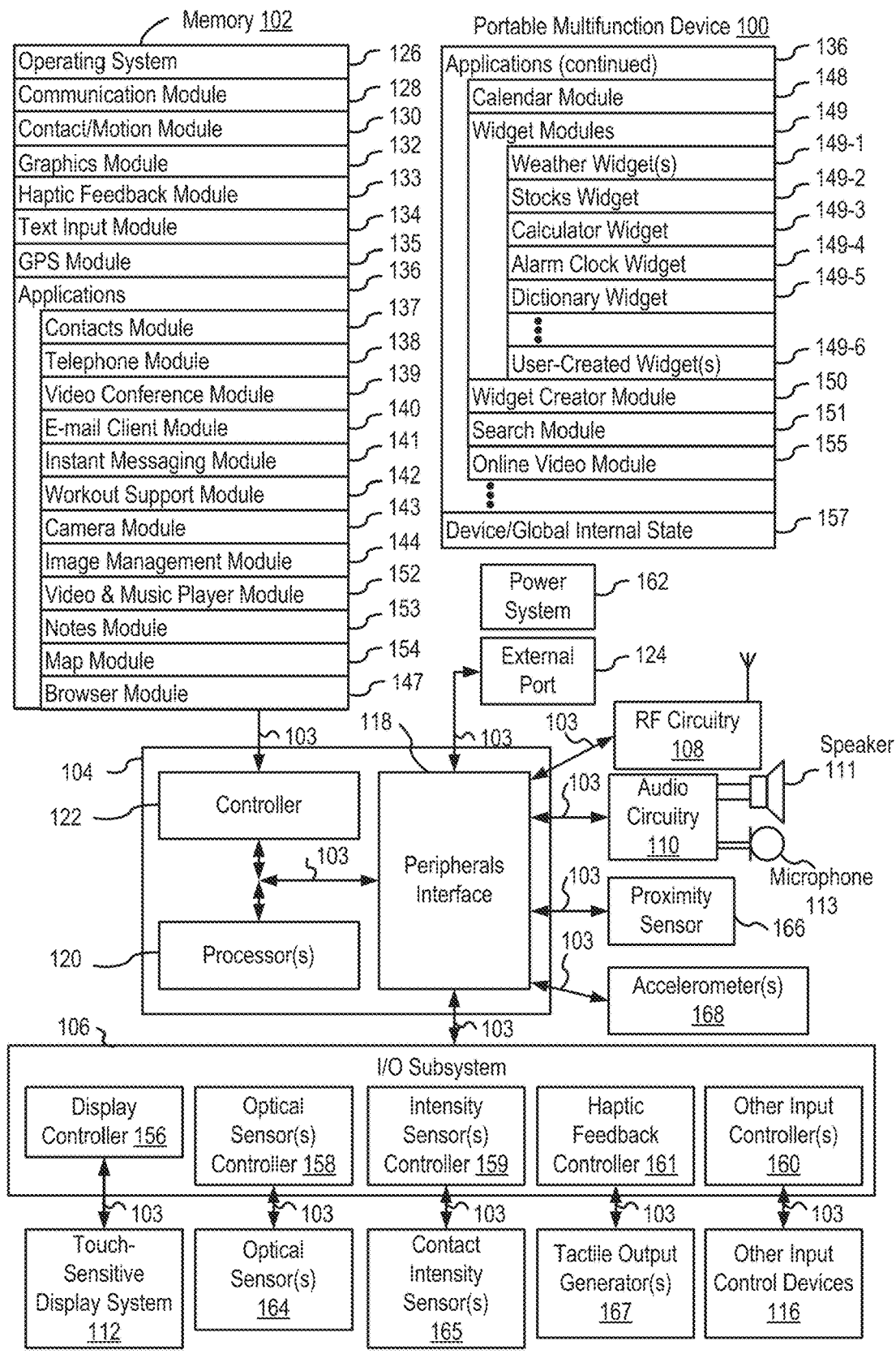
FIG. 1A is a block diagram illustrating a portable multifunction device with a touch-sensitive display in accordance with some embodiments.

The following description sets forth exemplary methods, parameters, and the like. It should be recognized, however, that such description is not intended as a limitation on the scope of the present disclosure but is instead provided as a description of exemplary embodiments.

There is a need for electronic devices that provide efficient methods for editing editable time entry fields or editable date entry fields. Such techniques can reduce the cognitive burden on a user who uses such devices. Further, such techniques can reduce processor and battery power otherwise wasted on redundant user inputs.

Although the following description uses terms "first," "second," etc. to describe various elements, these elements should not be limited by the terms. These terms are only used to distinguish one element from another. For example, a first touch could be termed a second touch, and, similarly, a second touch could be termed a first touch, without departing from the scope of the various described embodiments. The first touch and the second touch are both touches, but they are not the same touch.

The terminology used in the description of the various described embodiments herein is for the purpose of describing particular embodiments only and is not intended to be limiting. As used in the description of the various described embodiments and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

The term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context.

Embodiments of electronic devices, user interfaces for such devices, and associated processes for using such devices are described. In some embodiments, the device is a portable communications device, such as a mobile telephone, that also contains other functions, such as PDA and/or music player functions. Exemplary embodiments of portable multifunction devices include, without limitation, the iPhone®, iPod Touch®, and iPad® devices from Apple Inc. of Cupertino, California Other portable electronic devices, such as laptops or tablet computers with touch-sensitive surfaces (e.g., touch screen displays and/or touchpads), are, optionally, used. It should also be understood that, in some embodiments, the device is not a portable communications device, but is a desktop computer with a touch-sensitive surface (e.g., a touch screen display and/or a touchpad).

In the discussion that follows, an electronic device that includes a display and a touch-sensitive surface is described. It should be understood, however, that the electronic device optionally includes one or more other physical user-interface devices, such as a physical keyboard, a mouse, and/or a joystick.

The device typically supports a variety of applications, such as one or more of the following: a drawing application, a presentation application, a word processing application, a website creation application, a disk authoring application, a spreadsheet application, a gaming application, a telephone application, a video conferencing application, an e-mail application, an instant messaging application, a workout support application, a photo management application, a digital camera application, a digital video camera application, a web browsing application, a digital music player application, and/or a digital video player application.

The various applications that are executed on the device optionally use at least one common physical user-interface device, such as the touch-sensitive surface. One or more functions of the touch-sensitive surface as well as corresponding information displayed on the device are, optionally, adjusted and/or varied from one application to the next and/or within a respective application. In this way, a common physical architecture (such as the touch-sensitive surface) of the device optionally supports the variety of applications with user interfaces that are intuitive and transparent to the user.

Attention is now directed toward embodiments of portable devices with touch-sensitive displays. FIG. 1A is a block diagram illustrating portable multifunction device 100 with touch-sensitive display system 112 in accordance with some embodiments. Touch-sensitive display 112 is sometimes called a "touch screen" for convenience and is sometimes known as or called a "touch-sensitive display system." Device 100 includes memory 102 (which optionally includes one or more computer-readable storage mediums), memory controller 122, one or more processing units (CPUs) 120, peripherals interface 118, RF circuitry 108, audio circuitry 110, speaker 111, microphone 113, input/output (I/O) subsystem 106, other input control devices 116, and external port 124. Device 100 optionally includes one or more optical sensors 164. Device 100 optionally includes one or more contact intensity sensors 165 for detecting intensity of contacts on device 100 (e.g., a touch-sensitive surface such as touch-sensitive display system 112 of device 100). Device 100 optionally includes one or more tactile output generators 167 for generating tactile outputs on device 100 (e.g., generating tactile outputs on a touch-sensitive surface such as touch-sensitive display system 112 of device 100 or touchpad 355 of device 300). These components optionally communicate over one or more communication buses or signal lines 103.

As used in the specification and claims, the term "intensity" of a contact on a touch-sensitive surface refers to the force or pressure (force per unit area) of a contact (e.g., a finger contact) on the touch-sensitive surface, or to a substitute (proxy) for the force or pressure of a contact on the touch-sensitive surface. The intensity of a contact has a range of values that includes at least four distinct values and more typically includes hundreds of distinct values (e.g., at least 256). Intensity of a contact is, optionally, determined (or measured) using various approaches and various sensors or combinations of sensors. For example, one or more force sensors underneath or adjacent to the touch-sensitive surface are, optionally, used to measure force at various points on the touch-sensitive surface. In some implementations, force measurements from multiple force sensors are combined (e.g., a weighted average) to determine an estimated force of a contact. Similarly, a pressure-sensitive tip of a stylus is, optionally, used to determine a pressure of the stylus on the touch-sensitive surface. Alternatively, the size of the contact area detected on the touch-sensitive surface and/or changes thereto, the capacitance of the touch-sensitive surface proximate to the contact and/or changes thereto, and/or the resistance of the touch-sensitive surface proximate to the contact and/or changes thereto are, optionally, used as a substitute for the force or pressure of the contact on the touch-sensitive surface. In some implementations, the substitute measurements for contact force or pressure are used directly to determine whether an intensity threshold has been exceeded (e.g., the intensity threshold is described in units corresponding to the substitute measurements). In some implementations, the substitute measurements for contact force or pressure are converted to an estimated force or pressure, and the estimated force or pressure is used to determine whether an intensity threshold has been exceeded (e.g., the intensity threshold is a pressure threshold measured in units of pressure). Using the intensity of a contact as an attribute of a user input allows for user access to additional device functionality that may otherwise not be accessible by the user on a reduced-size device with limited real estate for displaying affordances (e.g., on a touch-sensitive display) and/or receiving user input (e.g., via a touch-sensitive display, a touch-sensitive surface, or a physical/mechanical control such as a knob or a button).

As used in the specification and claims, the term "tactile output" refers to physical displacement of a device relative to a previous position of the device, physical displacement of a component (e.g., a touch-sensitive surface) of a device relative to another component (e.g., housing) of the device, or displacement of the component relative to a center of mass of the device that will be detected by a user with the user's sense of touch. For example, in situations where the device or the component of the device is in contact with a surface of a user that is sensitive to touch (e.g., a finger, palm, or other part of a user's hand), the tactile output generated by the physical displacement will be interpreted by the user as a tactile sensation corresponding to a perceived change in physical characteristics of the device or the component of the device. For example, movement of a touch-sensitive surface (e.g., a touch-sensitive display or trackpad) is, optionally, interpreted by the user as a "down click" or "up click" of a physical actuator button. In some cases, a user will feel a tactile sensation such as an "down click" or "up click" even when there is no movement of a physical actuator button associated with the touch-sensitive surface that is physically pressed (e.g., displaced) by the user's movements. As another example, movement of the touch-sensitive surface is, optionally, interpreted or sensed by the user as "roughness" of the touch-sensitive surface, even when there is no change in smoothness of the touch-sensitive surface. While such interpretations of touch by a user will be subject to the individualized sensory perceptions of the user, there are many sensory perceptions of touch that are common to a large majority of users. Thus, when a tactile output is described as corresponding to a particular sensory perception of a user (e.g., an "up click," a "down click," "roughness"), unless otherwise stated, the generated tactile output corresponds to physical displacement of the device or a component thereof that will generate the described sensory perception for a typical (or average) user.

It should be appreciated that device 100 is only one example of a portable multifunction device, and that device 100 optionally has more or fewer components than shown, optionally combines two or more components, or optionally has a different configuration or arrangement of the components. The various components shown in FIG. 1A are implemented in hardware, software, or a combination of both hardware and software, including one or more signal processing and/or application-specific integrated circuits.

Memory 102 optionally includes high-speed random access memory and optionally also includes non-volatile memory, such as one or more magnetic disk storage devices, flash memory devices, or other non-volatile solid-state memory devices. Memory controller 122 optionally controls access to memory 102 by other components of device 100.

Peripherals interface 118 can be used to couple input and output peripherals of the device to CPU 120 and memory 102. The one or more processors 120 run or execute various software programs and/or sets of instructions stored in memory 102 to perform various functions for device 100 and to process data. In some embodiments, peripherals interface 118, CPU 120, and memory controller 122 are, optionally, implemented on a single chip, such as chip 104. In some other embodiments, they are, optionally, implemented on separate chips.

RF (radio frequency) circuitry 108 receives and sends RF signals, also called electromagnetic signals. RF circuitry 108 converts electrical signals to/from electromagnetic signals and communicates with communications networks and other communications devices via the electromagnetic signals. RF circuitry 108 optionally includes well-known circuitry for performing these functions, including but not limited to an antenna system, an RF transceiver, one or more amplifiers, a tuner, one or more oscillators, a digital signal processor, a CODEC chipset, a subscriber identity module (SIM) card, memory, and so forth. RF circuitry 108 optionally communicates with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The RF circuitry 108 optionally includes well-known circuitry for detecting near field communication (NFC) fields, such as by a short-range communication radio. The wireless communication optionally uses any of a plurality of communications standards, protocols, and technologies, including but not limited to Global System for Mobile Communications (GSM), Enhanced Data GSM Environment (EDGE), high-speed downlink packet access (HSDPA), high-speed uplink packet access (HSUPA), Evolution, Data-Only (EV-DO), HSPA, HSPA+, Dual-Cell HSPA (DC-HSPDA), long term evolution (LTE), near field communication (NFC), wideband code division multiple access (W-CDMA), code division multiple access (CDMA), time division multiple access (TDMA), Bluetooth, Bluetooth Low Energy (BTLE), Wireless Fidelity (Wi-Fi) (e.g., IEEE 802.11a, IEEE 802.11b, IEEE 802.11g, IEEE 802.11n, and/or IEEE 802.11ac), voice over Internet Protocol (VoIP), Wi-MAX, a protocol for e-mail (e.g., Internet message access protocol (IMAP) and/or post office protocol (POP)), instant messaging (e.g., extensible messaging and presence protocol (XMPP), Session Initiation Protocol for Instant Messaging and Presence Leveraging Extensions (SIMPLE), Instant Messaging and Presence Service (IMPS)), and/or Short Message Service (SMS), or any other suitable communication protocol, including communication protocols not yet developed as of the filing date of this document.

Audio circuitry 110, speaker 111, and microphone 113 provide an audio interface between a user and device 100. Audio circuitry 110 receives audio data from peripherals interface 118, converts the audio data to an electrical signal, and transmits the electrical signal to speaker 111. Speaker 111 converts the electrical signal to human-audible sound waves. Audio circuitry 110 also receives electrical signals converted by microphone 113 from sound waves. Audio circuitry 110 converts the electrical signal to audio data and transmits the audio data to peripherals interface 118 for processing. Audio data is, optionally, retrieved from and/or transmitted to memory 102 and/or RF circuitry 108 by peripherals interface 118. In some embodiments, audio circuitry 110 also includes a headset jack (e.g., 212, FIG. 2). The headset jack provides an interface between audio circuitry 110 and removable audio input/output peripherals, such as output-only headphones or a headset with both output (e.g., a headphone for one or both ears) and input (e.g., a microphone).

I/O subsystem 106 couples input/output peripherals on device 100, such as touch screen 112 and other input control devices 116, to peripherals interface 118. I/O subsystem 106 optionally includes display controller 156, optical sensor controller 158, intensity sensor controller 159, haptic feedback controller 161, and one or more input controllers 160 for other input or control devices. The one or more input controllers 160 receive/send electrical signals from/to other input control devices 116. The other input control devices 116 optionally include physical buttons (e.g., push buttons, rocker buttons, etc.), dials, slider switches, joysticks, click wheels, and so forth. In some alternate embodiments, input controller(s) 160 are, optionally, coupled to any (or none) of the following: a keyboard, an infrared port, a USB port, and a pointer device such as a mouse. The one or more buttons (e.g., 208, FIG. 2) optionally include an up/down button for volume control of speaker 111 and/or microphone 113. The one or more buttons optionally include a push button (e.g., 206, FIG. 2).

A quick press of the push button optionally disengages a lock of touch screen 112 or optionally begins a process that uses gestures on the touch screen to unlock the device, as described in U.S. patent application Ser. No. 11/322,549, "Unlocking a Device by Performing Gestures on an Unlock Image," filed Dec. 23, 2005, U.S. Pat. No. 7,657,849, which is hereby incorporated by reference in its entirety. A longer press of the push button (e.g., 206) optionally turns power to device 100 on or off. The functionality of one or more of the buttons are, optionally, user-customizable. Touch screen 112 is used to implement virtual or soft buttons and one or more soft keyboards.

Touch-sensitive display 112 provides an input interface and an output interface between the device and a user. Display controller 156 receives and/or sends electrical signals from/to touch screen 112. Touch screen 112 displays visual output to the user. The visual output optionally includes graphics, text, icons, video, and any combination thereof (collectively termed "graphics"). In some embodiments, some or all of the visual output optionally corresponds to user-interface objects.

Touch screen 112 has a touch-sensitive surface, sensor, or set of sensors that accepts input from the user based on haptic and/or tactile contact. Touch screen 112 and display controller 156 (along with any associated modules and/or sets of instructions in memory 102) detect contact (and any movement or breaking of the contact) on touch screen 112 and convert the detected contact into interaction with user-interface objects (e.g., one or more soft keys, icons, web pages, or images) that are displayed on touch screen 112. In an exemplary embodiment, a point of contact between touch screen 112 and the user corresponds to a finger of the user.

Touch screen 112 optionally uses LCD (liquid crystal display) technology, LPD (light emitting polymer display) technology, or LED (light emitting diode) technology, although other display technologies are used in other embodiments. Touch screen 112 and display controller 156 optionally detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with touch screen 112. In an exemplary embodiment, projected mutual capacitance sensing technology is used, such as that found in the iPhone® and iPod Touch® from Apple Inc. of Cupertino, California.

A touch-sensitive display in some embodiments of touch screen 112 is, optionally, analogous to the multi-touch sensitive touchpads described in the following U.S. Pat. No. 6,323,846 (Westerman et al.), U.S. Pat. No. 6,570,557 (Westerman et al.), and/or U.S. Pat. No. 6,677,932 (Westerman), and/or U.S. Patent Publication 2002/0015024A1, each of which is hereby incorporated by reference in its entirety. However, touch screen 112 displays visual output from device 100, whereas touch-sensitive touchpads do not provide visual output.

A touch-sensitive display in some embodiments of touch screen 112 is described in the following applications: (1) U.S. patent application Ser. No. 11/381,313, "Multipoint Touch Surface Controller," filed May 2, 2006; (2) U.S. patent application Ser. No. 10/840,862, "Multipoint Touchscreen," filed May 6, 2004; (3) U.S. patent application Ser. No. 10/903,964, "Gestures For Touch Sensitive Input Devices," filed Jul. 30, 2004; (4) U.S. patent application Ser. No. 11/048,264, "Gestures For Touch Sensitive Input Devices," filed Jan. 31, 2005; (5) U.S. patent application Ser. No. 11/038,590, "Mode-Based Graphical User Interfaces For Touch Sensitive Input Devices," filed Jan. 18, 2005; (6) U.S. patent application Ser. No. 11/228,758, "Virtual Input Device Placement On A Touch Screen User Interface," filed Sep. 16, 2005; (7) U.S. patent application Ser. No. 11/228,700, "Operation Of A Computer With A Touch Screen Interface," filed Sep. 16, 2005; (8) U.S. patent application Ser. No. 11/228,737, "Activating Virtual Keys Of A Touch-Screen Virtual Keyboard," filed Sep. 16, 2005; and (9) U.S. patent application Ser. No. 11/367,749, "Multi-Functional Hand-Held Device," filed Mar. 3, 2006. All of these applications are incorporated by reference herein in their entirety.

Touch screen 112 optionally has a video resolution in excess of 100 dpi. In some embodiments, the touch screen has a video resolution of approximately 160 dpi. The user optionally makes contact with touch screen 112 using any suitable object or appendage, such as a stylus, a finger, and so forth. In some embodiments, the user interface is designed to work primarily with finger-based contacts and gestures, which can be less precise than stylus-based input due to the larger area of contact of a finger on the touch screen. In some embodiments, the device translates the rough finger-based input into a precise pointer/cursor position or command for performing the actions desired by the user.

In some embodiments, device 100 is a portable computing system that is in communication (e.g., via wireless communication, via wired communication) with a display generation component. The display generation component is configured to provide visual output, such as display via a CRT display, display via an LED display, or display via image projection. In some embodiments, the display generation component is integrated with the computer system (e.g., an integrated display, touch screen 112, etc.). In some embodiments, the display generation component is separate from the computer system (e.g., an external monitor, a projection system, etc.). As used herein, "displaying" content includes causing to display the content (e.g., video data rendered or decoded by display controller 156) by transmitting, via a wired or wireless connection, data (e.g., image data or video data) to an integrated or external display generation component to visually produce the content.

In some embodiments, in addition to the touch screen, device 100 optionally includes a touchpad (not shown) for activating or deactivating particular functions. In some embodiments, the touchpad is a touch-sensitive area of the device that, unlike the touch screen, does not display visual output. The touchpad is, optionally, a touch-sensitive surface that is separate from touch screen 112 or an extension of the touch-sensitive surface formed by the touch screen.

Device 100 also includes power system 162 for powering the various components. Power system 162 optionally includes a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

Device 100 optionally also includes one or more optical sensors 164. FIG. 1A shows an optical sensor coupled to optical sensor controller 158 in I/O subsystem 106. Optical sensor 164 optionally includes charge-coupled device (CCD) or complementary metal-oxide semiconductor (CMOS) phototransistors. Optical sensor 164 receives light from the environment, projected through one or more lenses, and converts the light to data representing an image. In conjunction with imaging module 143 (also called a camera module), optical sensor 164 optionally captures still images or video. In some embodiments, an optical sensor is located on the back of device 100, opposite touch screen display 112 on the front of the device so that the touch screen display is enabled for use as a viewfinder for still and/or video image acquisition. In some embodiments, an optical sensor is located on the front of the device so that the user's image is, optionally, obtained for video conferencing while the user views the other video conference participants on the touch screen display. In some embodiments, the position of optical sensor 164 can be changed by the user (e.g., by rotating the lens and the sensor in the device housing) so that a single optical sensor 164 is used along with the touch screen display for both video conferencing and still and/or video image acquisition.

Device 100 optionally also includes one or more contact intensity sensors 165. FIG. 1A shows a contact intensity sensor coupled to intensity sensor controller 159 in I/O subsystem 106. Contact intensity sensor 165 optionally includes one or more piezoresistive strain gauges, capacitive force sensors, electric force sensors, piezoelectric force sensors, optical force sensors, capacitive touch-sensitive surfaces, or other intensity sensors (e.g., sensors used to measure the force (or pressure) of a contact on a touch-sensitive surface). Contact intensity sensor 165 receives contact intensity information (e.g., pressure information or a proxy for pressure information) from the environment. In some embodiments, at least one contact intensity sensor is collocated with, or proximate to, a touch-sensitive surface (e.g., touch-sensitive display system 112). In some embodiments, at least one contact intensity sensor is located on the back of device 100, opposite touch screen display 112, which is located on the front of device 100.

Device 100 optionally also includes one or more proximity sensors 166. FIG. 1A shows proximity sensor 166 coupled to peripherals interface 118. Alternately, proximity sensor 166 is, optionally, coupled to input controller 160 in I/O subsystem 106. Proximity sensor 166 optionally performs as described in U.S. patent application Ser. No. 11/241,839, "Proximity Detector In Handheld Device"; Ser. No. 11/240,788, "Proximity Detector In Handheld Device"; Ser. No. 11/620,702, "Using Ambient Light Sensor To Augment Proximity Sensor Output"; Ser. No. 11/586,862, "Automated Response To And Sensing Of User Activity In Portable Devices"; and Ser. No. 11/638,251, "Methods And Systems For Automatic Configuration Of Peripherals," which are hereby incorporated by reference in their entirety. In some embodiments, the proximity sensor turns off and disables touch screen 112 when the multifunction device is placed near the user's ear (e.g., when the user is making a phone call).

Device 100 optionally also includes one or more tactile output generators 167. FIG. 1A shows a tactile output generator coupled to haptic feedback controller 161 in I/O subsystem 106. Tactile output generator 167 optionally includes one or more electroacoustic devices such as speakers or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). Contact intensity sensor 165 receives tactile feedback generation instructions from haptic feedback module 133 and generates tactile outputs on device 100 that are capable of being sensed by a user of device 100. In some embodiments, at least one tactile output generator is collocated with, or proximate to, a touch-sensitive surface (e.g., touch-sensitive display system 112) and, optionally, generates a tactile output by moving the touch-sensitive surface vertically (e.g., in/out of a surface of device 100) or laterally (e.g., back and forth in the same plane as a surface of device 100). In some embodiments, at least one tactile output generator sensor is located on the back of device 100, opposite touch screen display 112, which is located on the front of device 100.

Device 100 optionally also includes one or more accelerometers 168. FIG. 1A shows accelerometer 168 coupled to peripherals interface 118. Alternately, accelerometer 168 is, optionally, coupled to an input controller 160 in I/O subsystem 106. Accelerometer 168 optionally performs as described in U.S. Patent Publication No. 20050190059, "Acceleration-based Theft Detection System for Portable Electronic Devices," and U.S. Patent Publication No. 20060017692, "Methods And Apparatuses For Operating A Portable Device Based On An Accelerometer," both of which are incorporated by reference herein in their entirety. In some embodiments, information is displayed on the touch screen display in a portrait view or a landscape view based on an analysis of data received from the one or more accelerometers. Device 100 optionally includes, in addition to accelerometer(s) 168, a magnetometer (not shown) and a GPS (or GLONASS or other global navigation system) receiver (not shown) for obtaining information concerning the location and orientation (e.g., portrait or landscape) of device 100.

Figure 3:
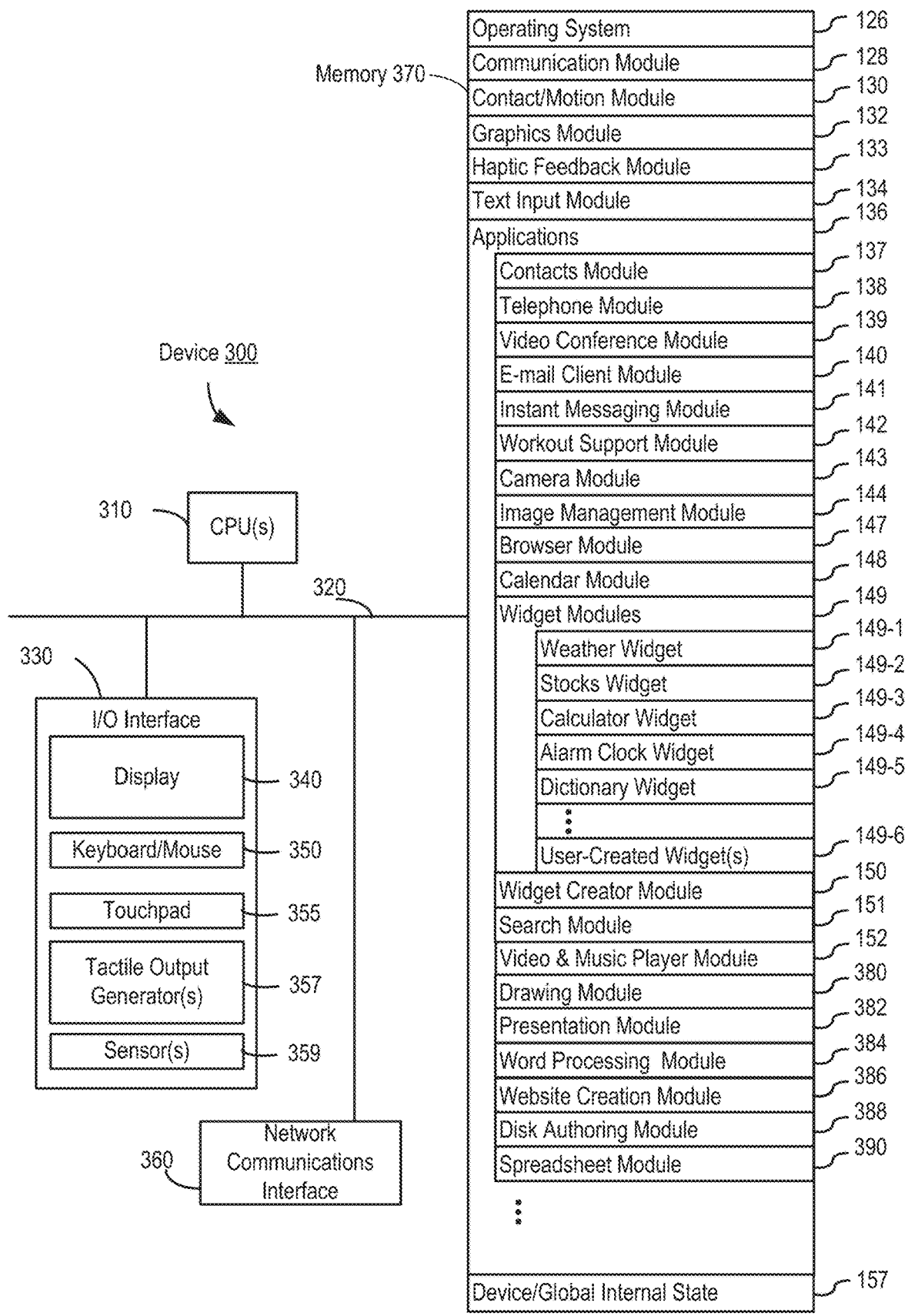
FIG. 3 is a block diagram of an exemplary multifunction device with a display and a touch-sensitive surface in accordance with some embodiments.

In some embodiments, the software components stored in memory 102 include operating system 126, communication module (or set of instructions) 128, contact/motion module (or set of instructions) 130, graphics module (or set of instructions) 132, text input module (or set of instructions) 134, Global Positioning System (GPS) module (or set of instructions) 135, and applications (or sets of instructions) 136. Furthermore, in some embodiments, memory 102 (FIG. 1A) or 370 (FIG. 3) stores device/global internal state 157, as shown in FIGS. 1A and 3. Device/global internal state 157 includes one or more of: active application state, indicating which applications, if any, are currently active; display state, indicating what applications, views or other information occupy various regions of touch screen display 112; sensor state, including information obtained from the device's various sensors and input control devices 116; and location information concerning the device's location and/or attitude.

Operating system 126 (e.g., Darwin, RTXC, LINUX, UNIX, OS X, iOS, WINDOWS, or an embedded operating system such as VxWorks) includes various software components and/or drivers for controlling and managing general system tasks (e.g., memory management, storage device control, power management, etc.) and facilitates communication between various hardware and software components.

Communication module 128 facilitates communication with other devices over one or more external ports 124 and also includes various software components for handling data received by RF circuitry 108 and/or external port 124. External port 124 (e.g., Universal Serial Bus (USB), FIRE-WIRE, etc.) is adapted for coupling directly to other devices or indirectly over a network (e.g., the Internet, wireless LAN, etc.). In some embodiments, the external port is a multi-pin (e.g., 30-pin) connector that is the same as, or similar to and/or compatible with, the 30-pin connector used on iPod® (trademark of Apple Inc.) devices.

Contact/motion module 130 optionally detects contact with touch screen 112 (in conjunction with display controller 156) and other touch-sensitive devices (e.g., a touchpad or physical click wheel). Contact/motion module 130 includes various software components for performing various operations related to detection of contact, such as determining if contact has occurred (e.g., detecting a finger-down event), determining an intensity of the contact (e.g., the force or pressure of the contact or a substitute for the force or pressure of the contact), determining if there is movement of the contact and tracking the movement across the touch-sensitive surface (e.g., detecting one or more finger-dragging events), and determining if the contact has ceased (e.g., detecting a finger-up event or a break in contact). Contact/motion module 130 receives contact data from the touch-sensitive surface. Determining movement of the point of contact, which is represented by a series of contact data, optionally includes determining speed (magnitude), velocity (magnitude and direction), and/or an acceleration (a change in magnitude and/or direction) of the point of contact. These operations are, optionally, applied to single contacts (e.g., one finger contacts) or to multiple simultaneous contacts (e.g., "multitouch"/multiple finger contacts). In some embodiments, contact/motion module 130 and display controller 156 detect contact on a touchpad.

In some embodiments, contact/motion module 130 uses a set of one or more intensity thresholds to determine whether an operation has been performed by a user (e.g., to determine whether a user has "clicked" on an icon). In some embodiments, at least a subset of the intensity thresholds are determined in accordance with software parameters (e.g., the intensity thresholds are not determined by the activation thresholds of particular physical actuators and can be adjusted without changing the physical hardware of device 100). For example, a mouse "click" threshold of a trackpad or touch screen display can be set to any of a large range of predefined threshold values without changing the trackpad or touch screen display hardware. Additionally, in some implementations, a user of the device is provided with software settings for adjusting one or more of the set of intensity thresholds (e.g., by adjusting individual intensity thresholds and/or by adjusting a plurality of intensity thresholds at once with a system-level click "intensity" parameter).

Contact/motion module 130 optionally detects a gesture input by a user. Different gestures on the touch-sensitive surface have different contact patterns (e.g., different motions, timings, and/or intensities of detected contacts). Thus, a gesture is, optionally, detected by detecting a particular contact pattern. For example, detecting a finger tap gesture includes detecting a finger-down event followed by detecting a finger-up (liftoff) event at the same position (or substantially the same position) as the finger-down event (e.g., at the position of an icon). As another example, detecting a finger swipe gesture on the touch-sensitive surface includes detecting a finger-down event followed by detecting one or more finger-dragging events, and subsequently followed by detecting a finger-up (liftoff) event.

Graphics module 132 includes various known software components for rendering and displaying graphics on touch screen 112 or other display, including components for changing the visual impact (e.g., brightness, transparency, saturation, contrast, or other visual property) of graphics that are displayed. As used herein, the term "graphics" includes any object that can be displayed to a user, including, without limitation, text, web pages, icons (such as user-interface objects including soft keys), digital images, videos, animations, and the like.

In some embodiments, graphics module 132 stores data representing graphics to be used. Each graphic is, optionally, assigned a corresponding code. Graphics module 132 receives, from applications etc., one or more codes specifying graphics to be displayed along with, if necessary, coordinate data and other graphic property data, and then generates screen image data to output to display controller 156.

Haptic feedback module 133 includes various software components for generating instructions used by tactile output generator(s) 167 to produce tactile outputs at one or more locations on device 100 in response to user interactions with device 100.

Text input module 134, which is, optionally, a component of graphics module 132, provides soft keyboards for entering text in various applications (e.g., contacts 137, e-mail 140, IM 141, browser 147, and any other application that needs text input).

GPS module 135 determines the location of the device and provides this information for use in various applications (e.g., to telephone 138 for use in location-based dialing; to camera 143 as picture/video metadata; and to applications that provide location-based services such as weather widgets, local yellow page widgets, and map/navigation widgets).

Applications 136 optionally include the following modules (or sets of instructions), or a subset or superset thereof:

- Contacts module 137 (sometimes called an address book or contact list);
- Telephone module 138;
- Video conference module 139;
- E-mail client module 140;
- Instant messaging (IM) module 141;
- Workout support module 142;
- Camera module 143 for still and/or video images;
- Image management module 144;
- Video player module;
- Music player module;
- Browser module 147;
- Calendar module 148;
- Widget modules 149, which optionally include one or more of: weather widget 149-1, stocks widget 149-2, calculator widget 149-3, alarm clock widget 149-4, dictionary widget 149-5, and other widgets obtained by the user, as well as user-created widgets 149-6;
- Widget creator module 150 for making user-created widgets 149-6;
- Search module 151;
- Video and music player module 152, which merges video player module and music player module;
- Notes module 153;
- Map module 154; and/or
- Online video module 155.

Examples of other applications 136 that are, optionally, stored in memory 102 include other word processing applications, other image editing applications, drawing applications, presentation applications, JAVA-enabled applications, encryption, digital rights management, voice recognition, and voice replication.

In conjunction with touch screen 112, display controller 156, contact/motion module 130, graphics module 132, and text input module 134, contacts module 137 are, optionally, used to manage an address book or contact list (e.g., stored in application internal state 192 of contacts module 137 in memory 102 or memory 370), including: adding name(s) to the address book; deleting name(s) from the address book; associating telephone number(s), e-mail address(es), physical address(es) or other information with a name; associating an image with a name; categorizing and sorting names; providing telephone numbers or e-mail addresses to initiate and/or facilitate communications by telephone 138, video conference module 139, e-mail 140, or IM 141; and so forth.

In conjunction with RF circuitry 108, audio circuitry 110, speaker 111, microphone 113, touch screen 112, display controller 156, contact/motion module 130, graphics module 132, and text input module 134, telephone module 138 are optionally, used to enter a sequence of characters corresponding to a telephone number, access one or more telephone numbers in contacts module 137, modify a telephone number that has been entered, dial a respective telephone number, conduct a conversation, and disconnect or hang up when the conversation is completed. As noted above, the wireless communication optionally uses any of a plurality of communications standards, protocols, and technologies.

In conjunction with RF circuitry 108, audio circuitry 110, speaker 111, microphone 113, touch screen 112, display controller 156, optical sensor 164, optical sensor controller 158, contact/motion module 130, graphics module 132, text input module 134, contacts module 137, and telephone module 138, video conference module 139 includes executable instructions to initiate, conduct, and terminate a video conference between a user and one or more other participants in accordance with user instructions.

In conjunction with RF circuitry 108, touch screen 112, display controller 156, contact/motion module 130, graphics module 132, and text input module 134, e-mail client module 140 includes executable instructions to create, send, receive, and manage e-mail in response to user instructions. In conjunction with image management module 144, e-mail client module 140 makes it very easy to create and send e-mails with still or video images taken with camera module 143.

In conjunction with RF circuitry 108, touch screen 112, display controller 156, contact/motion module 130, graphics module 132, and text input module 134, the instant messaging module 141 includes executable instructions to enter a sequence of characters corresponding to an instant message, to modify previously entered characters, to transmit a respective instant message (for example, using a Short Message Service (SMS) or Multimedia Message Service (MMS) protocol for telephony-based instant messages or using XMPP, SIMPLE, or IMPS for Internet-based instant messages), to receive instant messages, and to view received instant messages. In some embodiments, transmitted and/or received instant messages optionally include graphics, photos, audio files, video files and/or other attachments as are supported in an MMS and/or an Enhanced Messaging Service (EMS). As used herein, "instant messaging" refers to both telephony-based messages (e.g., messages sent using SMS or MMS) and Internet-based messages (e.g., messages sent using XMPP, SIMPLE, or IMPS).

In conjunction with RF circuitry 108, touch screen 112, display controller 156, contact/motion module 130, graphics module 132, text input module 134, GPS module 135, map module 154, and music player module, workout support module 142 includes executable instructions to create workouts (e.g., with time, distance, and/or calorie burning goals); communicate with workout sensors (sports devices); receive workout sensor data; calibrate sensors used to monitor a workout; select and play music for a workout; and display, store, and transmit workout data.

In conjunction with touch screen 112, display controller 156, optical sensor(s) 164, optical sensor controller 158, contact/motion module 130, graphics module 132, and image management module 144, camera module 143 includes executable instructions to capture still images or video (including a video stream) and store them into memory 102, modify characteristics of a still image or video, or delete a still image or video from memory 102.

In conjunction with touch screen 112, display controller 156, contact/motion module 130, graphics module 132, text input module 134, and camera module 143, image management module 144 includes executable instructions to arrange, modify (e.g., edit), or otherwise manipulate, label, delete, present (e.g., in a digital slide show or album), and store still and/or video images.

In conjunction with RF circuitry 108, touch screen 112, display controller 156, contact/motion module 130, graphics module 132, and text input module 134, browser module 147 includes executable instructions to browse the Internet in accordance with user instructions, including searching, linking to, receiving, and displaying web pages or portions thereof, as well as attachments and other files linked to web pages.

In conjunction with RF circuitry 108, touch screen 112, display controller 156, contact/motion module 130, graphics module 132, text input module 134, e-mail client module 140, and browser module 147, calendar module 148 includes executable instructions to create, display, modify, and store calendars and data associated with calendars (e.g., calendar entries, to-do lists, etc.) in accordance with user instructions.

In conjunction with RF circuitry 108, touch screen 112, display controller 156, contact/motion module 130, graphics module 132, text input module 134, and browser module 147, widget modules 149 are mini-applications that are, optionally, downloaded and used by a user (e.g., weather widget 149-1, stocks widget 149-2, calculator widget 149-3, alarm clock widget 149-4, and dictionary widget 149-5) or created by the user (e.g., user-created widget 149-6). In some embodiments, a widget includes an HTML (Hypertext Markup Language) file, a CSS (Cascading Style Sheets) file, and a JavaScript file. In some embodiments, a widget includes an XML (Extensible Markup Language) file and a JavaScript file (e.g., Yahoo! Widgets).

In conjunction with RF circuitry 108, touch screen 112, display controller 156, contact/motion module 130, graphics module 132, text input module 134, and browser module 147, the widget creator module 150 are, optionally, used by a user to create widgets (e.g., turning a user-specified portion of a web page into a widget).

In conjunction with touch screen 112, display controller 156, contact/motion module 130, graphics module 132, and text input module 134, search module 151 includes executable instructions to search for text, music, sound, image, video, and/or other files in memory 102 that match one or more search criteria (e.g., one or more user-specified search terms) in accordance with user instructions.

In conjunction with touch screen 112, display controller 156, contact/motion module 130, graphics module 132, audio circuitry 110, speaker 111, RF circuitry 108, and browser module 147, video and music player module 152 includes executable instructions that allow the user to download and play back recorded music and other sound files stored in one or more file formats, such as MP3 or AAC files, and executable instructions to display, present, or otherwise play back videos (e.g., on touch screen 112 or on an external, connected display via external port 124). In some embodiments, device 100 optionally includes the functionality of an MP3 player, such as an iPod (trademark of Apple Inc.).

In conjunction with touch screen 112, display controller 156, contact/motion module 130, graphics module 132, and text input module 134, notes module 153 includes executable instructions to create and manage notes, to-do lists, and the like in accordance with user instructions.

In conjunction with RF circuitry 108, touch screen 112, display controller 156, contact/motion module 130, graphics module 132, text input module 134, GPS module 135, and browser module 147, map module 154 are, optionally, used to receive, display, modify, and store maps and data associated with maps (e.g., driving directions, data on stores and other points of interest at or near a particular location, and other location-based data) in accordance with user instructions.

In conjunction with touch screen 112, display controller 156, contact/motion module 130, graphics module 132, audio circuitry 110, speaker 111, RF circuitry 108, text input module 134, e-mail client module 140, and browser module 147, online video module 155 includes instructions that allow the user to access, browse, receive (e.g., by streaming and/or download), play back (e.g., on the touch screen or on an external, connected display via external port 124), send an e-mail with a link to a particular online video, and otherwise manage online videos in one or more file formats, such as H.264. In some embodiments, instant messaging module 141, rather than e-mail client module 140, is used to send a link to a particular online video. Additional description of the online video application can be found in U.S. Provisional Patent Application No. 60/936,562, "Portable Multifunction Device, Method, and Graphical User Interface for Playing Online Videos," filed Jun. 20, 2007, and U.S. patent application Ser. No. 11/968,067, "Portable Multifunction Device, Method, and Graphical User Interface for Playing Online Videos," filed Dec. 31, 2007, the contents of which are hereby incorporated by reference in their entirety.

Each of the above-identified modules and applications corresponds to a set of executable instructions for performing one or more functions described above and the methods described in this application (e.g., the computer-implemented methods and other information processing methods described herein). These modules (e.g., sets of instructions) need not be implemented as separate software programs, procedures, or modules, and thus various subsets of these modules are, optionally, combined or otherwise rearranged in various embodiments. For example, video player module is, optionally, combined with music player module into a single module (e.g., video and music player module 152, FIG. 1A). In some embodiments, memory 102 optionally stores a subset of the modules and data structures identified above. Furthermore, memory 102 optionally stores additional modules and data structures not described above.

In some embodiments, device 100 is a device where operation of a predefined set of functions on the device is performed exclusively through a touch screen and/or a touchpad. By using a touch screen and/or a touchpad as the primary input control device for operation of device 100, the number of physical input control devices (such as push buttons, dials, and the like) on device 100 is, optionally, reduced.

The predefined set of functions that are performed exclusively through a touch screen and/or a touchpad optionally include navigation between user interfaces. In some embodiments, the touchpad, when touched by the user, navigates device 100 to a main, home, or root menu from any user interface that is displayed on device 100. In such embodiments, a "menu button" is implemented using a touchpad. In some other embodiments, the menu button is a physical push button or other physical input control device instead of a touchpad.

Figure 1B:
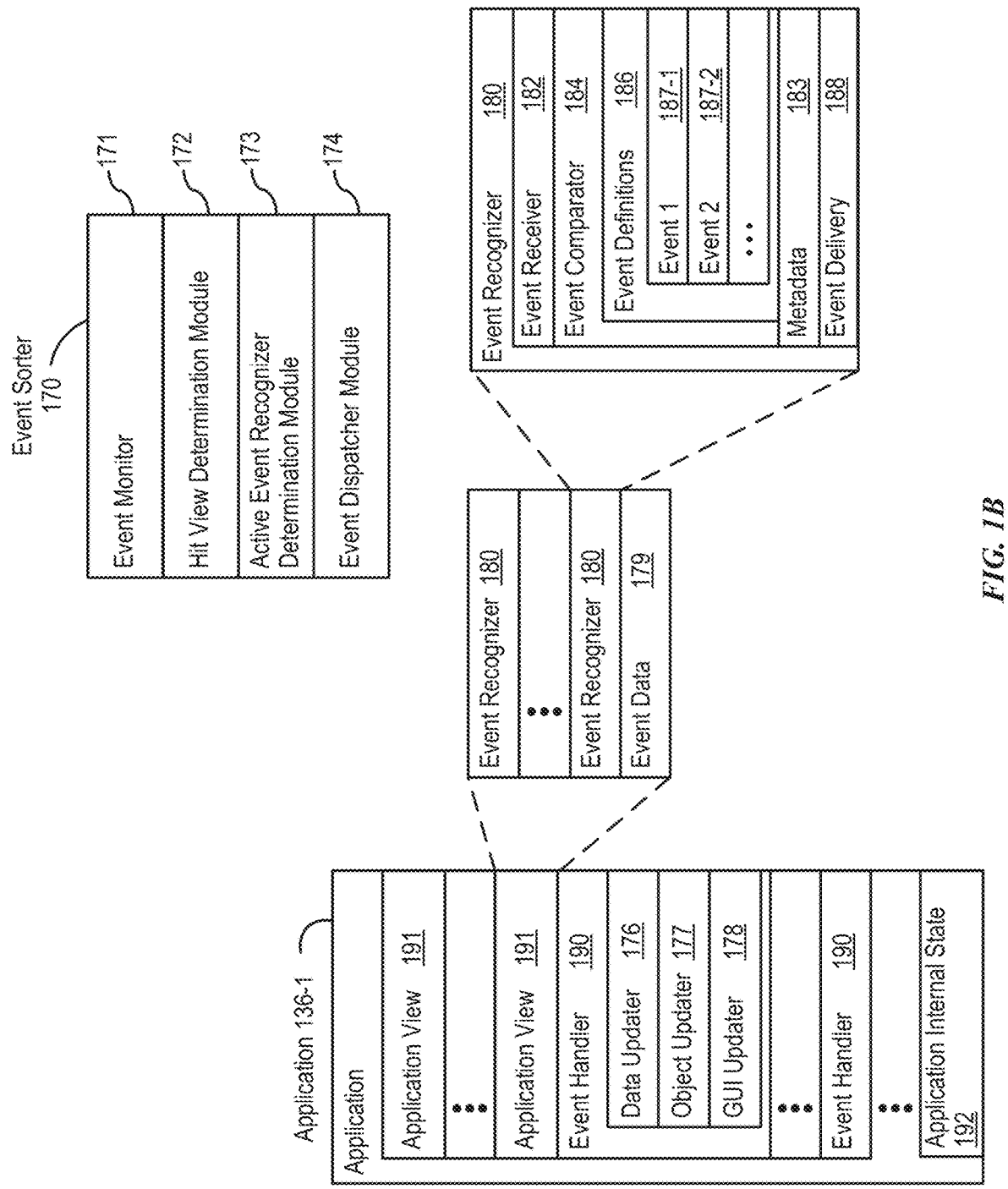
FIG. 1B is a block diagram illustrating exemplary components for event handling in accordance with some embodiments.

FIG. 1B is a block diagram illustrating exemplary components for event handling in accordance with some embodiments. In some embodiments, memory 102 (FIG. 1A) or 370 (FIG. 3) includes event sorter 170 (e.g., in operating system 126) and a respective application 136-1 (e.g., any of the aforementioned applications 137-151, 155, 380-390).

Event sorter 170 receives event information and determines the application 136-1 and application view 191 of application 136-1 to which to deliver the event information. Event sorter 170 includes event monitor 171 and event dispatcher module 174. In some embodiments, application 136-1 includes application internal state 192, which indicates the current application view(s) displayed on touch-sensitive display 112 when the application is active or executing. In some embodiments, device/global internal state 157 is used by event sorter 170 to determine which application(s) is (are) currently active, and application internal state 192 is used by event sorter 170 to determine application views 191 to which to deliver event information.

In some embodiments, application internal state 192 includes additional information, such as one or more of: resume information to be used when application 136-1 resumes execution, user interface state information that indicates information being displayed or that is ready for display by application 136-1, a state queue for enabling the user to go back to a prior state or view of application 136-1, and a redo/undo queue of previous actions taken by the user.

Event monitor 171 receives event information from peripherals interface 118. Event information includes information about a sub-event (e.g., a user touch on touch-sensitive display 112, as part of a multi-touch gesture). Peripherals interface 118 transmits information it receives from I/O subsystem 106 or a sensor, such as proximity sensor 166, accelerometer(s) 168, and/or microphone 113 (through audio circuitry 110). Information that peripherals interface 118 receives from I/O subsystem 106 includes information from touch-sensitive display 112 or a touch-sensitive surface.

In some embodiments, event monitor 171 sends requests to the peripherals interface 118 at predetermined intervals. In response, peripherals interface 118 transmits event information. In other embodiments, peripherals interface 118 transmits event information only when there is a significant event (e.g., receiving an input above a predetermined noise threshold and/or for more than a predetermined duration).

In some embodiments, event sorter 170 also includes a hit view determination module 172 and/or an active event recognizer determination module 173.

Hit view determination module 172 provides software procedures for determining where a sub-event has taken place within one or more views when touch-sensitive display 112 displays more than one view. Views are made up of controls and other elements that a user can see on the display.

Another aspect of the user interface associated with an application is a set of views, sometimes herein called application views or user interface windows, in which information is displayed and touch-based gestures occur. The application views (of a respective application) in which a touch is detected optionally correspond to programmatic levels within a programmatic or view hierarchy of the application. For example, the lowest level view in which a touch is detected is, optionally, called the hit view, and the set of events that are recognized as proper inputs are, optionally, determined based, at least in part, on the hit view of the initial touch that begins a touch-based gesture.

Hit view determination module 172 receives information related to sub-events of a touch-based gesture. When an application has multiple views organized in a hierarchy, hit view determination module 172 identifies a hit view as the lowest view in the hierarchy which should handle the sub-event. In most circumstances, the hit view is the lowest level view in which an initiating sub-event occurs (e.g., the first sub-event in the sequence of sub-events that form an event or potential event). Once the hit view is identified by the hit view determination module 172, the hit view typically receives all sub-events related to the same touch or input source for which it was identified as the hit view.

Active event recognizer determination module 173 determines which view or views within a view hierarchy should receive a particular sequence of sub-events. In some embodiments, active event recognizer determination module 173 determines that only the hit view should receive a particular sequence of sub-events. In other embodiments, active event recognizer determination module 173 determines that all views that include the physical location of a sub-event are actively involved views, and therefore determines that all actively involved views should receive a particular sequence of sub-events. In other embodiments, even if touch sub-events were entirely confined to the area associated with one particular view, views higher in the hierarchy would still remain as actively involved views.

Event dispatcher module 174 dispatches the event information to an event recognizer (e.g., event recognizer 180). In embodiments including active event recognizer determination module 173, event dispatcher module 174 delivers the event information to an event recognizer determined by active event recognizer determination module 173. In some embodiments, event dispatcher module 174 stores in an event queue the event information, which is retrieved by a respective event receiver 182.

In some embodiments, operating system 126 includes event sorter 170. Alternatively, application 136-1 includes event sorter 170. In yet other embodiments, event sorter 170 is a stand-alone module, or a part of another module stored in memory 102, such as contact/motion module 130.

In some embodiments, application 136-1 includes a plurality of event handlers 190 and one or more application views 191, each of which includes instructions for handling touch events that occur within a respective view of the application's user interface. Each application view 191 of the application 136-1 includes one or more event recognizers 180. Typically, a respective application view 191 includes a plurality of event recognizers 180. In other embodiments, one or more of event recognizers 180 are part of a separate module, such as a user interface kit (not shown) or a higher level object from which application 136-1 inherits methods and other properties. In some embodiments, a respective event handler 190 includes one or more of: data updater 176, object updater 177, GUI updater 178, and/or event data 179 received from event sorter 170. Event handler 190 optionally utilizes or calls data updater 176, object updater 177, or GUI updater 178 to update the application internal state 192. Alternatively, one or more of the application views 191 include one or more respective event handlers 190. Also, in some embodiments, one or more of data updater 176, object updater 177, and GUI updater 178 are included in a respective application view 191.

A respective event recognizer 180 receives event information (e.g., event data 179) from event sorter 170 and identifies an event from the event information. Event recognizer 180 includes event receiver 182 and event comparator 184. In some embodiments, event recognizer 180 also includes at least a subset of: metadata 183, and event delivery instructions 188 (which optionally include sub-event delivery instructions).

Event receiver 182 receives event information from event sorter 170. The event information includes information about a sub-event, for example, a touch or a touch movement. Depending on the sub-event, the event information also includes additional information, such as location of the sub-event. When the sub-event concerns motion of a touch, the event information optionally also includes speed and direction of the sub-event. In some embodiments, events include rotation of the device from one orientation to another (e.g., from a portrait orientation to a landscape orientation, or vice versa), and the event information includes corresponding information about the current orientation (also called device attitude) of the device.

Event comparator 184 compares the event information to predefined event or sub-event definitions and, based on the comparison, determines an event or sub-event, or determines or updates the state of an event or sub-event. In some embodiments, event comparator 184 includes event definitions 186. Event definitions 186 contain definitions of events (e.g., predefined sequences of sub-events), for example, event 1 (187-1), event 2 (187-2), and others. In some embodiments, sub-events in an event (187) include, for example, touch begin, touch end, touch movement, touch cancellation, and multiple touching. In one example, the definition for event 1 (187-1) is a double tap on a displayed object. The double tap, for example, comprises a first touch (touch begin) on the displayed object for a predetermined phase, a first liftoff (touch end) for a predetermined phase, a second touch (touch begin) on the displayed object for a predetermined phase, and a second liftoff (touch end) for a predetermined phase. In another example, the definition for event 2 (187-2) is a dragging on a displayed object. The dragging, for example, comprises a touch (or contact) on the displayed object for a predetermined phase, a movement of the touch across touch-sensitive display 112, and liftoff of the touch (touch end). In some embodiments, the event also includes information for one or more associated event handlers 190.

In some embodiments, event definition 187 includes a definition of an event for a respective user-interface object. In some embodiments, event comparator 184 performs a hit test to determine which user-interface object is associated with a sub-event. For example, in an application view in which three user-interface objects are displayed on touch-sensitive display 112, when a touch is detected on touch-sensitive display 112, event comparator 184 performs a hit test to determine which of the three user-interface objects is associated with the touch (sub-event). If each displayed object is associated with a respective event handler 190, the event comparator uses the result of the hit test to determine which event handler 190 should be activated. For example, event comparator 184 selects an event handler associated with the sub-event and the object triggering the hit test.

In some embodiments, the definition for a respective event (187) also includes delayed actions that delay delivery of the event information until after it has been determined whether the sequence of sub-events does or does not correspond to the event recognizer's event type.

When a respective event recognizer 180 determines that the series of sub-events do not match any of the events in event definitions 186, the respective event recognizer 180 enters an event impossible, event failed, or event ended state, after which it disregards subsequent sub-events of the touch-based gesture. In this situation, other event recognizers, if any, that remain active for the hit view continue to track and process sub-events of an ongoing touch-based gesture.

In some embodiments, a respective event recognizer 180 includes metadata 183 with configurable properties, flags, and/or lists that indicate how the event delivery system should perform sub-event delivery to actively involved event recognizers. In some embodiments, metadata 183 includes configurable properties, flags, and/or lists that indicate how event recognizers interact, or are enabled to interact, with one another. In some embodiments, metadata 183 includes configurable properties, flags, and/or lists that indicate whether sub-events are delivered to varying levels in the view or programmatic hierarchy.

In some embodiments, a respective event recognizer 180 activates event handler 190 associated with an event when one or more particular sub-events of an event are recognized. In some embodiments, a respective event recognizer 180 delivers event information associated with the event to event handler 190. Activating an event handler 190 is distinct from sending (and deferred sending) sub-events to a respective hit view. In some embodiments, event recognizer 180 throws a flag associated with the recognized event, and event handler 190 associated with the flag catches the flag and performs a predefined process.

In some embodiments, event delivery instructions 188 include sub-event delivery instructions that deliver event information about a sub-event without activating an event handler. Instead, the sub-event delivery instructions deliver event information to event handlers associated with the series of sub-events or to actively involved views. Event handlers associated with the series of sub-events or with actively involved views receive the event information and perform a predetermined process.

In some embodiments, data updater 176 creates and updates data used in application 136-1. For example, data updater 176 updates the telephone number used in contacts module 137, or stores a video file used in video player module. In some embodiments, object updater 177 creates and updates objects used in application 136-1. For example, object updater 177 creates a new user-interface object or updates the position of a user-interface object. GUI updater 178 updates the GUI. For example, GUI updater 178 prepares display information and sends it to graphics module 132 for display on a touch-sensitive display.

In some embodiments, event handler(s) 190 includes or has access to data updater 176, object updater 177, and GUI updater 178. In some embodiments, data updater 176, object updater 177, and GUI updater 178 are included in a single module of a respective application 136-1 or application view 191. In other embodiments, they are included in two or more software modules.

It shall be understood that the foregoing discussion regarding event handling of user touches on touch-sensitive displays also applies to other forms of user inputs to operate multifunction devices 100 with input devices, not all of which are initiated on touch screens. For example, mouse movement and mouse button presses, optionally coordinated with single or multiple keyboard presses or holds; contact movements such as taps, drags, scrolls, etc. on touchpads; pen stylus inputs; movement of the device; oral instructions; detected eye movements; biometric inputs; and/or any combination thereof are optionally utilized as inputs corresponding to sub-events which define an event to be recognized.

Figure 2:
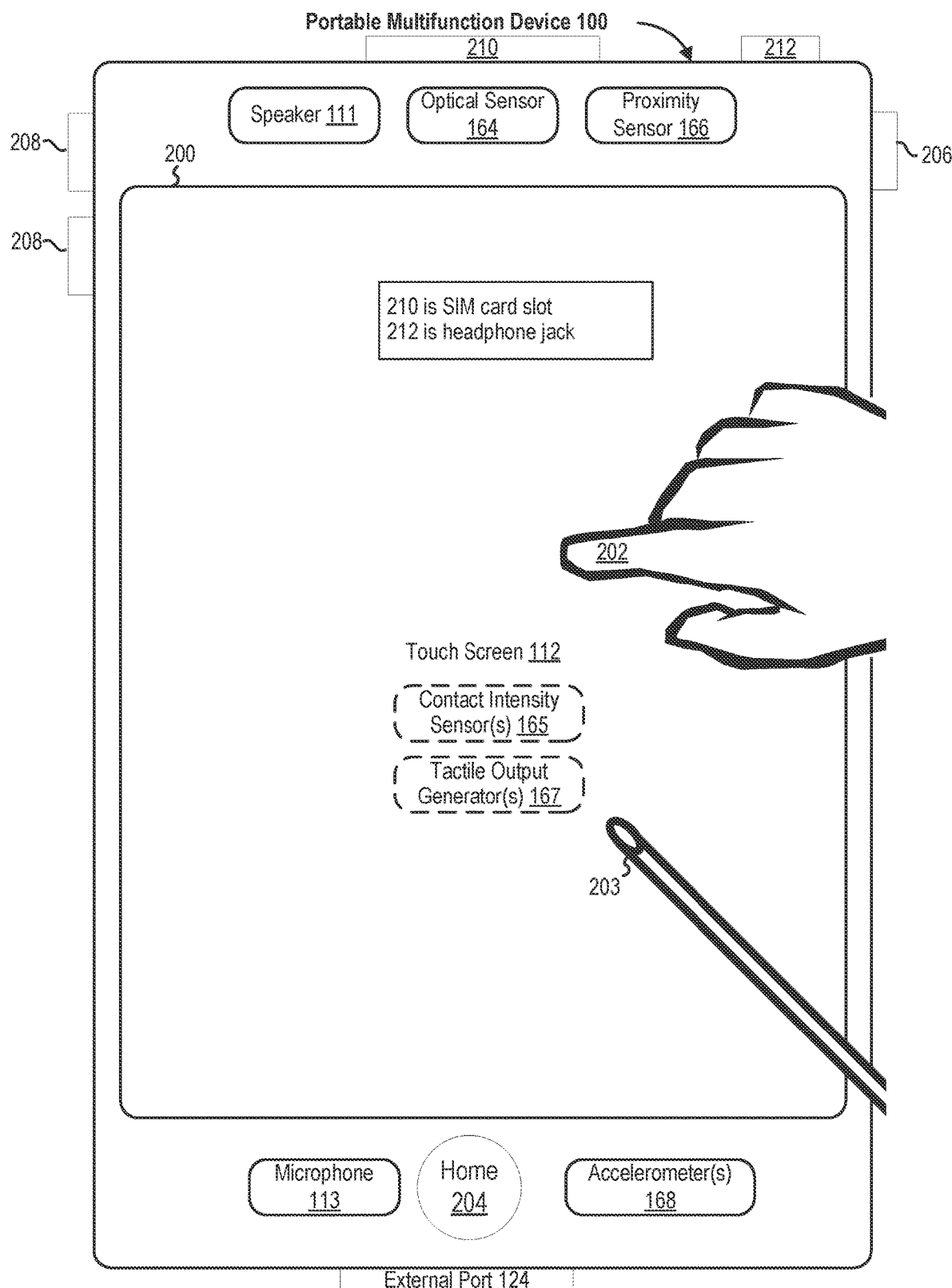
FIG. 2 illustrates a portable multifunction device having a touch screen in accordance with some embodiments.

FIG. 2 illustrates a portable multifunction device 100 having a touch screen 112 in accordance with some embodiments. The touch screen optionally displays one or more graphics within user interface (UI) 200. In this embodiment, as well as others described below, a user is enabled to select one or more of the graphics by making a gesture on the graphics, for example, with one or more fingers 202 (not drawn to scale in the figure) or one or more styluses 203 (not drawn to scale in the figure). In some embodiments, selection of one or more graphics occurs when the user breaks contact with the one or more graphics. In some embodiments, the gesture optionally includes one or more taps, one or more swipes (from left to right, right to left, upward and/or downward), and/or a rolling of a finger (from right to left, left to right, upward and/or downward) that has made contact with device 100. In some implementations or circumstances, inadvertent contact with a graphic does not select the graphic. For example, a swipe gesture that sweeps over an application icon optionally does not select the corresponding application when the gesture corresponding to selection is a tap.

Device 100 optionally also include one or more physical buttons, such as "home" or menu button 204. As described previously, menu button 204 is, optionally, used to navigate to any application 136 in a set of applications that are, optionally, executed on device 100. Alternatively, in some embodiments, the menu button is implemented as a soft key in a GUI displayed on touch screen 112.

In some embodiments, device 100 includes touch screen 112, menu button 204, push button 206 for powering the device on/off and locking the device, volume adjustment button(s) 208, subscriber identity module (SIM) card slot 210, headset jack 212, and docking/charging external port 124. Push button 206 is, optionally, used to turn the power on/off on the device by depressing the button and holding the button in the depressed state for a predefined time interval; to lock the device by depressing the button and releasing the button before the predefined time interval has elapsed; and/or to unlock the device or initiate an unlock process. In an alternative embodiment, device 100 also accepts verbal input for activation or deactivation of some functions through microphone 113. Device 100 also, optionally, includes one or more contact intensity sensors 165 for detecting intensity of contacts on touch screen 112 and/or one or more tactile output generators 167 for generating tactile outputs for a user of device 100.

FIG. 3 is a block diagram of an exemplary multifunction device with a display and a touch-sensitive surface in accordance with some embodiments. Device 300 need not be portable. In some embodiments, device 300 is a laptop computer, a desktop computer, a tablet computer, a multimedia player device, a navigation device, an educational device (such as a child's learning toy), a gaming system, or a control device (e.g., a home or industrial controller). Device 300 typically includes one or more processing units (CPUs) 310, one or more network or other communications interfaces 360, memory 370, and one or more communication buses 320 for interconnecting these components. Communication buses 320 optionally include circuitry (sometimes called a chipset) that interconnects and controls communications between system components. Device 300 includes input/output (I/O) interface 330 comprising display 340, which is typically a touch screen display. I/O interface 330 also optionally includes a keyboard and/or mouse (or other pointing device) 350 and touchpad 355, tactile output generator 357 for generating tactile outputs on device 300 (e.g., similar to tactile output generator(s) 167 described above with reference to FIG. 1A), sensors 359 (e.g., optical, acceleration, proximity, touch-sensitive, and/or contact intensity sensors similar to contact intensity sensor(s) 165 described above with reference to FIG. 1A). Memory 370 includes high-speed random access memory, such as DRAM, SRAM, DDR RAM, or other random access solid state memory devices; and optionally includes non-volatile memory, such as one or more magnetic disk storage devices, optical disk storage devices, flash memory devices, or other non-volatile solid state storage devices. Memory 370 optionally includes one or more storage devices remotely located from CPU(s) 310. In some embodiments, memory 370 stores programs, modules, and data structures analogous to the programs, modules, and data structures stored in memory 102 of portable multifunction device 100 (FIG. 1A), or a subset thereof. Furthermore, memory 370 optionally stores additional programs, modules, and data structures not present in memory 102 of portable multifunction device 100. For example, memory 370 of device 300 optionally stores drawing module 380, presentation module 382, word processing module 384, website creation module 386, disk authoring module 388, and/or spreadsheet module 390, while memory 102 of portable multifunction device 100 (FIG. 1A) optionally does not store these modules.

Each of the above-identified elements in FIG. 3 is, optionally, stored in one or more of the previously mentioned memory devices. Each of the above-identified modules corresponds to a set of instructions for performing a function described above. The above-identified modules or programs (e.g., sets of instructions) need not be implemented as separate software programs, procedures, or modules, and thus various subsets of these modules are, optionally, combined or otherwise rearranged in various embodiments. In some embodiments, memory 370 optionally stores a subset of the modules and data structures identified above. Furthermore, memory 370 optionally stores additional modules and data structures not described above.

Attention is now directed towards embodiments of user interfaces that are, optionally, implemented on, for example, portable multifunction device 100.

Figure 4A:
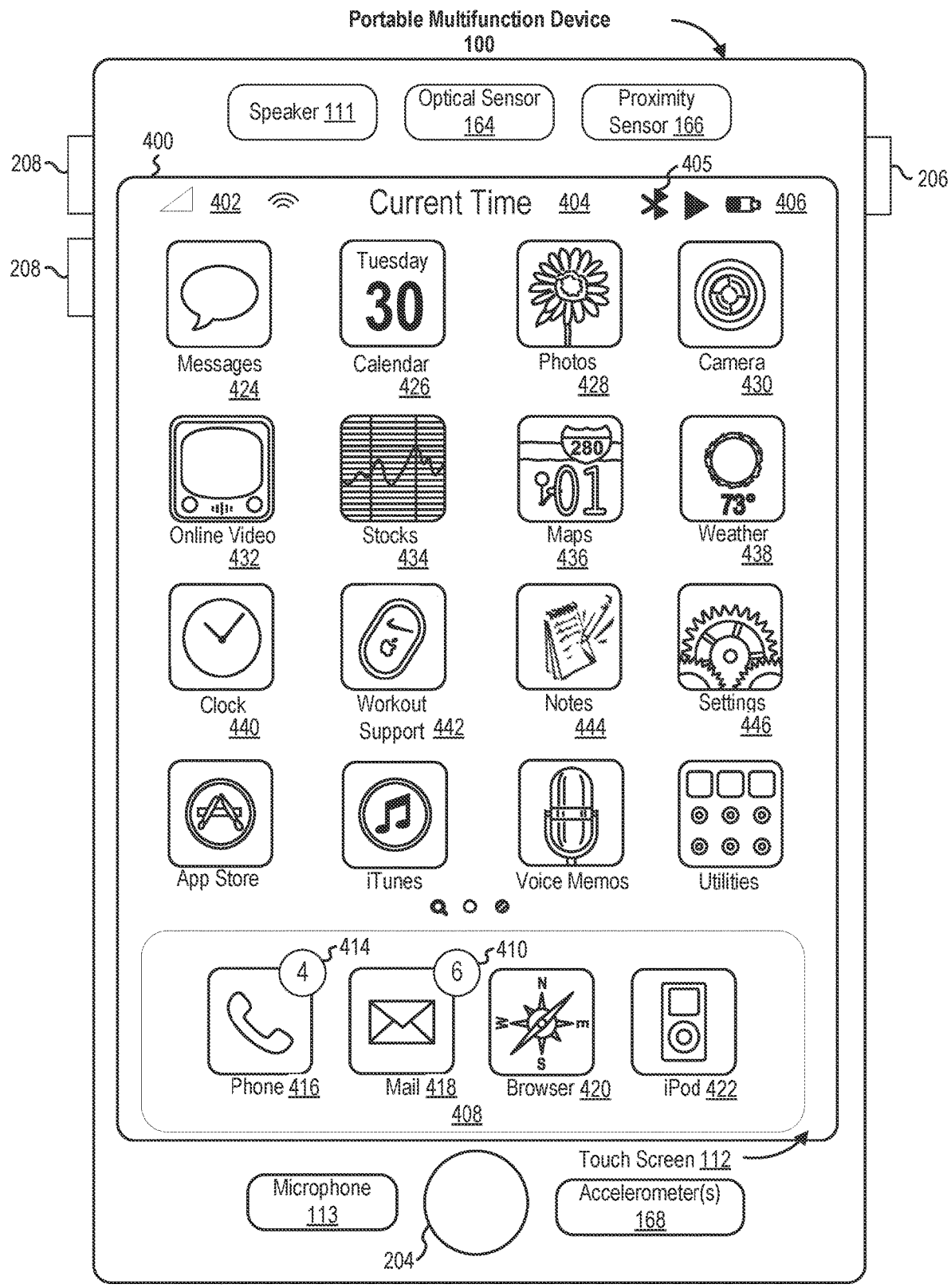
FIG. 4A illustrates an exemplary user interface for a menu of applications on a portable multifunction device in accordance with some embodiments.

FIG. 4A illustrates an exemplary user interface for a menu of applications on portable multifunction device 100 in accordance with some embodiments. Similar user interfaces are, optionally, implemented on device 300. In some embodiments, user interface 400 includes the following elements, or a subset or superset thereof:

Signal strength indicator(s) 402 for wireless communication(s), such as cellular and Wi-Fi signals;
Time 404;
Bluetooth indicator 405;
Battery status indicator 406;
Tray 408 with icons for frequently used applications, such as:
  Icon 416 for telephone module 138, labeled "Phone," which optionally includes an indicator 414 of the number of missed calls or voicemail messages;
  Icon 418 for e-mail client module 140, labeled "Mail," which optionally includes an indicator 410 of the number of unread e-mails;
  Icon 420 for browser module 147, labeled "Browser;" and
  Icon 422 for video and music player module 152, also referred to as iPod (trademark of Apple Inc.) module 152, labeled "iPod;" and
Icons for other applications, such as:
  Icon 424 for IM module 141, labeled "Messages;"
  Icon 426 for calendar module 148, labeled "Calendar;"
  Icon 428 for image management module 144, labeled "Photos;"
  Icon 430 for camera module 143, labeled "Camera;"
  Icon 432 for online video module 155, labeled "Online Video;"
  Icon 434 for stocks widget 149-2, labeled "Stocks;"
  Icon 436 for map module 154, labeled "Maps;"
  Icon 438 for weather widget 149-1, labeled "Weather;"
  Icon 440 for alarm clock widget 149-4, labeled "Clock;"
  Icon 442 for workout support module 142, labeled "Workout Support;"
  Icon 444 for notes module 153, labeled "Notes;" and
  Icon 446 for a settings application or module, labeled "Settings," which provides access to settings for device 100 and its various applications 136.

It should be noted that the icon labels illustrated in FIG. 4A are merely exemplary. For example, icon 422 for video and music player module 152 is labeled "Music" or "Music Player." Other labels are, optionally, used for various application icons. In some embodiments, a label for a respective application icon includes a name of an application corresponding to the respective application icon. In some embodiments, a label for a particular application icon is distinct from a name of an application corresponding to the particular application icon.

Figure 4B:
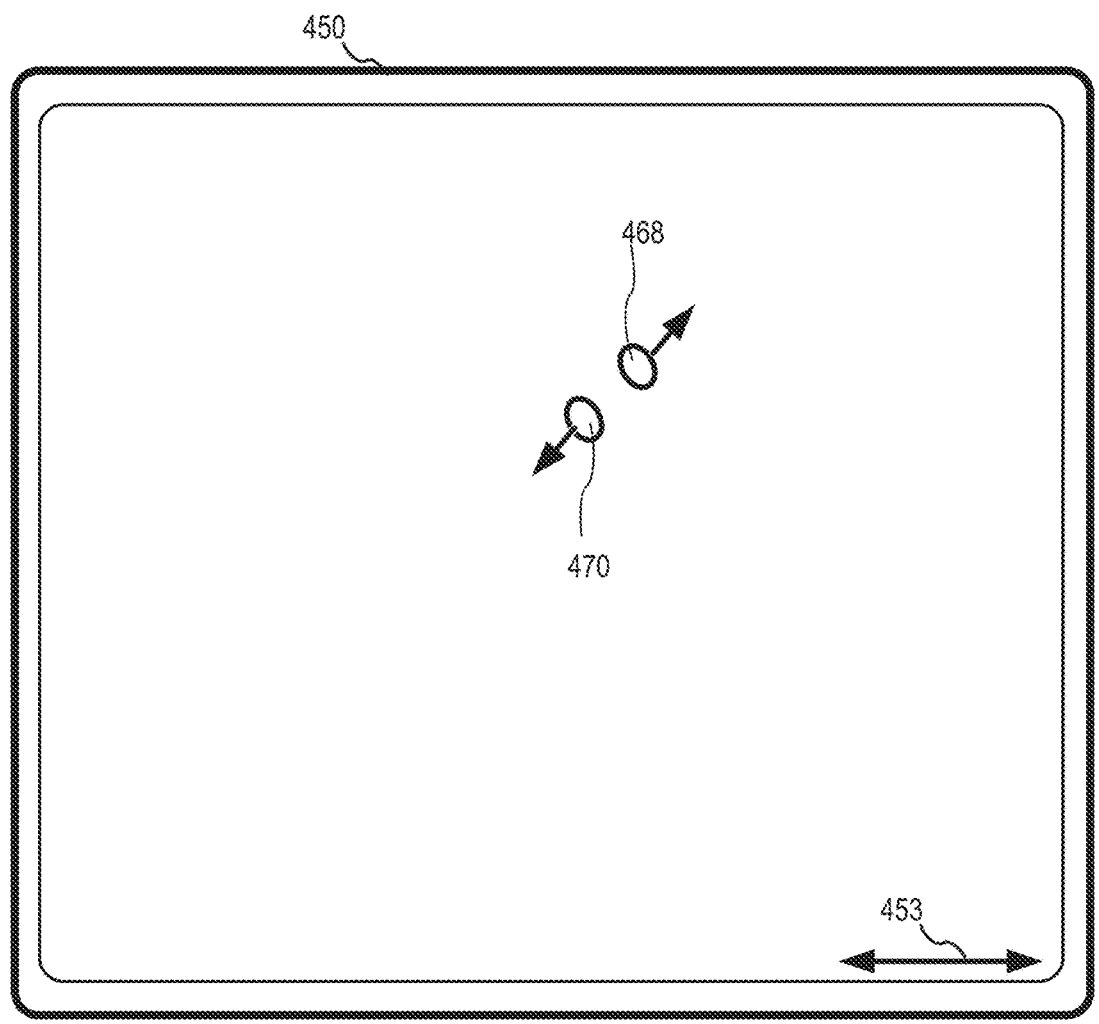
FIG. 4B illustrates an exemplary user interface for a multifunction device with a touch-sensitive surface that is separate from the display in accordance with some embodiments.
Figure 4B:
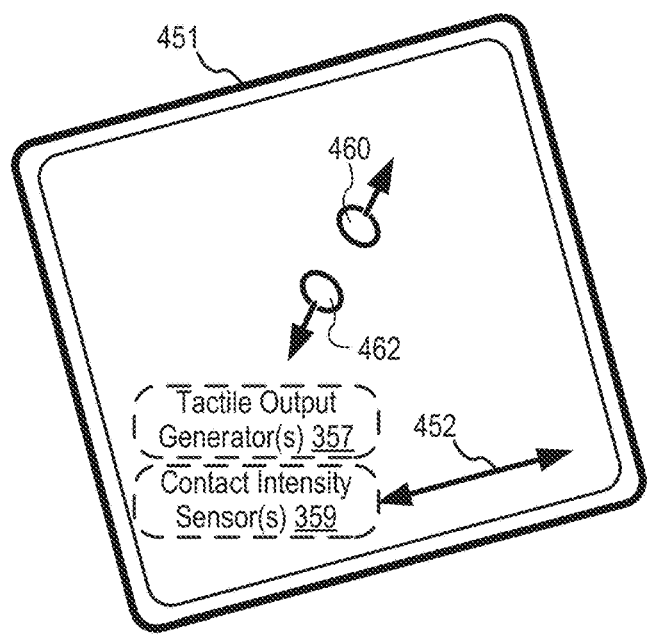

FIG. 4B illustrates an exemplary user interface on a device (e.g., device 300, FIG. 3) with a touch-sensitive surface 451 (e.g., a tablet or touchpad 355, FIG. 3) that is separate from the display 450 (e.g., touch screen display 112). Device 300 also, optionally, includes one or more contact intensity sensors (e.g., one or more of sensors 359) for detecting intensity of contacts on touch-sensitive surface 451 and/or one or more tactile output generators 357 for generating tactile outputs for a user of device 300.

Although some of the examples that follow will be given with reference to inputs on touch screen display 112 (where the touch-sensitive surface and the display are combined), in some embodiments, the device detects inputs on a touch-sensitive surface that is separate from the display, as shown in FIG. 4B. In some embodiments, the touch-sensitive surface (e.g., 451 in FIG. 4B) has a primary axis (e.g., 452 in FIG. 4B) that corresponds to a primary axis (e.g., 453 in FIG. 4B) on the display (e.g., 450). In accordance with these embodiments, the device detects contacts (e.g., 460 and 462 in FIG. 4B) with the touch-sensitive surface 451 at locations that correspond to respective locations on the display (e.g., in FIG. 4B, 460 corresponds to 468 and 462 corresponds to 470). In this way, user inputs (e.g., contacts 460 and 462, and movements thereof) detected by the device on the touch-sensitive surface (e.g., 451 in FIG. 4B) are used by the device to manipulate the user interface on the display (e.g., 450 in FIG. 4B) of the multifunction device when the touch-sensitive surface is separate from the display. It should be understood that similar methods are, optionally, used for other user interfaces described herein.

Additionally, while the following examples are given primarily with reference to finger inputs (e.g., finger contacts, finger tap gestures, finger swipe gestures), it should be understood that, in some embodiments, one or more of the finger inputs are replaced with input from another input device (e.g., a mouse-based input or stylus input). For example, a swipe gesture is, optionally, replaced with a mouse click (e.g., instead of a contact) followed by movement of the cursor along the path of the swipe (e.g., instead of movement of the contact). As another example, a tap gesture is, optionally, replaced with a mouse click while the cursor is located over the location of the tap gesture (e.g., instead of detection of the contact followed by ceasing to detect the contact). Similarly, when multiple user inputs are simultaneously detected, it should be understood that multiple computer mice are, optionally, used simultaneously, or a mouse and finger contacts are, optionally, used simultaneously.

Figure 5A:
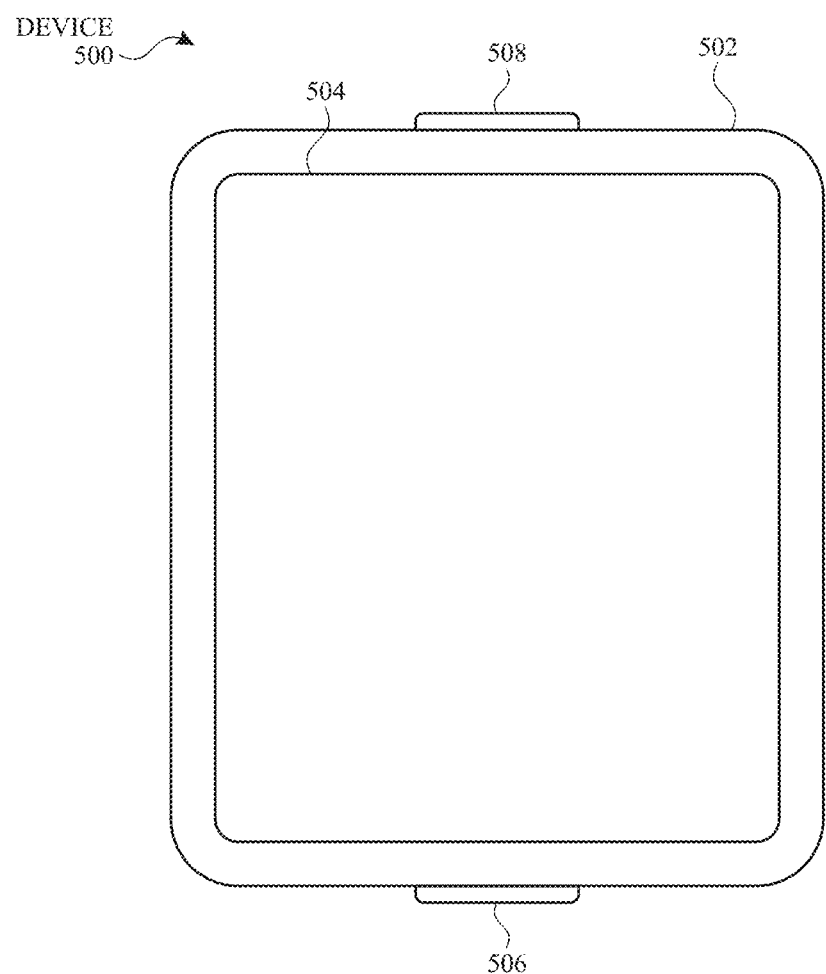
FIG. 5A illustrates a personal electronic device in accordance with some embodiments.

FIG. 5A illustrates exemplary personal electronic device 500. Device 500 includes body 502. In some embodiments, device 500 can include some or all of the features described with respect to devices 100 and 300 (e.g., FIGS. 1A-4B). In some embodiments, device 500 has touch-sensitive display screen 504, hereafter touch screen 504. Alternatively, or in addition to touch screen 504, device 500 has a display and a touch-sensitive surface. As with devices 100 and 300, in some embodiments, touch screen 504 (or the touch-sensitive surface) optionally includes one or more intensity sensors for detecting intensity of contacts (e.g., touches) being applied. The one or more intensity sensors of touch screen 504 (or the touch-sensitive surface) can provide output data that represents the intensity of touches. The user interface of device 500 can respond to touches based on their intensity, meaning that touches of different intensities can invoke different user interface operations on device 500.

Exemplary techniques for detecting and processing touch intensity are found, for example, in related applications: International Patent Application Serial No. PCT/US2013/040061, titled "Device, Method, and Graphical User Interface for Displaying User Interface Objects Corresponding to an Application," filed May 8, 2013, published as WIPO Publication No. WO/2013/169849, and International Patent Application Serial No. PCT/US2013/069483, titled "Device, Method, and Graphical User Interface for Transitioning Between Touch Input to Display Output Relationships," filed Nov. 11, 2013, published as WIPO Publication No. WO/2014/105276, each of which is hereby incorporated by reference in their entirety.

In some embodiments, device 500 has one or more input mechanisms 506 and 508. Input mechanisms 506 and 508, if included, can be physical. Examples of physical input mechanisms include push buttons and rotatable mechanisms. In some embodiments, device 500 has one or more attachment mechanisms. Such attachment mechanisms, if included, can permit attachment of device 500 with, for example, hats, eyewear, earrings, necklaces, shirts, jackets, bracelets, watch straps, chains, trousers, belts, shoes, purses, backpacks, and so forth. These attachment mechanisms permit device 500 to be worn by a user.

Figure 5B:
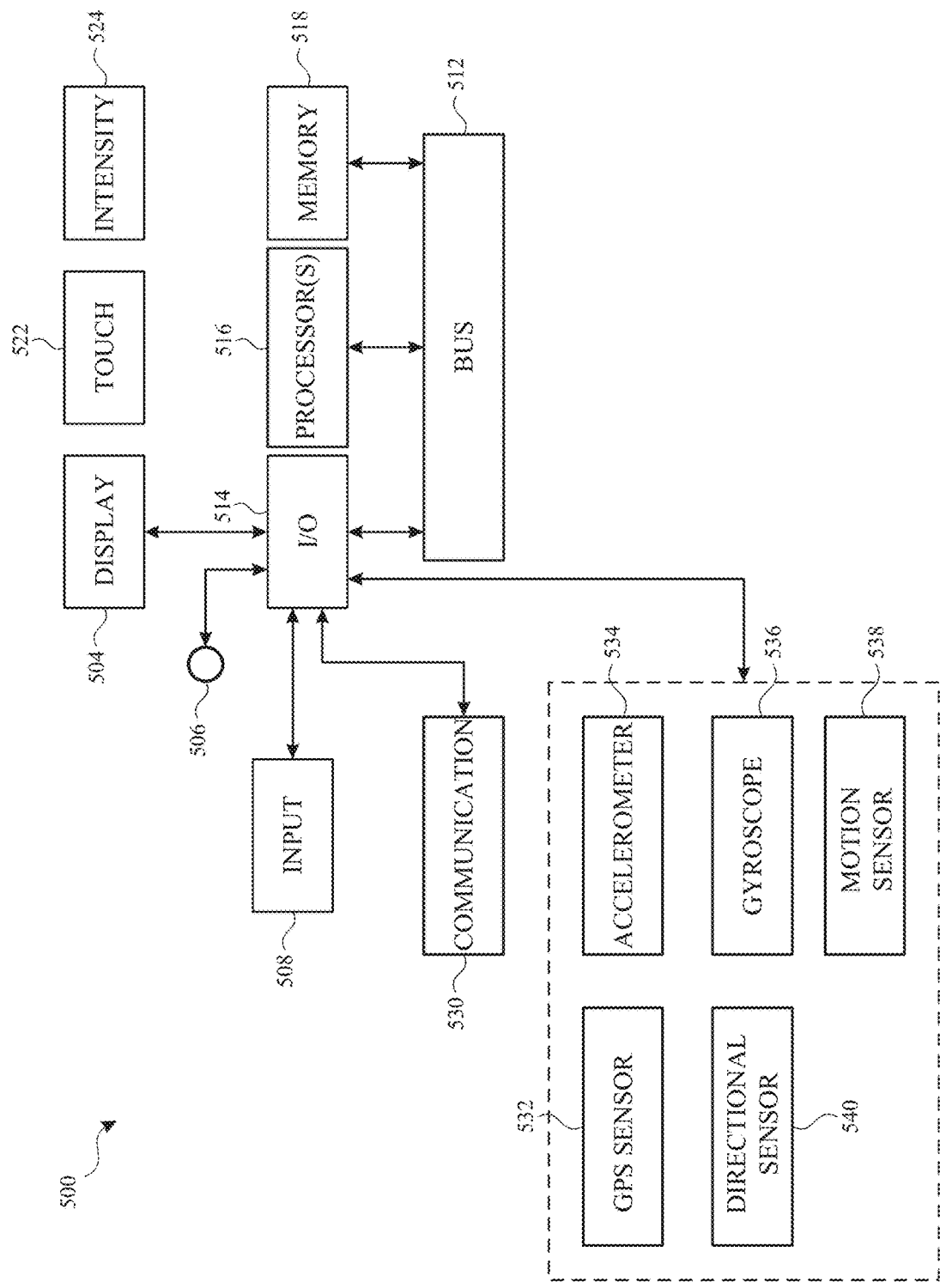
FIG. 5B is a block diagram illustrating a personal electronic device in accordance with some embodiments.

FIG. 5B depicts exemplary personal electronic device 500. In some embodiments, device 500 can include some or all of the components described with respect to FIGS. 1A, 1B, and 3. Device 500 has bus 512 that operatively couples I/O section 514 with one or more computer processors 516 and memory 518. I/O section 514 can be connected to display 504, which can have touch-sensitive component 522 and, optionally, intensity sensor 524 (e.g., contact intensity sensor). In addition, I/O section 514 can be connected with communication unit 530 for receiving application and operating system data, using Wi-Fi, Bluetooth, near field communication (NFC), cellular, and/or other wireless communication techniques. Device 500 can include input mechanisms 506 and/or 508. Input mechanism 506 is, optionally, a rotatable input device or a depressible and rotatable input device, for example. Input mechanism 508 is, optionally, a button, in some examples.

Input mechanism 508 is, optionally, a microphone, in some examples. Personal electronic device 500 optionally includes various sensors, such as GPS sensor 532, accelerometer 534, directional sensor 540 (e.g., compass), gyroscope 536, motion sensor 538, and/or a combination thereof, all of which can be operatively connected to I/O section 514.

Memory 518 of personal electronic device 500 can include one or more non-transitory computer-readable storage mediums, for storing computer-executable instructions, which, when executed by one or more computer processors 516, for example, can cause the computer processors to perform the techniques described below, including process 700 (FIG. 7). A computer-readable storage medium can be any medium that can tangibly contain or store computer-executable instructions for use by or in connection with the instruction execution system, apparatus, or device. In some examples, the storage medium is a transitory computer-readable storage medium. In some examples, the storage medium is a non-transitory computer-readable storage medium. The non-transitory computer-readable storage medium can include, but is not limited to, magnetic, optical, and/or semiconductor storages. Examples of such storage include magnetic disks, optical discs based on CD, DVD, or Blu-ray technologies, as well as persistent solid-state memory such as flash, solid-state drives, and the like. Personal electronic device 500 is not limited to the components and configuration of FIG. 5B, but can include other or additional components in multiple configurations.

As used here, the term "affordance" refers to a user-interactive graphical user interface object that is, optionally, displayed on the display screen of devices 100, 300, and/or 500 (FIGS. 1A, 3, and 5A-5B). For example, an image (e.g., icon), a button, and text (e.g., hyperlink) each optionally constitute an affordance.

As used herein, the term "focus selector" refers to an input element that indicates a current part of a user interface with which a user is interacting. In some implementations that include a cursor or other location marker, the cursor acts as a "focus selector" so that when an input (e.g., a press input) is detected on a touch-sensitive surface (e.g., touchpad 355 in FIG. 3 or touch-sensitive surface 451 in FIG. 4B) while the cursor is over a particular user interface element (e.g., a button, window, slider, or other user interface element), the particular user interface element is adjusted in accordance with the detected input. In some implementations that include a touch screen display (e.g., touch-sensitive display system 112 in FIG. 1A or touch screen 112 in FIG. 4A) that enables direct interaction with user interface elements on the touch screen display, a detected contact on the touch screen acts as a "focus selector" so that when an input (e.g., a press input by the contact) is detected on the touch screen display at a location of a particular user interface element (e.g., a button, window, slider, or other user interface element), the particular user interface element is adjusted in accordance with the detected input. In some implementations, focus is moved from one region of a user interface to another region of the user interface without corresponding movement of a cursor or movement of a contact on a touch screen display (e.g., by using a tab key or arrow keys to move focus from one button to another button); in these implementations, the focus selector moves in accordance with movement of focus between different regions of the user interface. Without regard to the specific form taken by the focus selector, the focus selector is generally the user interface element (or contact on a touch screen display) that is controlled by the user so as to communicate the user's intended interaction with the user interface (e.g., by indicating, to the device, the element of the user interface with which the user is intending to interact). For example, the location of a focus selector (e.g., a cursor, a contact, or a selection box) over a respective button while a press input is detected on the touch-sensitive surface (e.g., a touchpad or touch screen) will indicate that the user is intending to activate the respective button (as opposed to other user interface elements shown on a display of the device).

As used in the specification and claims, the term "characteristic intensity" of a contact refers to a characteristic of the contact based on one or more intensities of the contact. In some embodiments, the characteristic intensity is based on multiple intensity samples. The characteristic intensity is, optionally, based on a predefined number of intensity samples, or a set of intensity samples collected during a predetermined time period (e.g., 0.05, 0.1, 0.2, 0.5, 1, 2, 5, 10 seconds) relative to a predefined event (e.g., after detecting the contact, prior to detecting liftoff of the contact, before or after detecting a start of movement of the contact, prior to detecting an end of the contact, before or after detecting an increase in intensity of the contact, and/or before or after detecting a decrease in intensity of the contact). A characteristic intensity of a contact is, optionally, based on one or more of: a maximum value of the intensities of the contact, a mean value of the intensities of the contact, an average value of the intensities of the contact, a top 10 percentile value of the intensities of the contact, a value at the half maximum of the intensities of the contact, a value at the 90 percent maximum of the intensities of the contact, or the like. In some embodiments, the duration of the contact is used in determining the characteristic intensity (e.g., when the characteristic intensity is an average of the intensity of the contact over time). In some embodiments, the characteristic intensity is compared to a set of one or more intensity thresholds to determine whether an operation has been performed by a user. For example, the set of one or more intensity thresholds optionally includes a first intensity threshold and a second intensity threshold. In this example, a contact with a characteristic intensity that does not exceed the first threshold results in a first operation, a contact with a characteristic intensity that exceeds the first intensity threshold and does not exceed the second intensity threshold results in a second operation, and a contact with a characteristic intensity that exceeds the second threshold results in a third operation. In some embodiments, a comparison between the characteristic intensity and one or more thresholds is used to determine whether or not to perform one or more operations (e.g., whether to perform a respective operation or forgo performing the respective operation), rather than being used to determine whether to perform a first operation or a second operation.

Figure 5C:
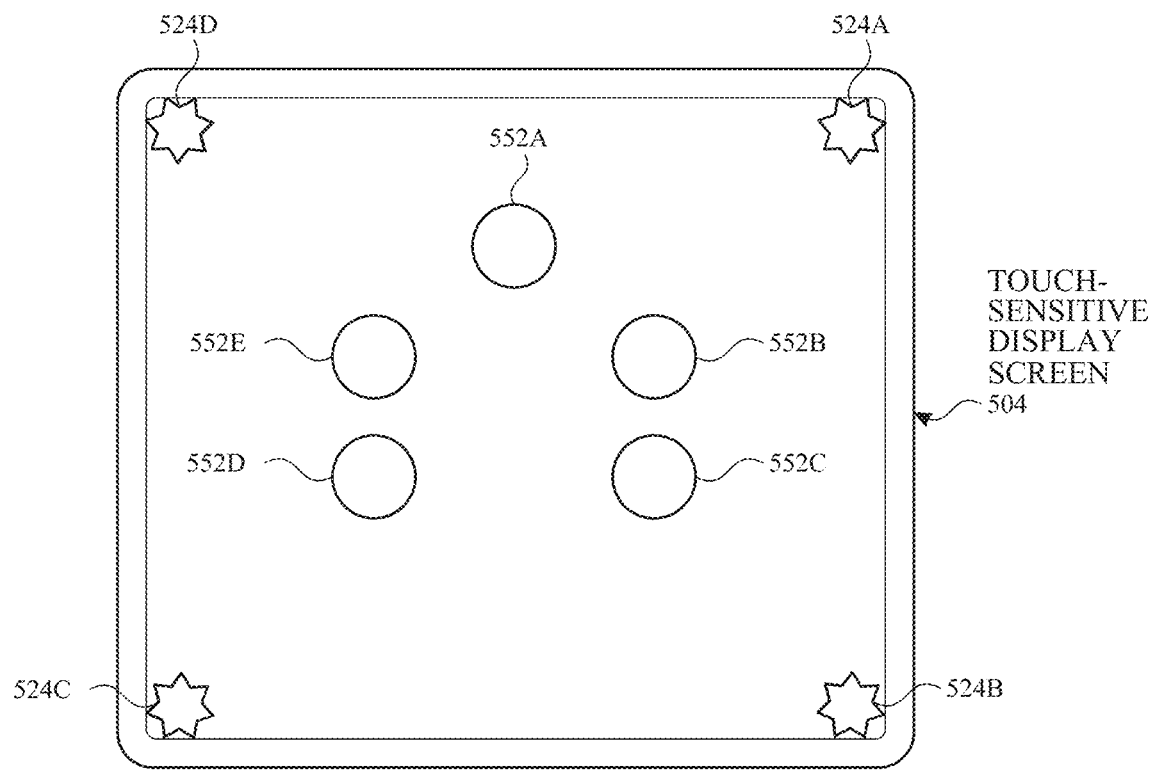
FIGS. 5C-5D illustrate exemplary components of a personal electronic device having a touch-sensitive display and intensity sensors in accordance with some embodiments.
Figure 5C:
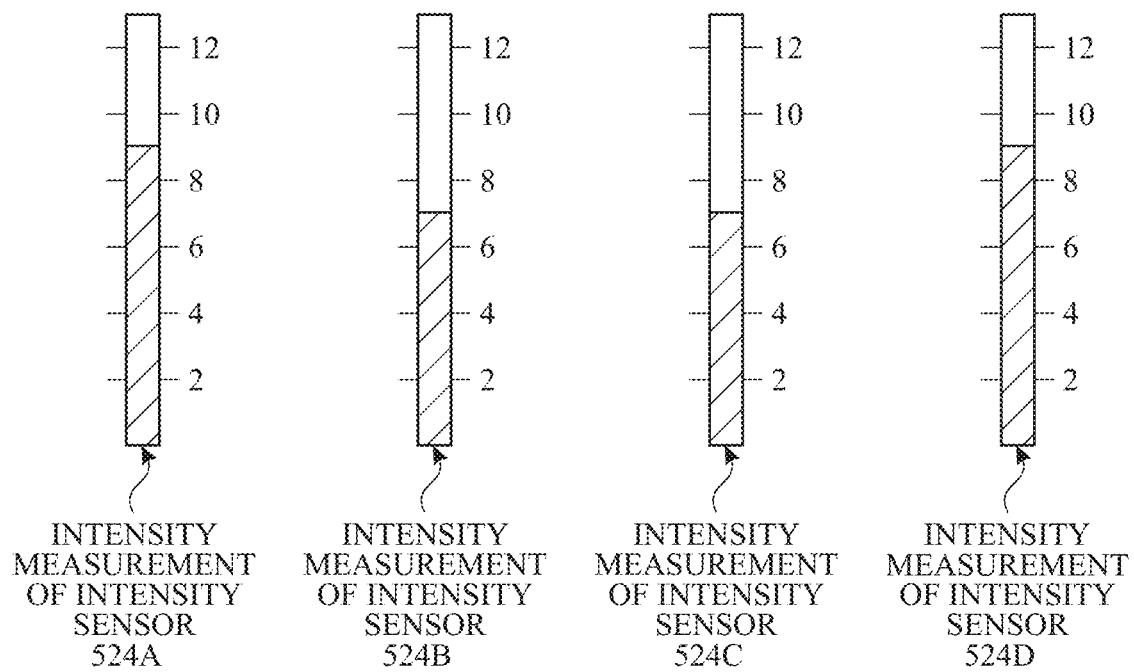
Figure 5D:
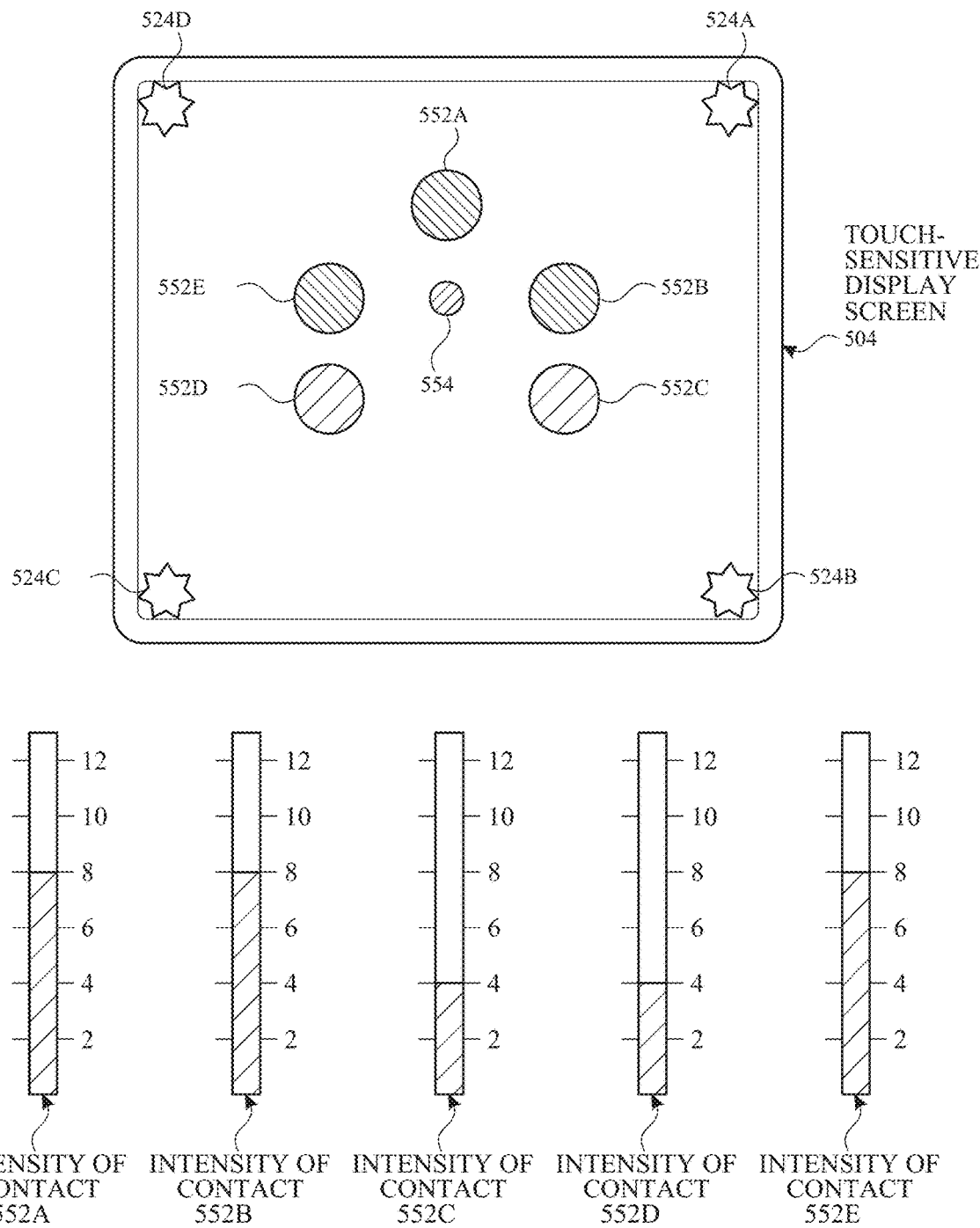

FIG. 5C illustrates detecting a plurality of contacts 552A-552E on touch-sensitive display screen 504 with a plurality of intensity sensors 524A-524D. FIG. 5C additionally includes intensity diagrams that show the current intensity measurements of the intensity sensors 524A-524D relative to units of intensity. In this example, the intensity measurements of intensity sensors 524A and 524D are each 9 units of intensity, and the intensity measurements of intensity sensors 524B and 524C are each 7 units of intensity. In some implementations, an aggregate intensity is the sum of the intensity measurements of the plurality of intensity sensors 524A-524D, which in this example is 32 intensity units. In some embodiments, each contact is assigned a respective intensity that is a portion of the aggregate intensity. FIG. 5D illustrates assigning the aggregate intensity to contacts 552A-552E based on their distance from the center of force 554. In this example, each of contacts 552A, 552B, and 552E are assigned an intensity of contact of 8 intensity units of the aggregate intensity, and each of contacts 552C and 552D are assigned an intensity of contact of 4 intensity units of the aggregate intensity. More generally, in some implementations, each contact j is assigned a respective intensity Ij that is a portion of the aggregate intensity, A, in accordance with a predefined mathematical function, $Ij=A \cdot (Dj/\Sigma Di)$, where Dj is the distance of the respective contact j to the center of force, and $\Sigma Di$ is the sum of the distances of all the respective contacts (e.g., i=1 to last) to the center of force. The operations described with reference to FIGS. 5C-5D can be performed using an electronic device similar or identical to device 100, 300, or 500. In some embodiments, a characteristic intensity of a contact is based on one or more intensities of the contact. In some embodiments, the intensity sensors are used to determine a single characteristic intensity (e.g., a single characteristic intensity of a single contact). It should be noted that the intensity diagrams are not part of a displayed user interface, but are included in FIGS. 5C-5D to aid the reader.

In some embodiments, a portion of a gesture is identified for purposes of determining a characteristic intensity. For example, a touch-sensitive surface optionally receives a continuous swipe contact transitioning from a start location and reaching an end location, at which point the intensity of the contact increases. In this example, the characteristic intensity of the contact at the end location is, optionally, based on only a portion of the continuous swipe contact, and not the entire swipe contact (e.g., only the portion of the swipe contact at the end location). In some embodiments, a smoothing algorithm is, optionally, applied to the intensities of the swipe contact prior to determining the characteristic intensity of the contact. For example, the smoothing algorithm optionally includes one or more of: an unweighted sliding-average smoothing algorithm, a triangular smoothing algorithm, a median filter smoothing algorithm, and/or an exponential smoothing algorithm. In some circumstances, these smoothing algorithms eliminate narrow spikes or dips in the intensities of the swipe contact for purposes of determining a characteristic intensity.

The intensity of a contact on the touch-sensitive surface is, optionally, characterized relative to one or more intensity thresholds, such as a contact-detection intensity threshold, a light press intensity threshold, a deep press intensity threshold, and/or one or more other intensity thresholds. In some embodiments, the light press intensity threshold corresponds to an intensity at which the device will perform operations typically associated with clicking a button of a physical mouse or a trackpad. In some embodiments, the deep press intensity threshold corresponds to an intensity at which the device will perform operations that are different from operations typically associated with clicking a button of a physical mouse or a trackpad. In some embodiments, when a contact is detected with a characteristic intensity below the light press intensity threshold (e.g., and above a nominal contact-detection intensity threshold below which the contact is no longer detected), the device will move a focus selector in accordance with movement of the contact on the touch-sensitive surface without performing an operation associated with the light press intensity threshold or the deep press intensity threshold. Generally, unless otherwise stated, these intensity thresholds are consistent between different sets of user interface figures.

An increase of characteristic intensity of the contact from an intensity below the light press intensity threshold to an intensity between the light press intensity threshold and the deep press intensity threshold is sometimes referred to as a "light press" input. An increase of characteristic intensity of the contact from an intensity below the deep press intensity threshold to an intensity above the deep press intensity threshold is sometimes referred to as a "deep press" input. An increase of characteristic intensity of the contact from an intensity below the contact-detection intensity threshold to an intensity between the contact-detection intensity threshold and the light press intensity threshold is sometimes referred to as detecting the contact on the touch-surface. A decrease of characteristic intensity of the contact from an intensity above the contact-detection intensity threshold to an intensity below the contact-detection intensity threshold is sometimes referred to as detecting liftoff of the contact from the touch-surface. In some embodiments, the contact-detection intensity threshold is zero. In some embodiments, the contact-detection intensity threshold is greater than zero.

In some embodiments described herein, one or more operations are performed in response to detecting a gesture that includes a respective press input or in response to detecting the respective press input performed with a respective contact (or a plurality of contacts), where the respective press input is detected based at least in part on detecting an increase in intensity of the contact (or plurality of contacts) above a press-input intensity threshold. In some embodiments, the respective operation is performed in response to detecting the increase in intensity of the respective contact above the press-input intensity threshold (e.g., a "down stroke" of the respective press input). In some embodiments, the press input includes an increase in intensity of the respective contact above the press-input intensity threshold and a subsequent decrease in intensity of the contact below the press-input intensity threshold, and the respective operation is performed in response to detecting the subsequent decrease in intensity of the respective contact below the press-input threshold (e.g., an "up stroke" of the respective press input).

Figure 5E:
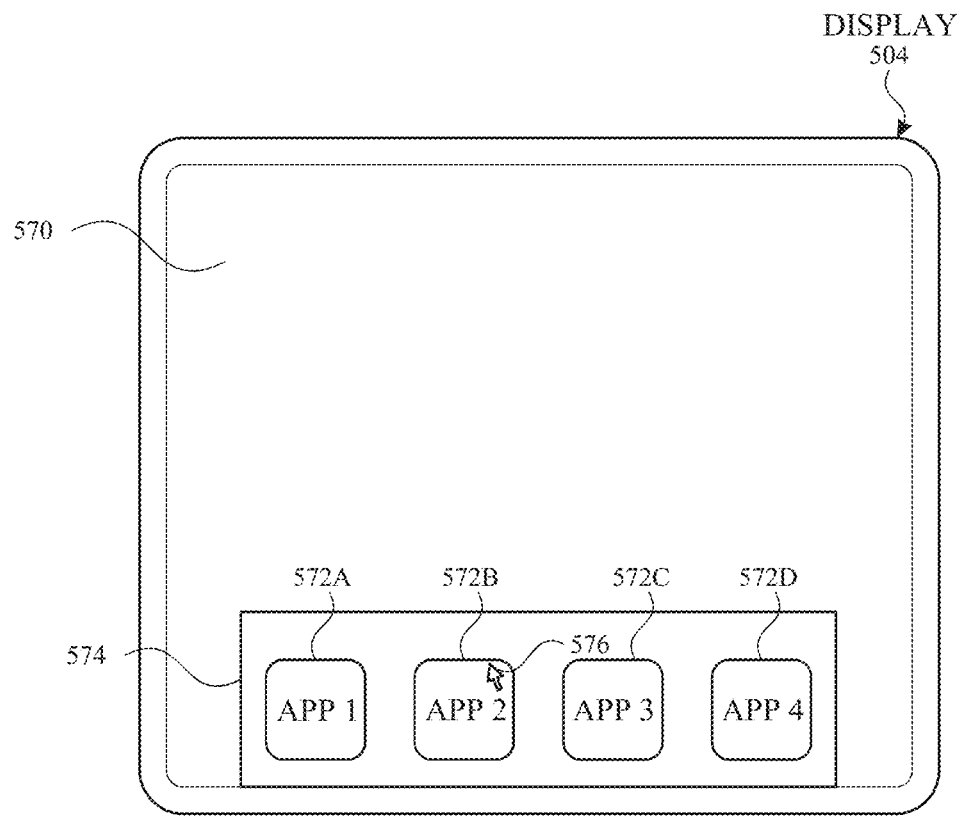
FIGS. 5E-5H illustrate exemplary components and user interfaces of a personal electronic device in accordance with some embodiments.
Figure 5E:
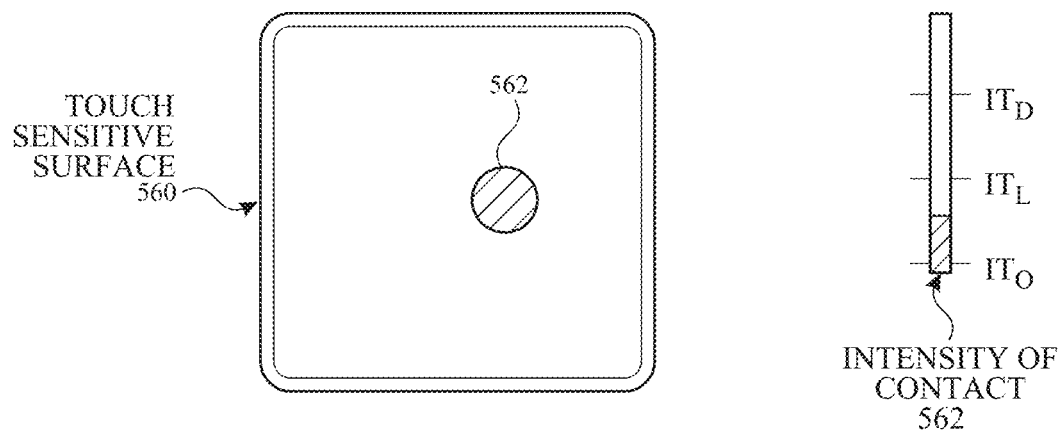
Figure 5F:
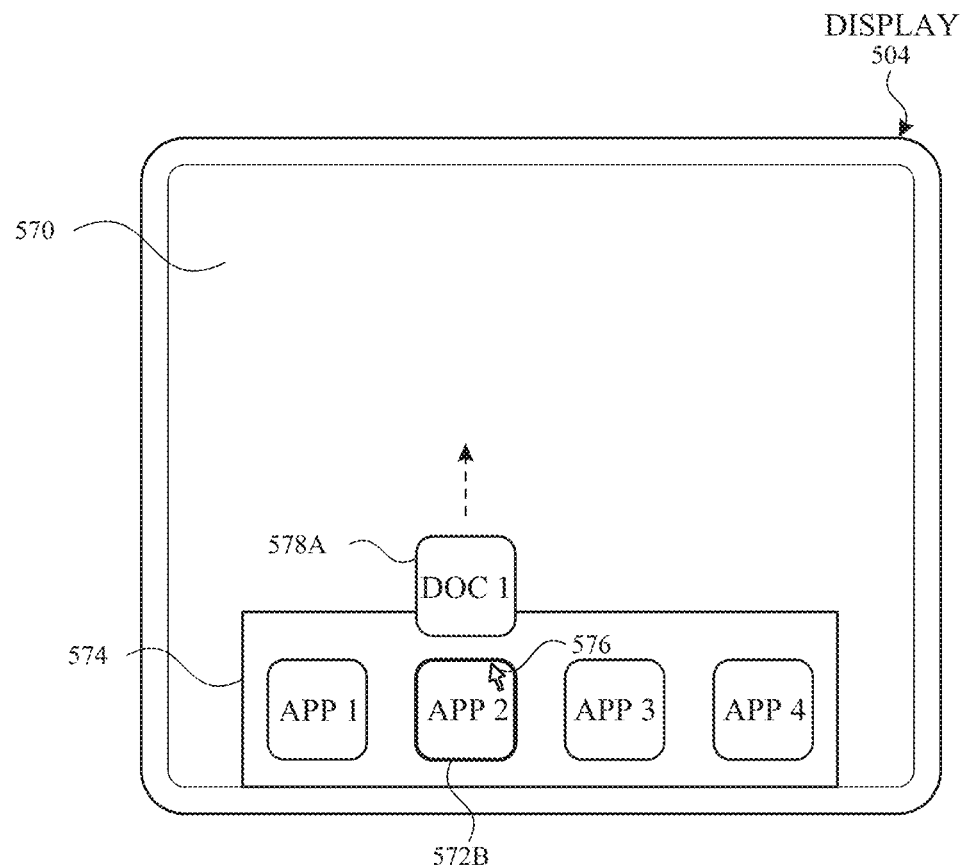
Figure 5F:
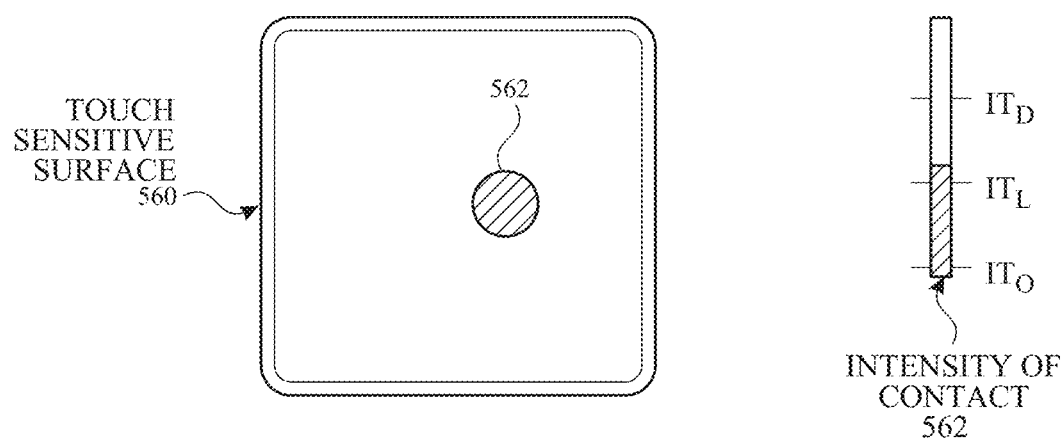
Figure 5G:
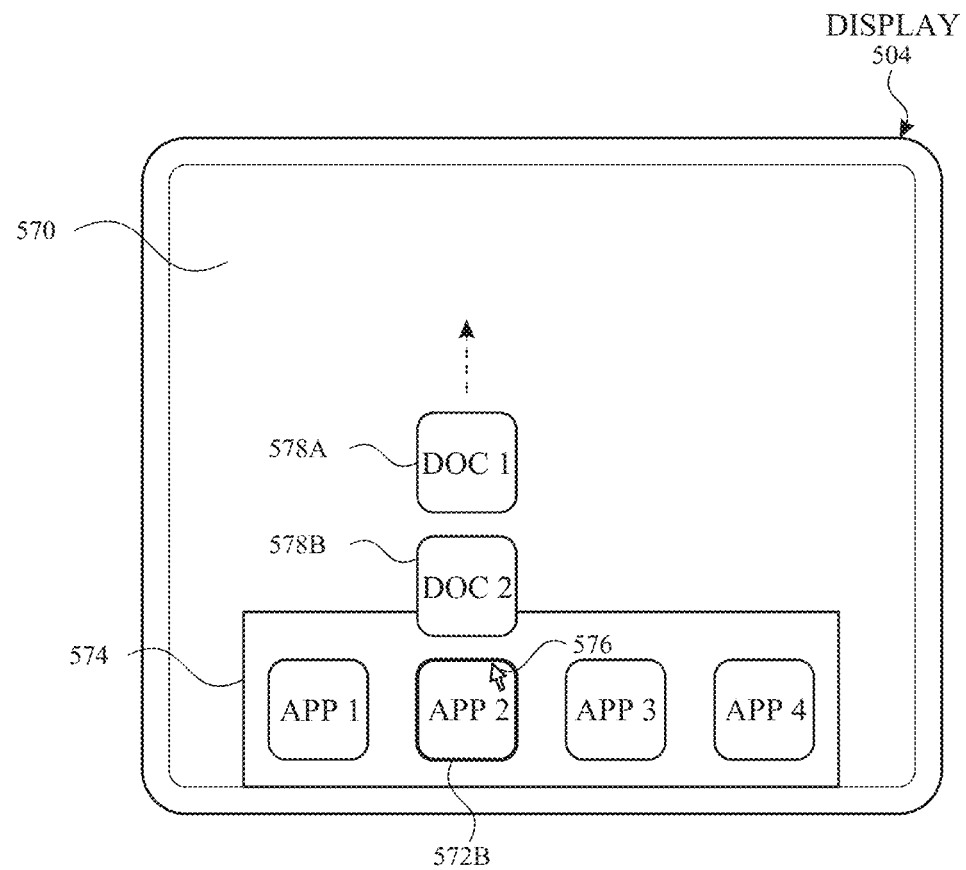
Figure 5G:
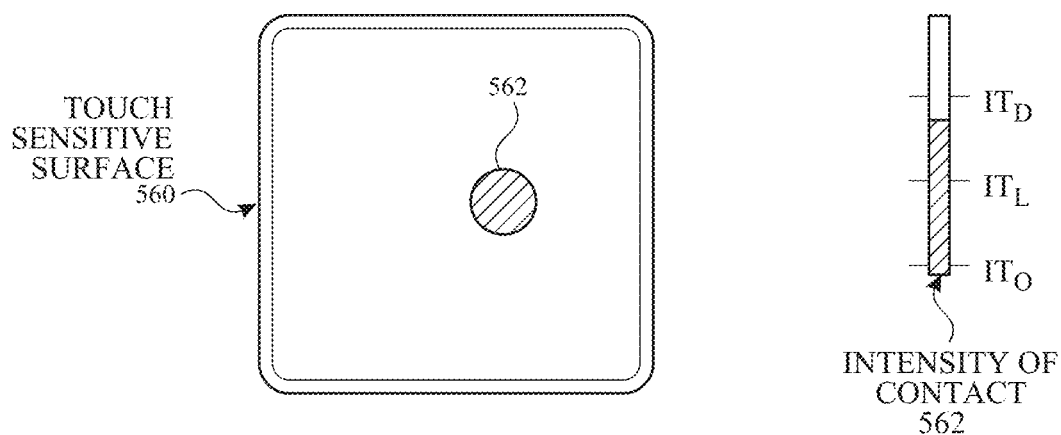
Figure 5H:
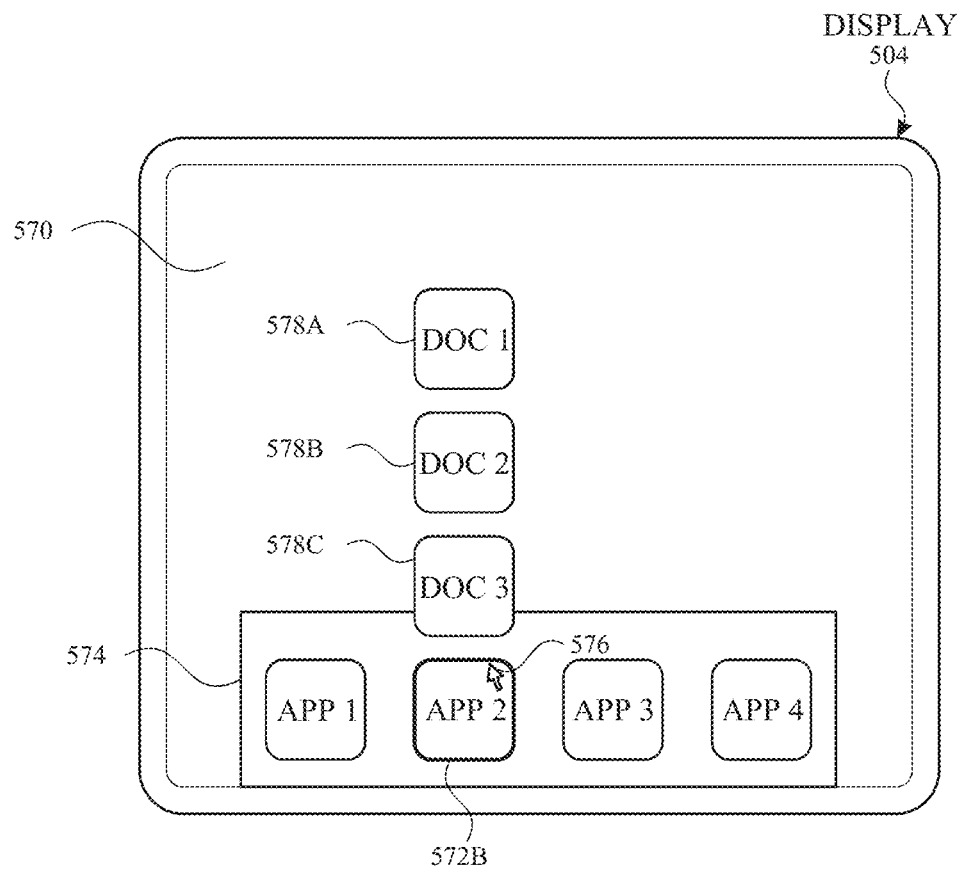

FIGS. 5E-5H illustrate detection of a gesture that includes a press input that corresponds to an increase in intensity of a contact 562 from an intensity below a light press intensity threshold (e.g., "$IT_L$") in FIG. 5E, to an intensity above a deep press intensity threshold (e.g., "$IT_D$") in FIG. 5H. The gesture performed with contact 562 is detected on touch-sensitive surface 560 while cursor 576 is displayed over application icon 572B corresponding to App 2, on a displayed user interface 570 that includes application icons 572A-572D displayed in predefined region 574. In some embodiments, the gesture is detected on touch-sensitive display 504. The intensity sensors detect the intensity of contacts on touch-sensitive surface 560. The device determines that the intensity of contact 562 peaked above the deep press intensity threshold (e.g., "$IT_D$"). Contact 562 is maintained on touch-sensitive surface 560. In response to the detection of the gesture, and in accordance with contact 562 having an intensity that goes above the deep press intensity threshold (e.g., "$IT_D$") during the gesture, reduced-scale representations 578A-578C (e.g., thumbnails) of recently opened documents for App 2 are displayed, as shown in FIGS. 5F-5H. In some embodiments, the intensity, which is compared to the one or more intensity thresholds, is the characteristic intensity of a contact. It should be noted that the intensity diagram for contact 562 is not part of a displayed user interface, but is included in FIGS. 5E-5H to aid the reader.

In some embodiments, the display of representations 578A-578C includes an animation. For example, representation 578A is initially displayed in proximity of application icon 572B, as shown in FIG. 5F. As the animation proceeds, representation 578A moves upward and representation 578B is displayed in proximity of application icon 572B, as shown in FIG. 5G. Then, representations 578A moves upward, 578B moves upward toward representation 578A, and representation 578C is displayed in proximity of application icon 572B, as shown in FIG. 5H. Representations 578A-578C form an array above icon 572B. In some embodiments, the animation progresses in accordance with an intensity of contact 562, as shown in FIGS. 5F-5G, where the representations 578A-578C appear and move upwards as the intensity of contact 562 increases toward the deep press intensity threshold (e.g., "ITS"). In some embodiments, the intensity, on which the progress of the animation is based, is the characteristic intensity of the contact. The operations described with reference to FIGS. 5E-5H can be performed using an electronic device similar or identical to device 100, 300, or 500.

In some embodiments, the device employs intensity hysteresis to avoid accidental inputs sometimes termed "jitter," where the device defines or selects a hysteresis intensity threshold with a predefined relationship to the press-input intensity threshold (e.g., the hysteresis intensity threshold is X intensity units lower than the press-input intensity threshold or the hysteresis intensity threshold is 75%, 90%, or some reasonable proportion of the press-input intensity threshold). Thus, in some embodiments, the press input includes an increase in intensity of the respective contact above the press-input intensity threshold and a subsequent decrease in intensity of the contact below the hysteresis intensity threshold that corresponds to the press-input intensity threshold, and the respective operation is performed in response to detecting the subsequent decrease in intensity of the respective contact below the hysteresis intensity threshold (e.g., an "up stroke" of the respective press input). Similarly, in some embodiments, the press input is detected only when the device detects an increase in intensity of the contact from an intensity at or below the hysteresis intensity threshold to an intensity at or above the press-input intensity threshold and, optionally, a subsequent decrease in intensity of the contact to an intensity at or below the hysteresis intensity, and the respective operation is performed in response to detecting the press input (e.g., the increase in intensity of the contact or the decrease in intensity of the contact, depending on the circumstances).

For ease of explanation, the descriptions of operations performed in response to a press input associated with a press-input intensity threshold or in response to a gesture including the press input are, optionally, triggered in response to detecting either: an increase in intensity of a contact above the press-input intensity threshold, an increase in intensity of a contact from an intensity below the hysteresis intensity threshold to an intensity above the press-input intensity threshold, a decrease in intensity of the contact below the press-input intensity threshold, and/or a decrease in intensity of the contact below the hysteresis intensity threshold corresponding to the press-input intensity threshold. Additionally, in examples where an operation is described as being performed in response to detecting a decrease in intensity of a contact below the press-input intensity threshold, the operation is, optionally, performed in response to detecting a decrease in intensity of the contact below a hysteresis intensity threshold corresponding to, and lower than, the press-input intensity threshold.

In some embodiments, electronic device 500 includes one or more tactile output generators, where the one or more tactile output generators generate different types of tactile output sequences, as described below in Table 1. In some embodiments, a particular type of tactile output sequence generated by the one or more tactile output generators of the device corresponds to a particular tactile output pattern. For example, a tactile output pattern specifies characteristics of a tactile output, such as the amplitude of the tactile output, the shape of a movement waveform of the tactile output, the frequency of the tactile output, and/or the duration of the tactile output. When tactile outputs with different tactile output patterns are generated by a device (e.g., via one or more tactile output generators that move a moveable mass to generate tactile outputs), the tactile outputs may invoke different haptic sensations in a user holding or touching the device. While the sensation of the user is based on the user's perception of the tactile output, most users will be able to identify changes in waveform, frequency, and amplitude of tactile outputs generated by the device.

Figure 5I:
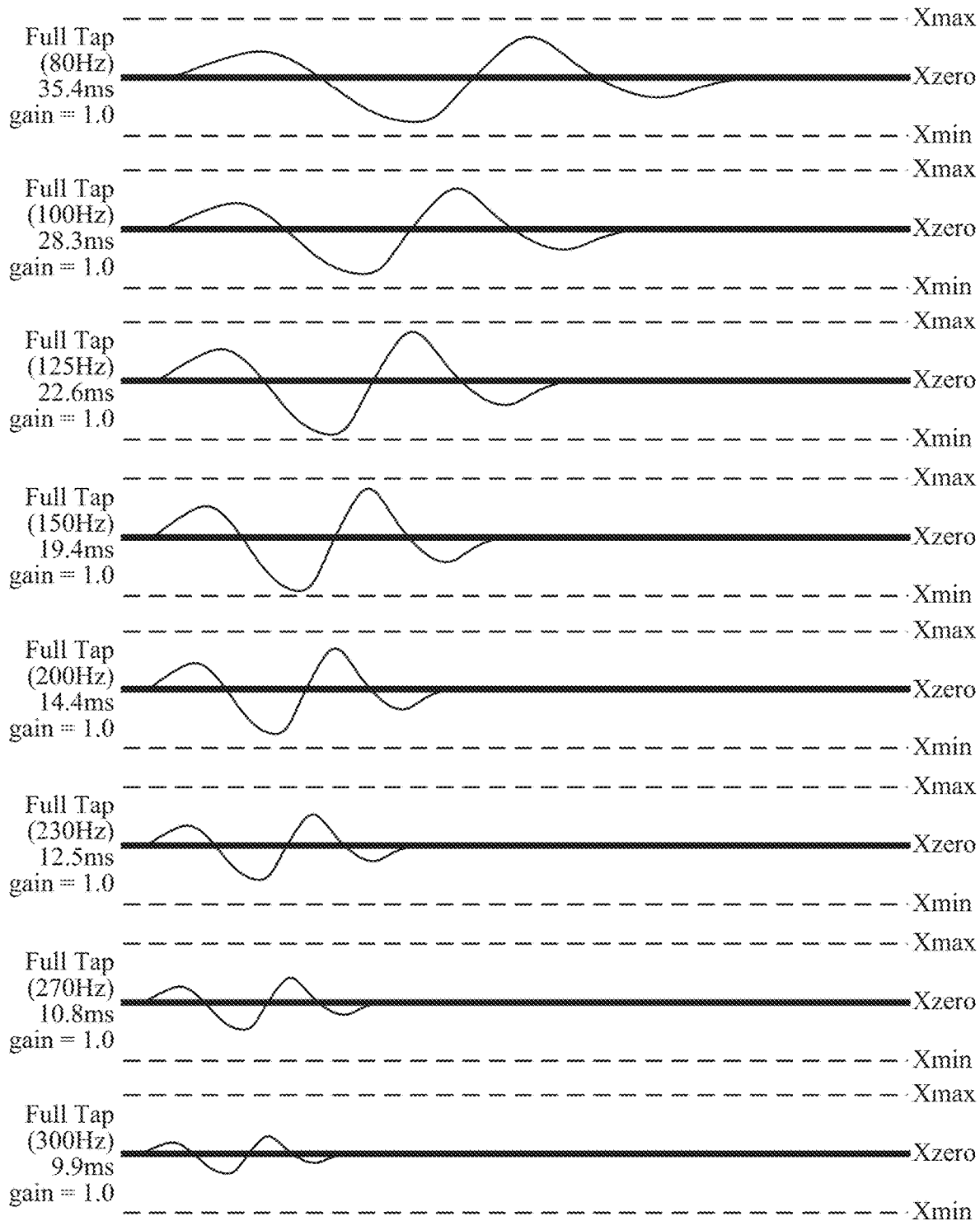
FIGS. 5I-5N provide a set of sample tactile output patterns that may be used, either individually or in combination, either as is or through one or more transformations (e.g., modulation, amplification, truncation, etc.), to create suitable haptic feedback in various scenarios and for various purposes, such as those mentioned above and those described with respect to the user interfaces and methods discussed herein.
Figure 5J:
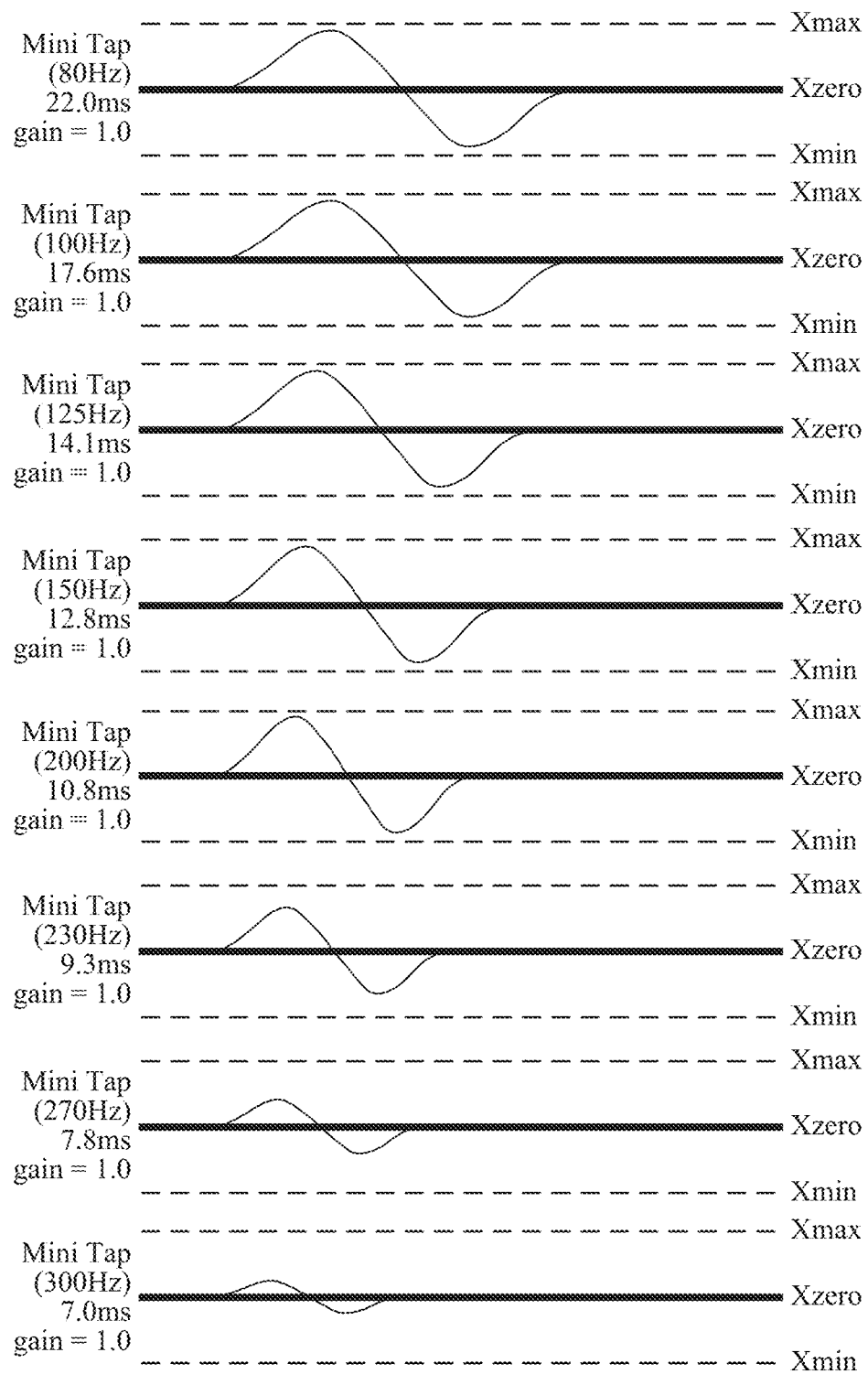
Figure 5K:
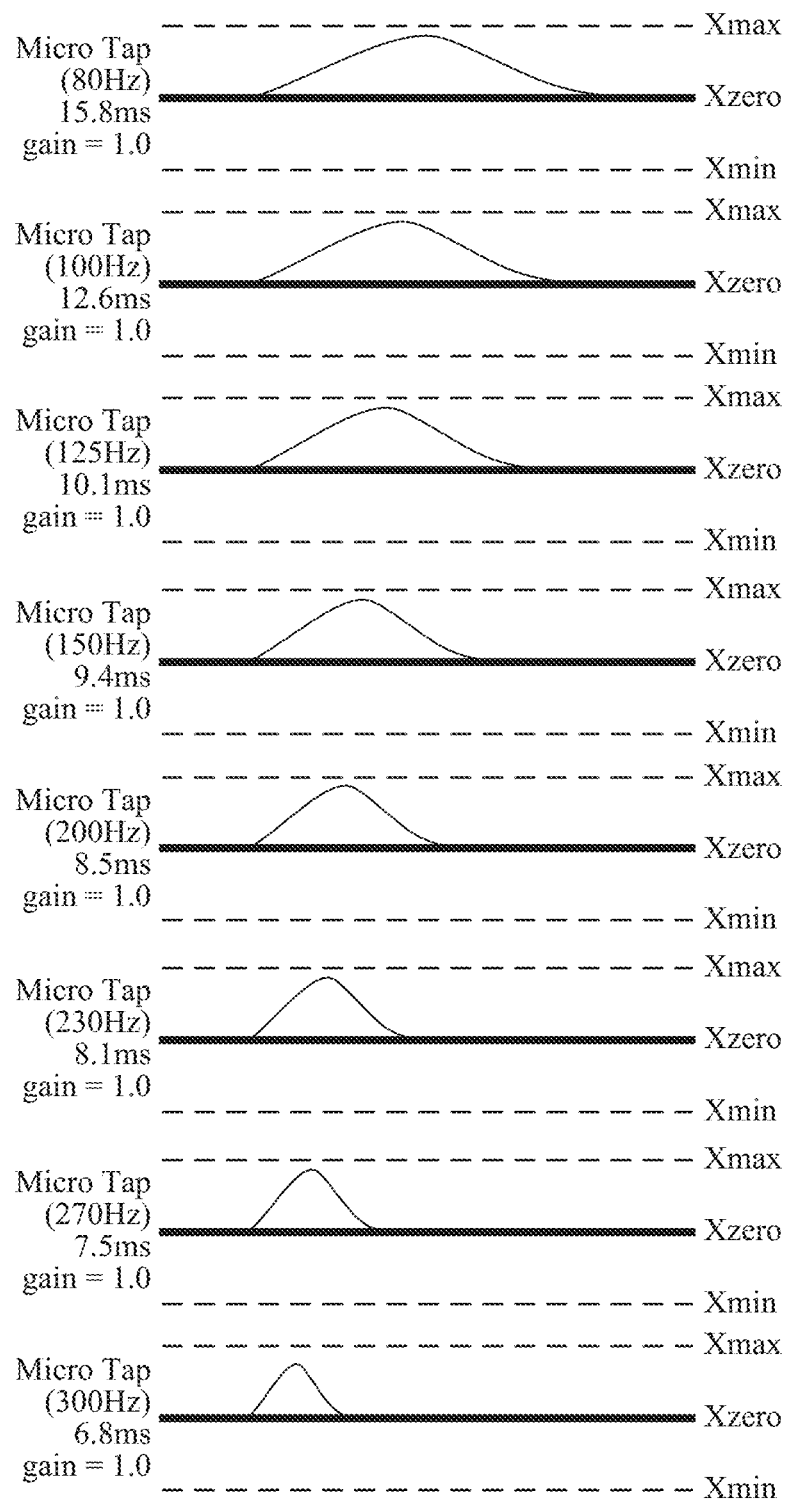
Figure 5L:
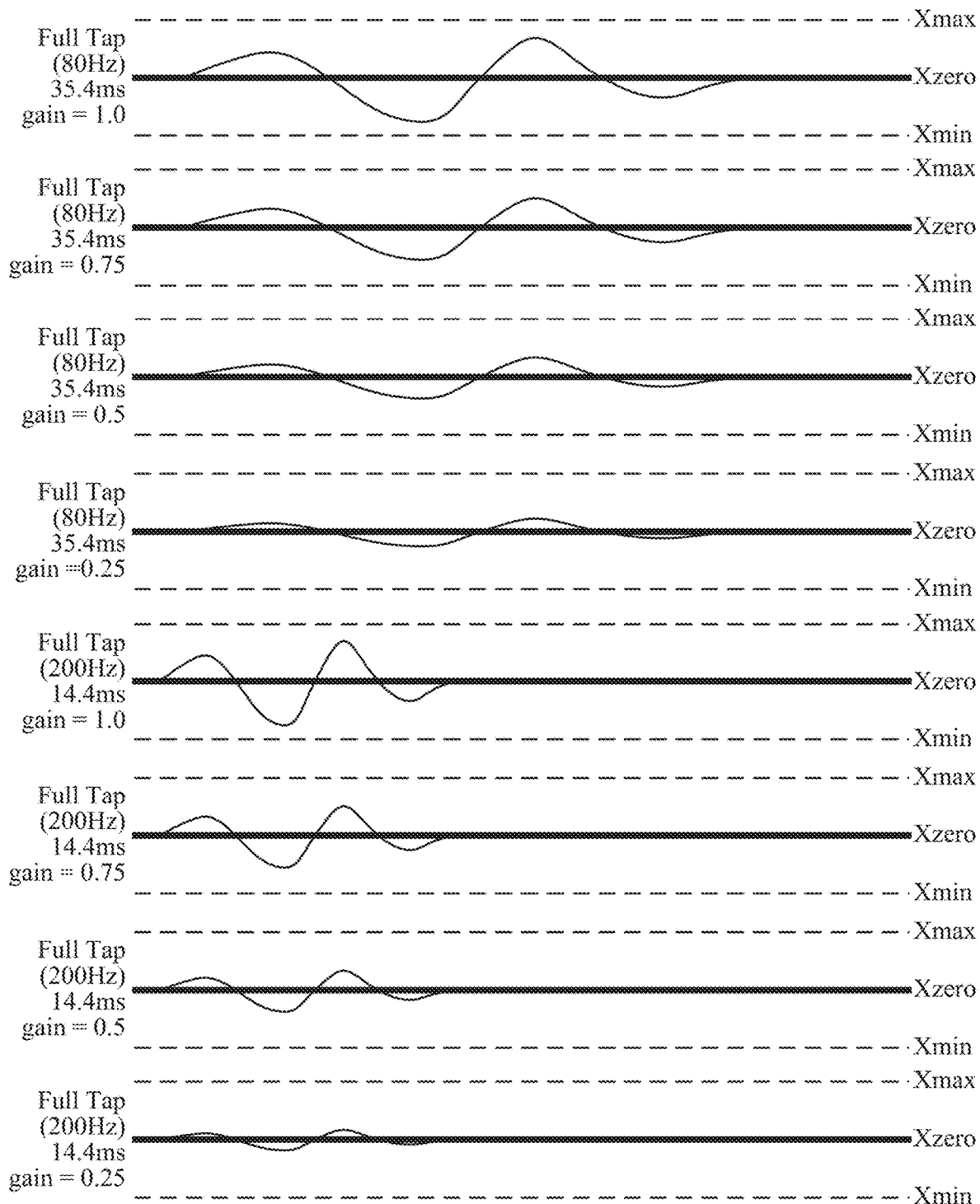
Figure 5M:
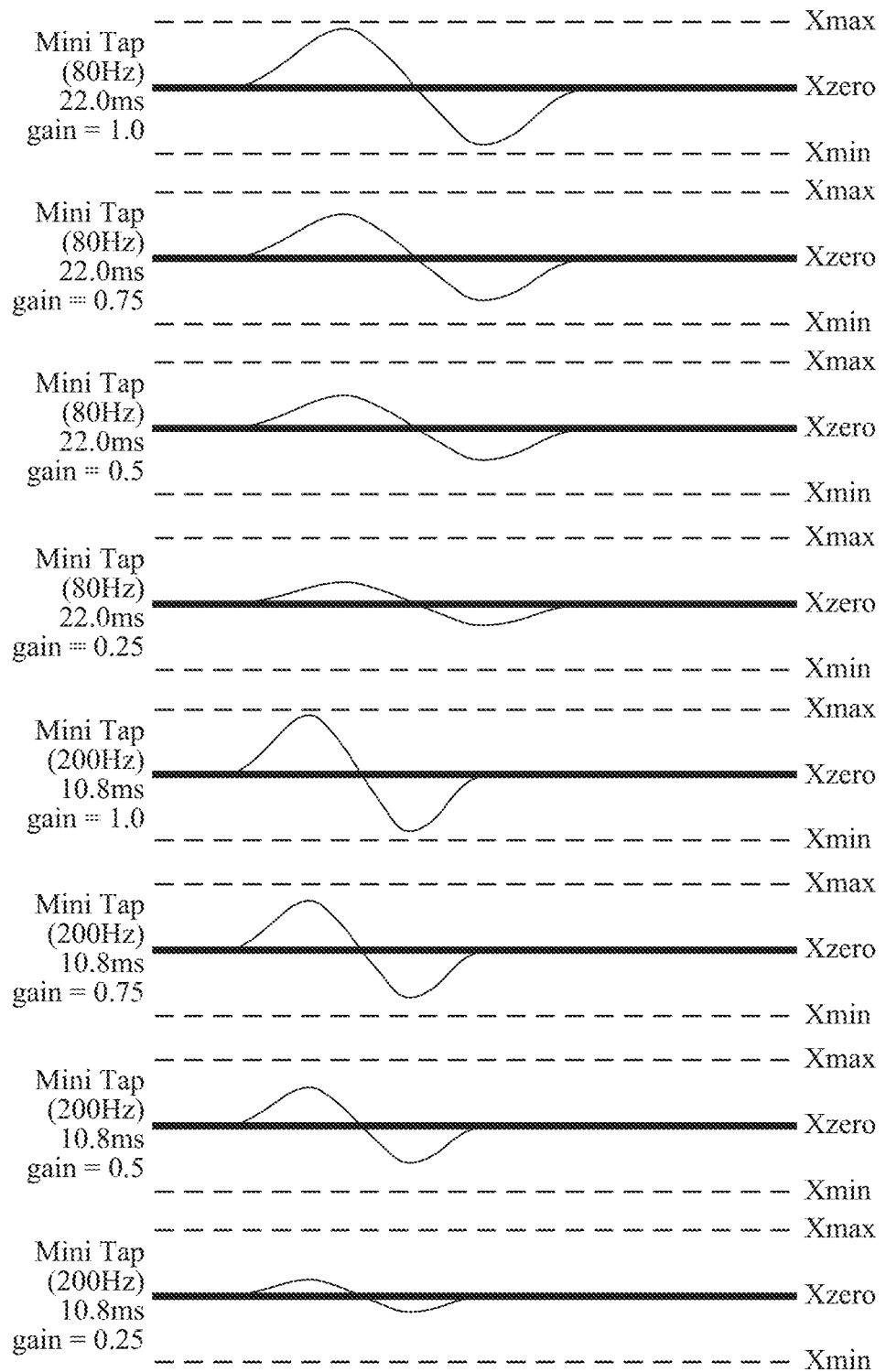
Figure 5N:
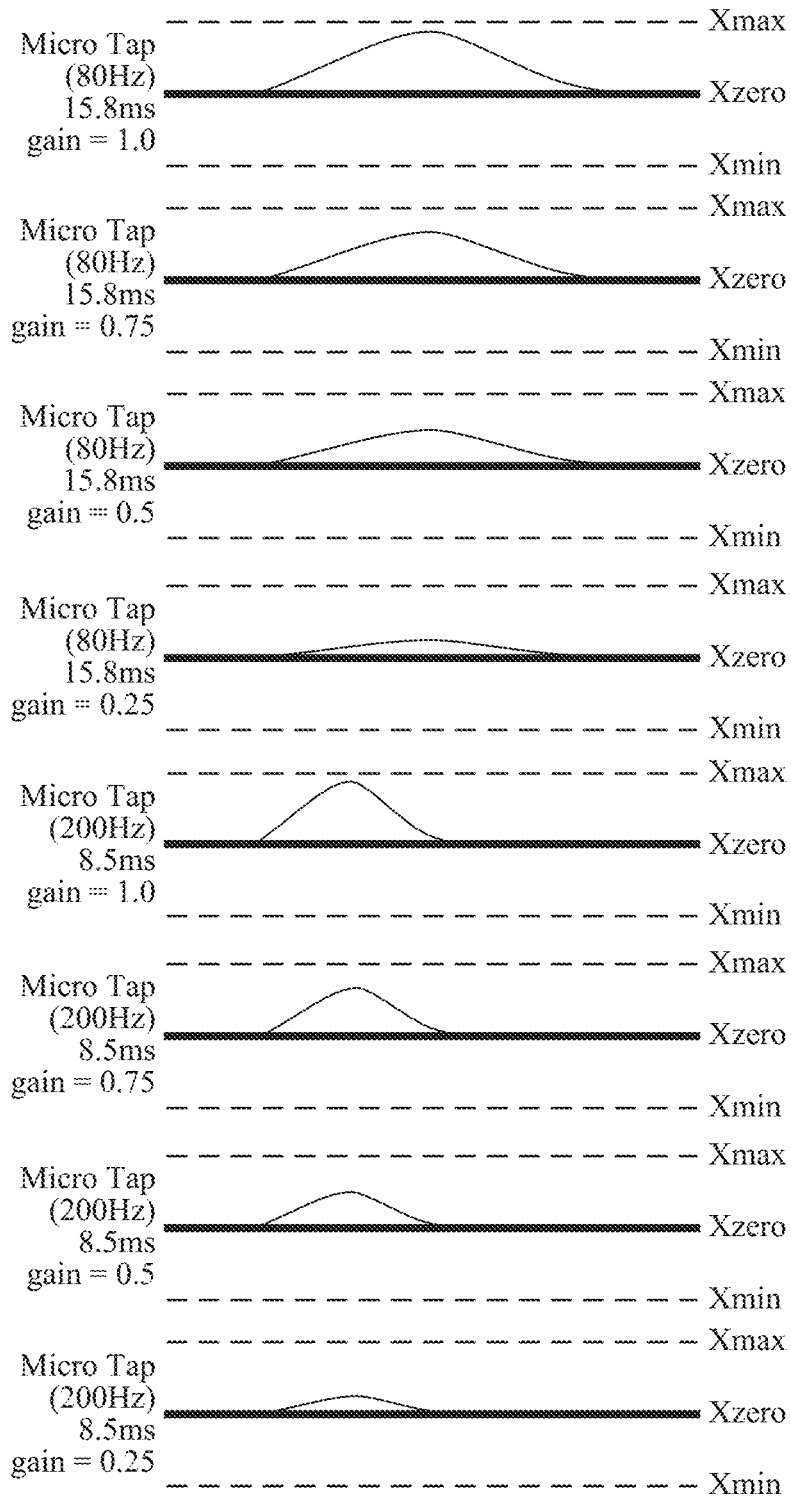

More specifically, FIGS. 5I-5K provide a set of sample tactile output patterns that may be used, either individually or in combination, either as is or through one or more transformations (e.g., modulation, amplification, truncation, etc.), to create suitable haptic feedback in various scenarios and for various purposes, such as those mentioned above and those described with respect to the user interfaces and methods discussed herein. This example of a palette of tactile outputs shows how a set of three waveforms and eight frequencies can be used to produce an array of tactile output patterns. In addition to the tactile output patterns shown in these figures, each of these tactile output patterns is optionally adjusted in amplitude by changing a gain value for the tactile output pattern, as shown, for example for FullTap 80 Hz, FullTap 200 Hz, MiniTap 80 Hz, MiniTap 200 Hz, MicroTap 80 Hz, and MicroTap 200 Hz in FIGS. 5L-5N, which are each shown with variants having a gain of 1.0, 0.75, 0.5, and 0.25. As shown in FIGS. 5L-5N, changing the gain of a tactile output pattern changes the amplitude of the pattern without changing the frequency of the pattern or changing the shape of the waveform. In some embodiments, changing the frequency of a tactile output pattern also results in a lower amplitude as some tactile output generators are limited by how much force can be applied to the moveable mass and thus higher frequency movements of the mass are constrained to lower amplitudes to ensure that the acceleration needed to create the waveform does not require force outside of an operational force range of the tactile output generator (e.g., the peak amplitudes of the FullTap at 230 Hz, 270 Hz, and 300 Hz are lower than the amplitudes of the FullTap at 80 Hz, 100 Hz, 125 Hz, and 200 Hz).

FIGS. 5I-5N show tactile output patterns that have a particular waveform. The waveform of a tactile output pattern represents the pattern of physical displacements relative to a neutral position (e.g., Xzero) versus time that a moveable mass goes through to generate a tactile output with that tactile output pattern. For example, a first set of tactile output patterns shown in FIG. 5I (e.g., tactile output patterns of a "FullTap") each have a waveform that includes an oscillation with two complete cycles (e.g., an oscillation that starts and ends in a neutral position and crosses the neutral position three times). A second set of tactile output patterns shown in FIG. 5J (e.g., tactile output patterns of a "MiniTap") each have a waveform that includes an oscillation that includes one complete cycle (e.g., an oscillation that starts and ends in a neutral position and crosses the neutral position one time). A third set of tactile output patterns shown in FIG. 5K (e.g., tactile output patterns of a "MicroTap") each have a waveform that includes an oscillation that include one half of a complete cycle (e.g., an oscillation that starts and ends in a neutral position and does not cross the neutral position). The waveform of a tactile output pattern also includes a start buffer and an end buffer that represent the gradual speeding up and slowing down of the moveable mass at the start and at the end of the tactile output. The example waveforms shown in FIGS. 5I-5N include Xmin and Xmax values which represent the maximum and minimum extent of movement of the moveable mass. For larger electronic devices with larger moveable masses, there may be larger or smaller minimum and maximum extents of movement of the mass. The examples shown in FIGS. 5I-5N describe movement of a mass in one dimension, however similar principles would also apply to movement of a moveable mass in two or three dimensions.

As shown in FIGS. 5I-5K, each tactile output pattern also has a corresponding characteristic frequency that affects the "pitch" of a haptic sensation that is felt by a user from a tactile output with that characteristic frequency. For a continuous tactile output, the characteristic frequency represents the number of cycles that are completed within a given period of time (e.g., cycles per second) by the moveable mass of the tactile output generator. For a discrete tactile output, a discrete output signal (e.g., with 0.5, 1, or 2 cycles) is generated, and the characteristic frequency value specifies how fast the moveable mass needs to move to generate a tactile output with that characteristic frequency. As shown in FIGS. 5I-5N, for each type of tactile output (e.g., as defined by a respective waveform, such as FullTap, MiniTap, or MicroTap), a higher frequency value corresponds to faster movement(s) by the moveable mass, and hence, in general, a shorter time to complete the tactile output (e.g., including the time to complete the required number of cycle(s) for the discrete tactile output, plus a start and an end buffer time). For example, a FullTap with a characteristic frequency of 80 Hz takes longer to complete than FullTap with a characteristic frequency of 100 Hz (e.g., 35.4 ms vs. 28.3 ms in FIG. 5I). In addition, for a given frequency, a tactile output with more cycles in its waveform at a respective frequency takes longer to complete than a tactile output with fewer cycles its waveform at the same respective frequency. For example, a FullTap at 150 Hz takes longer to complete than a MiniTap at 150 Hz (e.g., 19.4 ms vs. 12.8 ms), and a MiniTap at 150 Hz takes longer to complete than a MicroTap at 150 Hz (e.g., 12.8 ms vs. 9.4 ms). However, for tactile output patterns with different frequencies this rule may not apply (e.g., tactile outputs with more cycles but a higher frequency may take a shorter amount of time to complete than tactile outputs with fewer cycles but a lower frequency, and vice versa). For example, at 300 Hz, a FullTap takes as long as a MiniTap (e.g., 9.9 ms).

As shown in FIGS. 5I-5K, a tactile output pattern also has a characteristic amplitude that affects the amount of energy that is contained in a tactile signal, or a "strength" of a haptic sensation that may be felt by a user through a tactile output with that characteristic amplitude. In some embodiments, the characteristic amplitude of a tactile output pattern refers to an absolute or normalized value that represents the maximum displacement of the moveable mass from a neutral position when generating the tactile output. In some embodiments, the characteristic amplitude of a tactile output pattern is adjustable, e.g., by a fixed or dynamically determined gain factor (e.g., a value between 0 and 1), in accordance with various conditions (e.g., customized based on user interface contexts and behaviors) and/or preconfigured metrics (e.g., input-based metrics, and/or user-interface-based metrics). In some embodiments, an input-based metric (e.g., an intensity-change metric or an input-speed metric) measures a characteristic of an input (e.g., a rate of change of a characteristic intensity of a contact in a press input or a rate of movement of the contact across a touch-sensitive surface) during the input that triggers generation of a tactile output. In some embodiments, a user-interface-based metric (e.g., a speed-across-boundary metric) measures a characteristic of a user interface element (e.g., a speed of movement of the element across a hidden or visible boundary in a user interface) during the user interface change that triggers generation of the tactile output. In some embodiments, the characteristic amplitude of a tactile output pattern may be modulated by an "envelope" and the peaks of adjacent cycles may have different amplitudes, where one of the waveforms shown above is further modified by multiplication by an envelope parameter that changes over time (e.g., from 0 to 1) to gradually adjust amplitude of portions of the tactile output over time as the tactile output is being generated.

Although specific frequencies, amplitudes, and waveforms are represented in the sample tactile output patterns in FIGS. 5I-5K for illustrative purposes, tactile output patterns with other frequencies, amplitudes, and waveforms may be used for similar purposes. For example, waveforms that have between 0.5 to 4 cycles can be used. Other frequencies in the range of 60 Hz-400 Hz may be used as well. Table 1 below provides representative examples of tactile output/haptic feedback behaviors and configurations, and examples of their use with respect to the user interfaces for managing content-based tactile outputs that are illustrated and described herein.

TABLE 1

| Type of Tactile Output Sequence | Waveform | Textural (continuous) or Discrete |
|---|---|---|
| "Major" | MiniTap at 180 Hz | Discrete |
| "Minor" | MicroTap at 80 Hz | Textural |
| "Major-reduced" | MiniTap at 200 Hz | Discrete |
| "Minor-Reduced" | MicroTap at 200 Hz | Discrete |

In addition, in methods described herein where one or more steps are contingent upon one or more conditions having been met, it should be understood that the described method can be repeated in multiple repetitions so that over the course of the repetitions all of the conditions upon which steps in the method are contingent have been met in different repetitions of the method. For example, if a method requires performing a first step if a condition is satisfied, and a second step if the condition is not satisfied, then a person of ordinary skill would appreciate that the claimed steps are repeated until the condition has been both satisfied and not satisfied, in no particular order. Thus, a method described with one or more steps that are contingent upon one or more conditions having been met could be rewritten as a method that is repeated until each of the conditions described in the method has been met. This, however, is not required of system or computer readable medium claims where the system or computer readable medium contains instructions for performing the contingent operations based on the satisfaction of the corresponding one or more conditions and thus is capable of determining whether the contingency has or has not been satisfied without explicitly repeating steps of a method until all of the conditions upon which steps in the method are contingent have been met. A person having ordinary skill in the art would also understand that, similar to a method with contingent steps, a system or computer readable storage medium can repeat the steps of a method as many times as are needed to ensure that all of the contingent steps have been performed.

As used herein, an "installed application" refers to a software application that has been downloaded onto an electronic device (e.g., devices 100, 300, and/or 500) and is ready to be launched (e.g., become opened) on the device. In some embodiments, a downloaded application becomes an installed application by way of an installation program that extracts program portions from a downloaded package and integrates the extracted portions with the operating system of the computer system.

As used herein, the terms "open application" or "executing application" refer to a software application with retained state information (e.g., as part of device/global internal state 157 and/or application internal state 192). An open or executing application is, optionally, any one of the following types of applications:
 an active application, which is currently displayed on a display screen of the device that the application is being used on;
 a background application (or background processes), which is not currently displayed, but one or more processes for the application are being processed by one or more processors;
 and
 a suspended or hibernated application, which is not running, but has state information that is stored in memory (volatile and non-volatile, respectively) and that can be used to resume execution of the application.

As used herein, the term "closed application" refers to software applications without retained state information (e.g., state information for closed applications is not stored in a memory of the device). Accordingly, closing an application includes stopping and/or removing application processes for the application and removing state information for the application from the memory of the device. Generally, opening a second application while in a first application does not close the first application. When the second application is displayed and the first application ceases to be displayed, the first application becomes a background application.

Attention is now directed towards embodiments of user interfaces ("UI") and associated processes that are implemented on an electronic device, such as portable multifunction device 100, device 300, or device 500.

User Interfaces and Associated Processes

Interacting with Editable Date and/or Time User Interface Elements

Users interact with electronic devices in many different manners, including editing editable time entry fields and/or editable date entry fields to provide time and/or date inputs to an electronic device. In some embodiments, an electronic device displays editable time entry fields and/or editable date entry fields in a user interface. The embodiments described below provide ways in which an electronic device receives inputs to select and/or edit editable time entry fields and/or editable date entry fields, thus enhancing the user's interactions with the device. Enhancing interactions with a device reduces the amount of time needed by a user to perform operations, and thus reduces the power usage of the device and increases battery life for battery-powered devices. It is understood that people use devices. When a person uses a device, that person is optionally referred to as a user of the device.

Figure 6D:
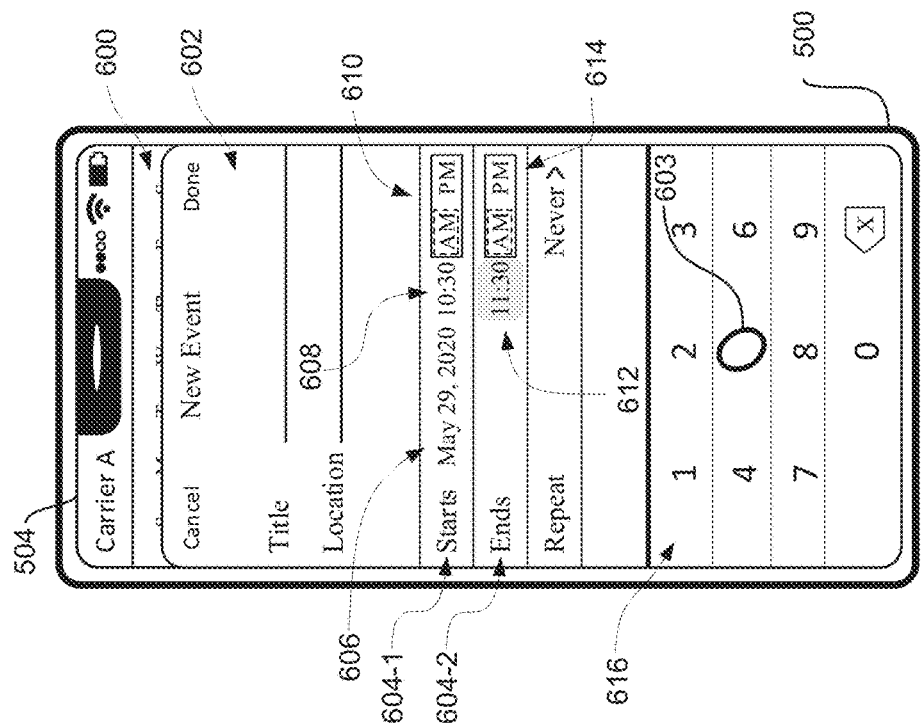
FIGS. 6A-6SS illustrate exemplary ways in which an electronic device provides for interaction with editable time and/or date input fields in accordance with some embodiments.
Figure 6C:
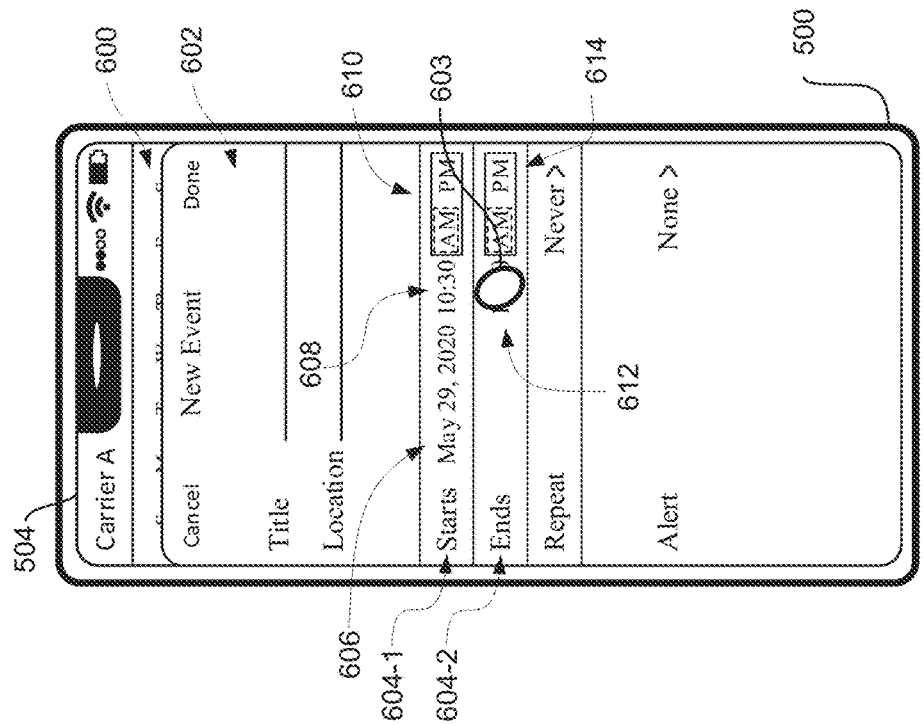
Figure 6H:
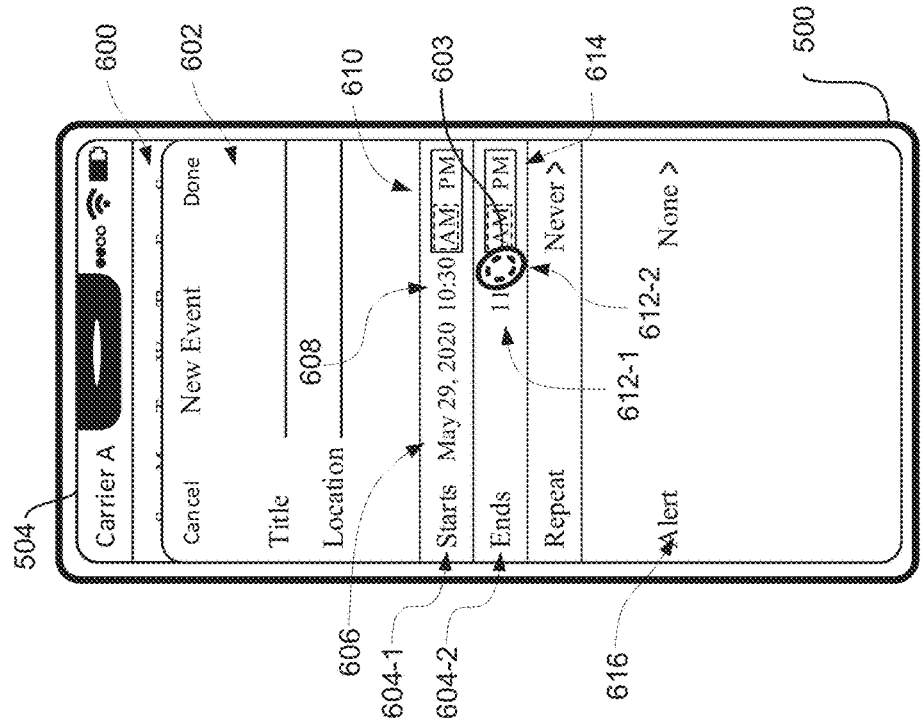
Figure 6G:
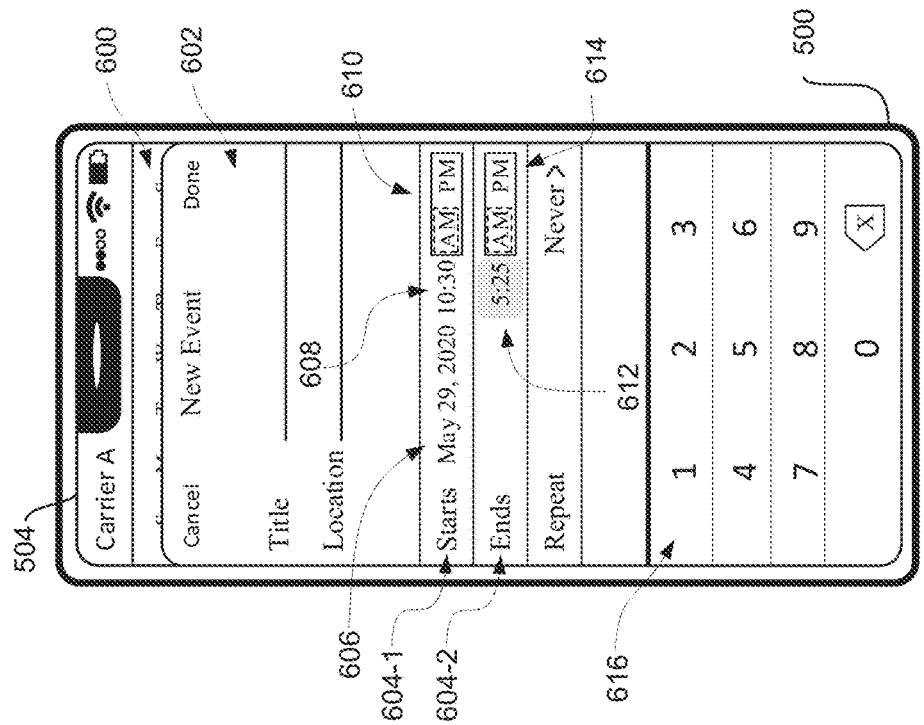
Figures 6I, 6J:
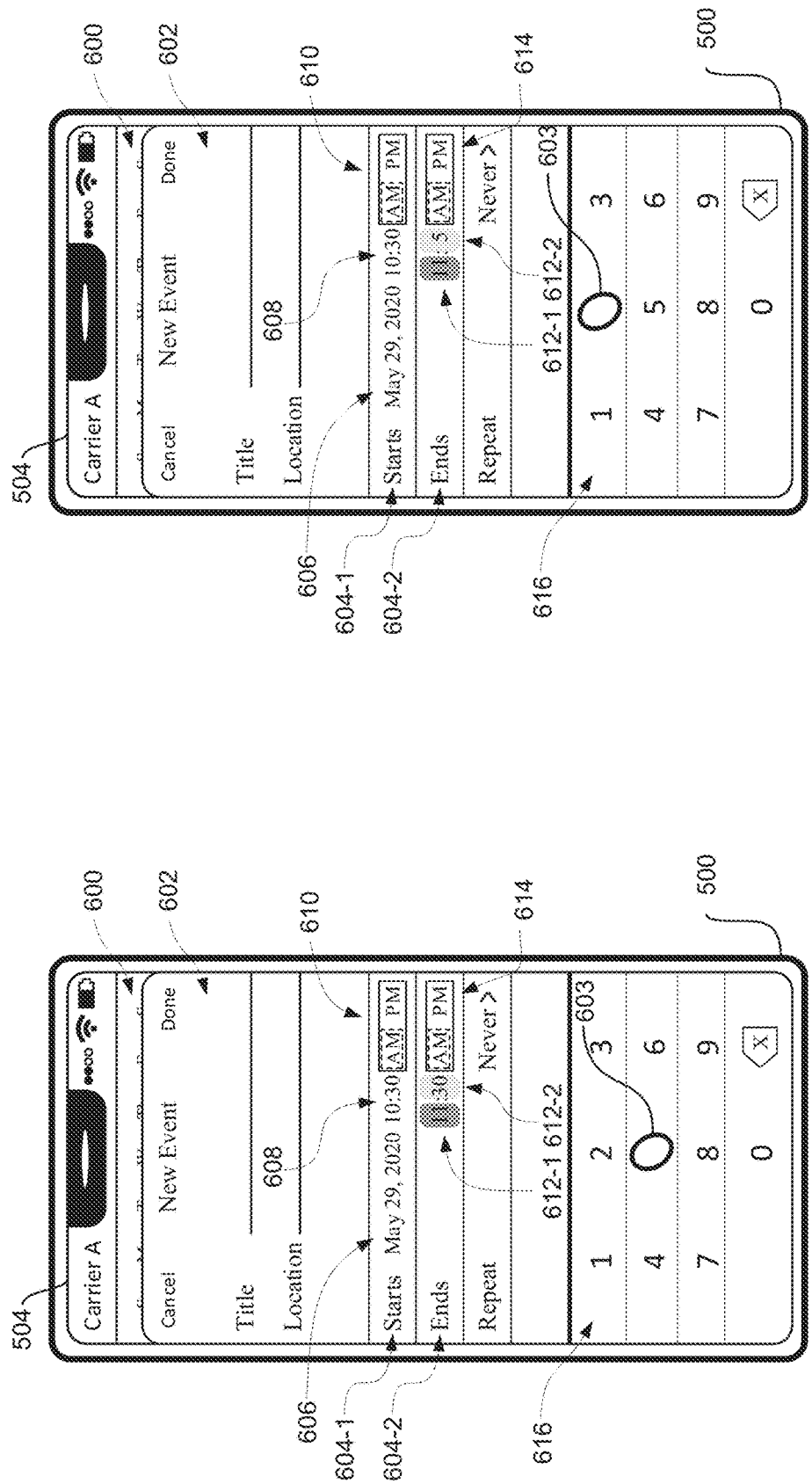
Figure 6N:
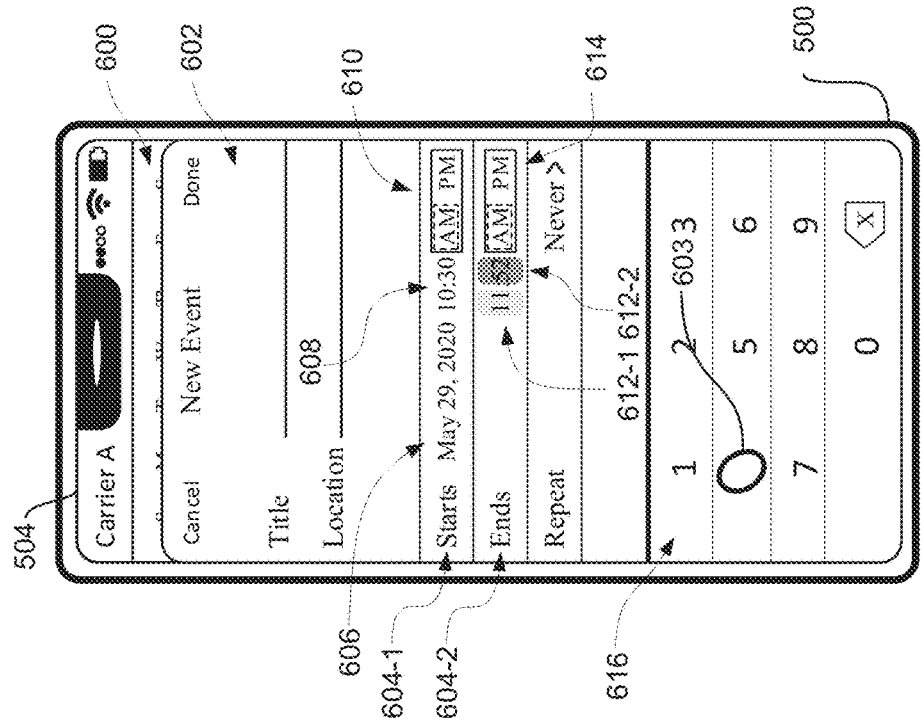
Figure 6M:
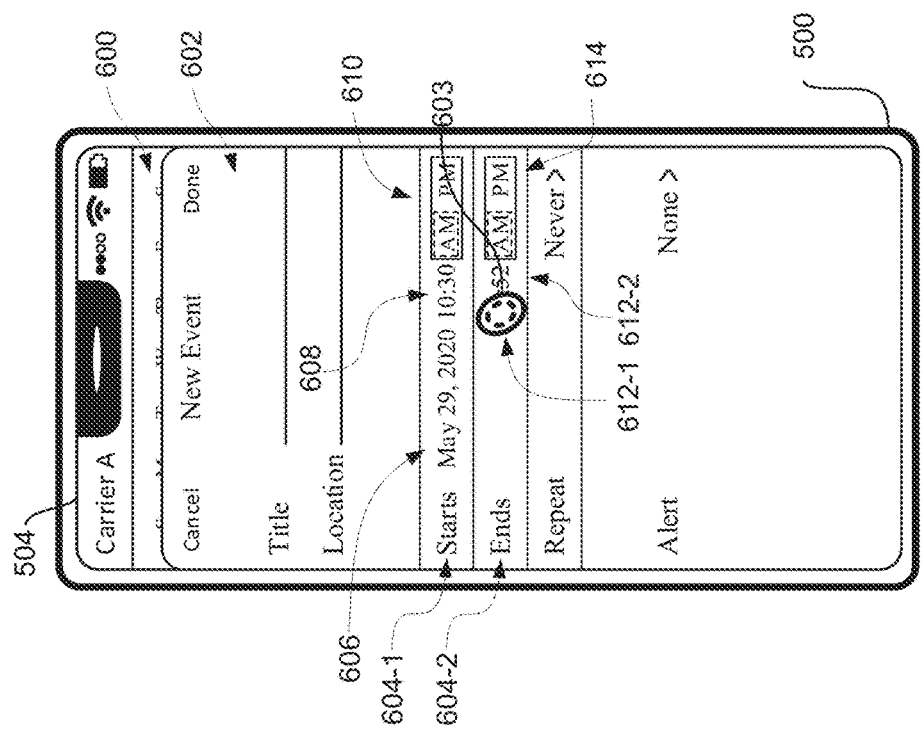
Figure 6P:
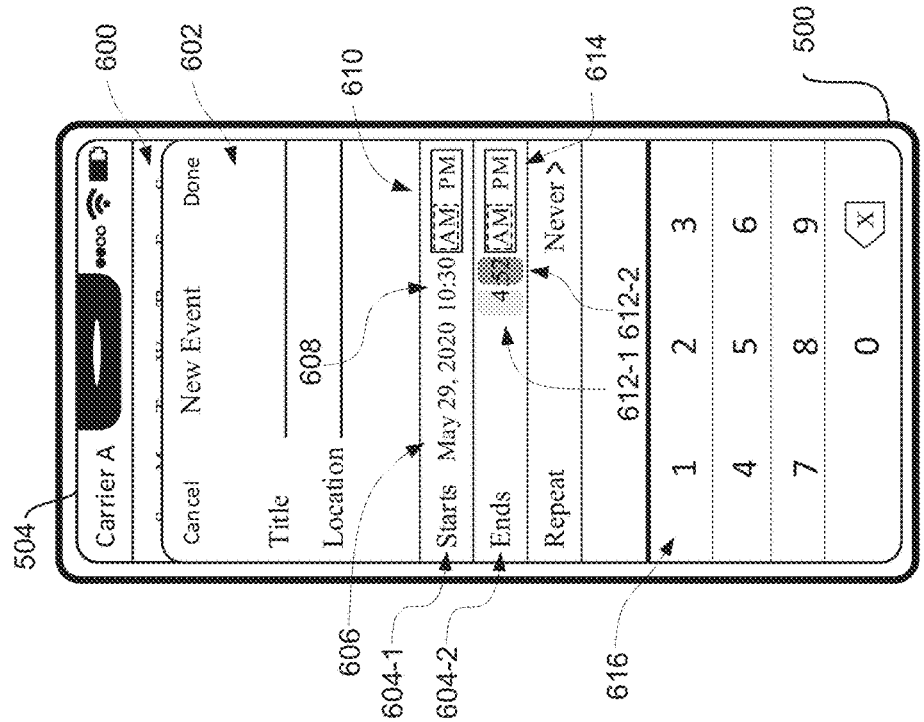
Figure 6O:
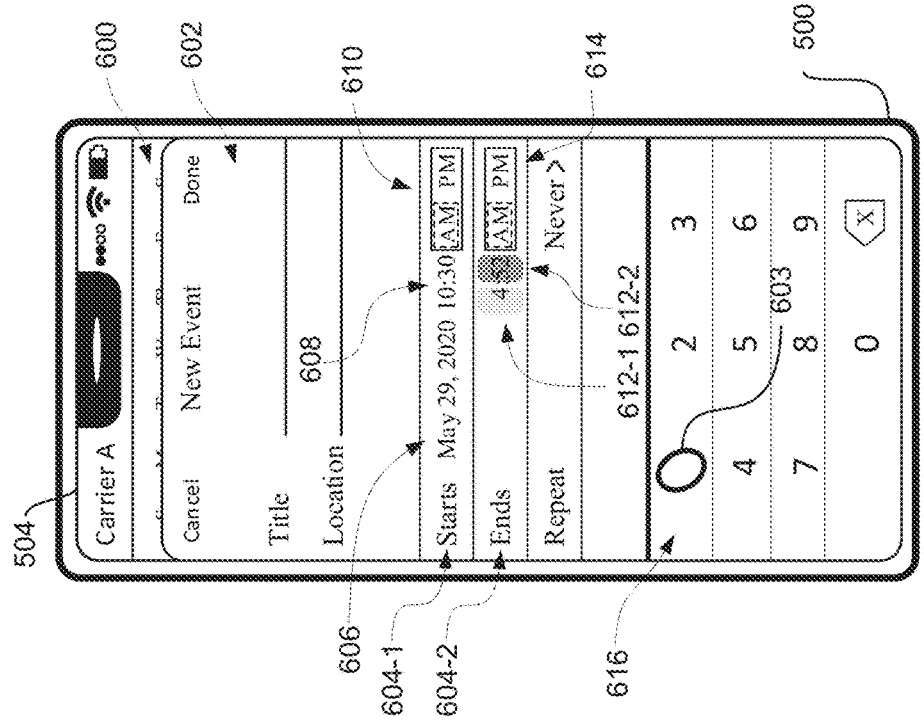
Figure 6R:
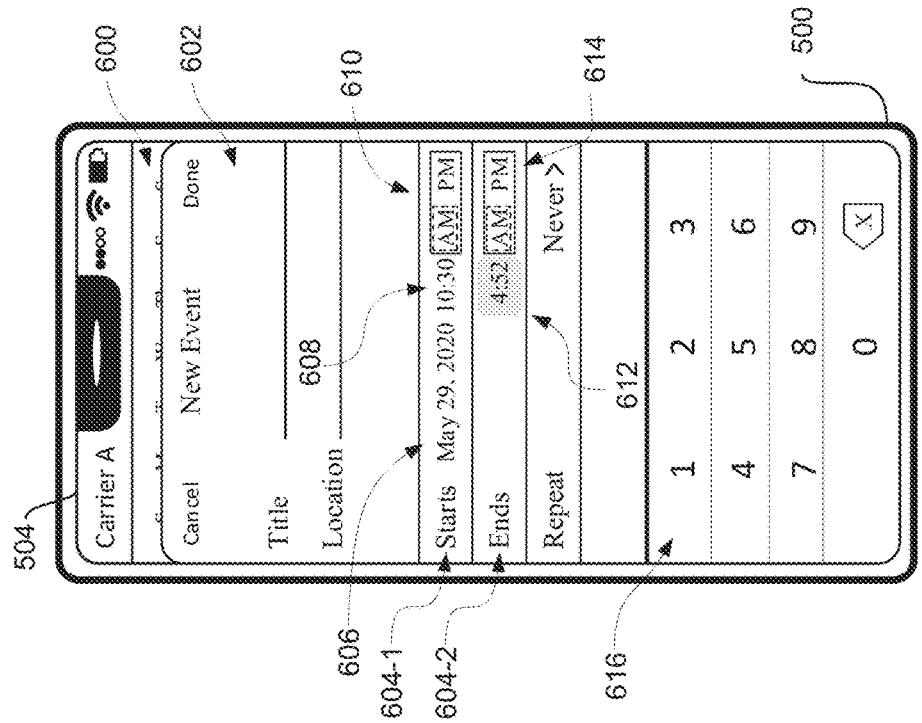
Figure 6Q:
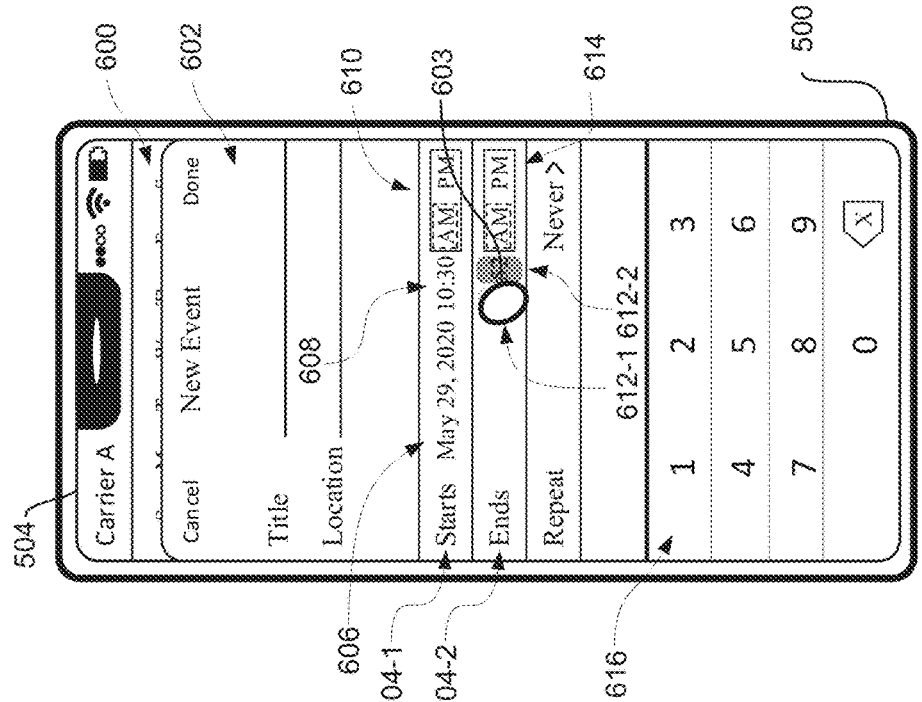
Figure 6V:
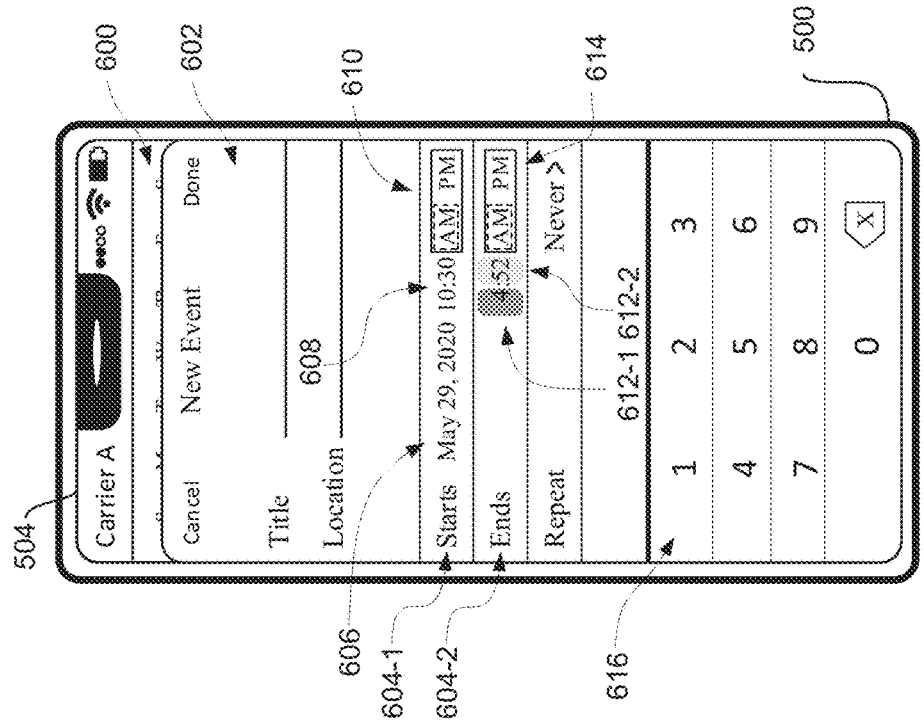
Figure 6U:
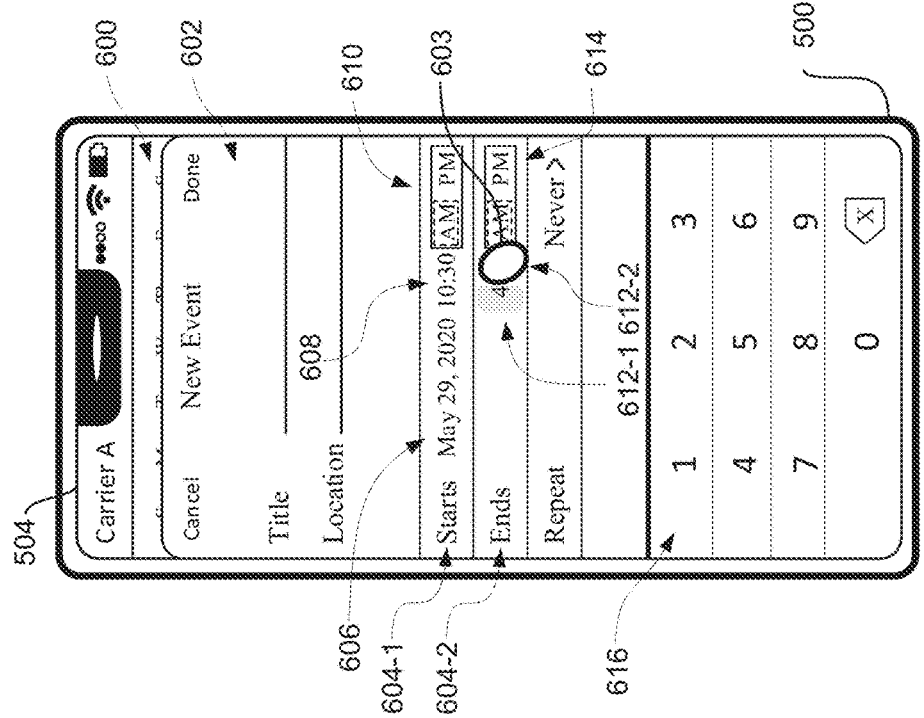
Figure 6B:
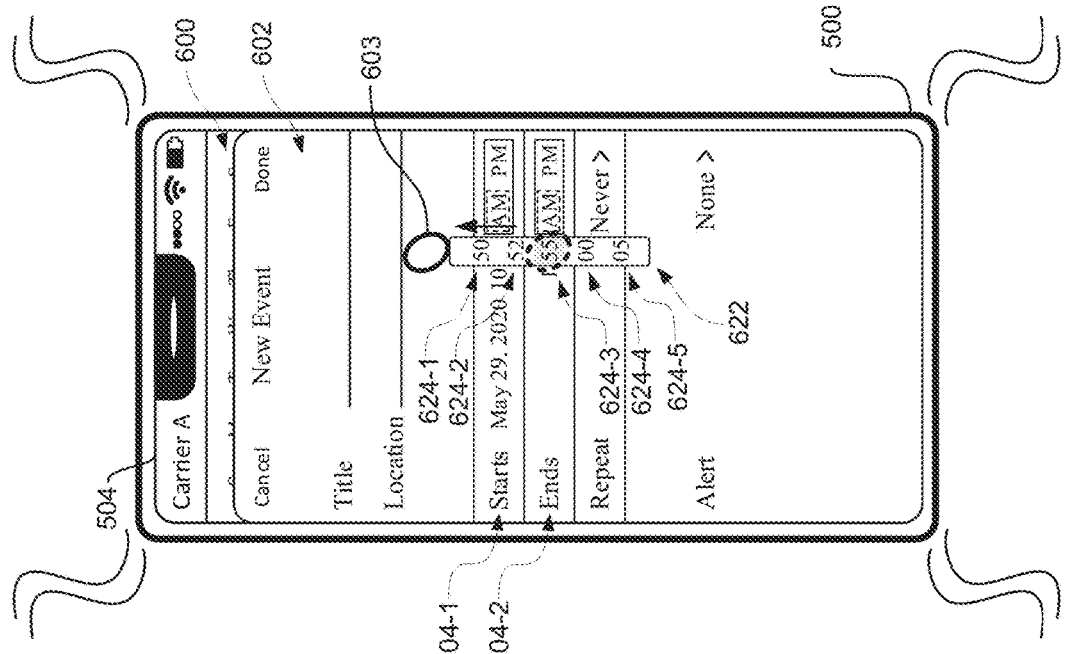
Figure 6A:
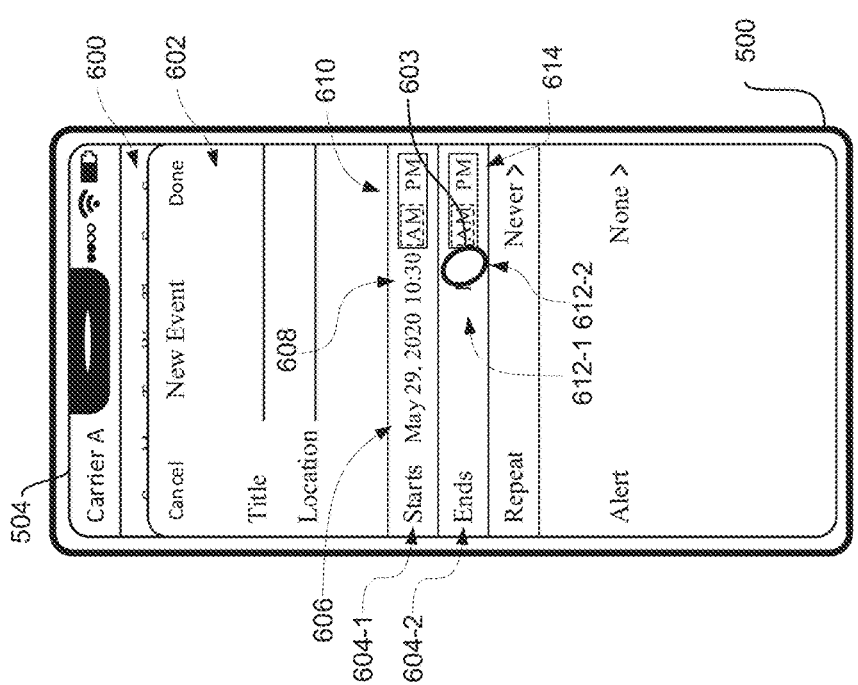
Figure 6H:
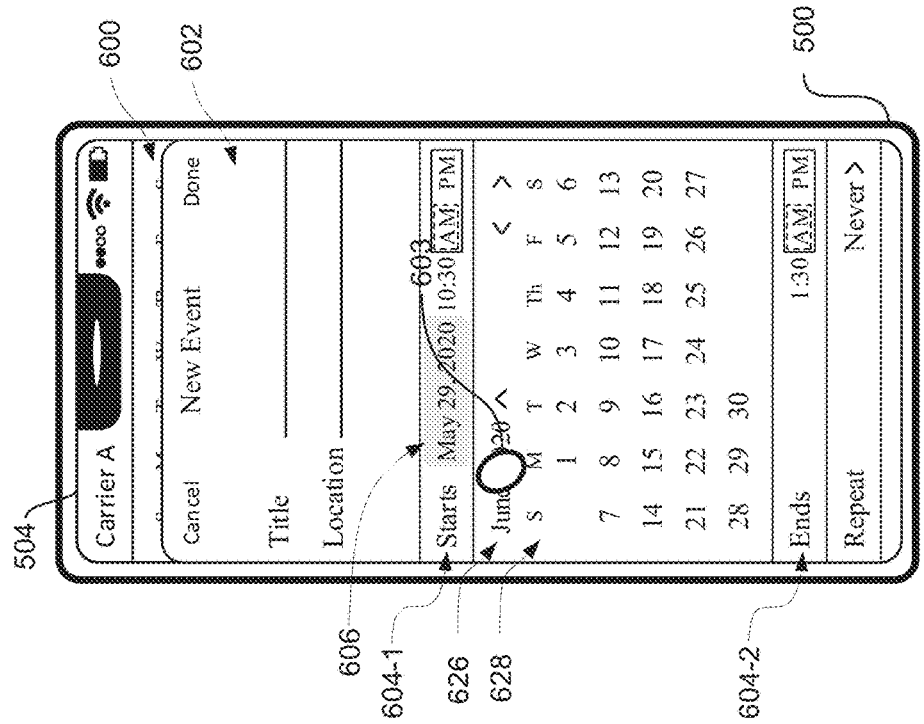
Figure 6G:
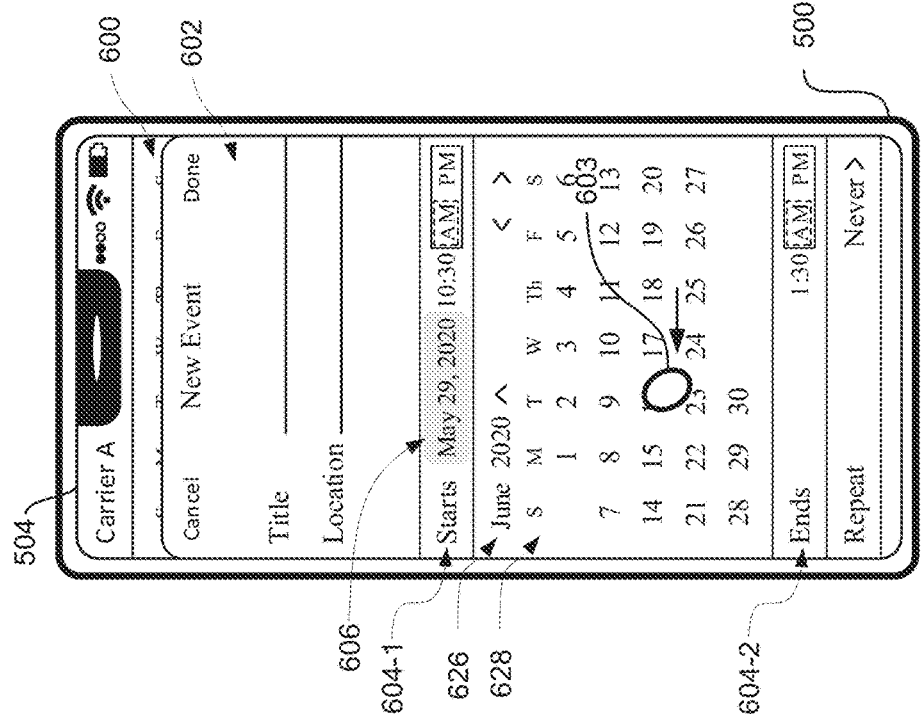
Figure 6R:
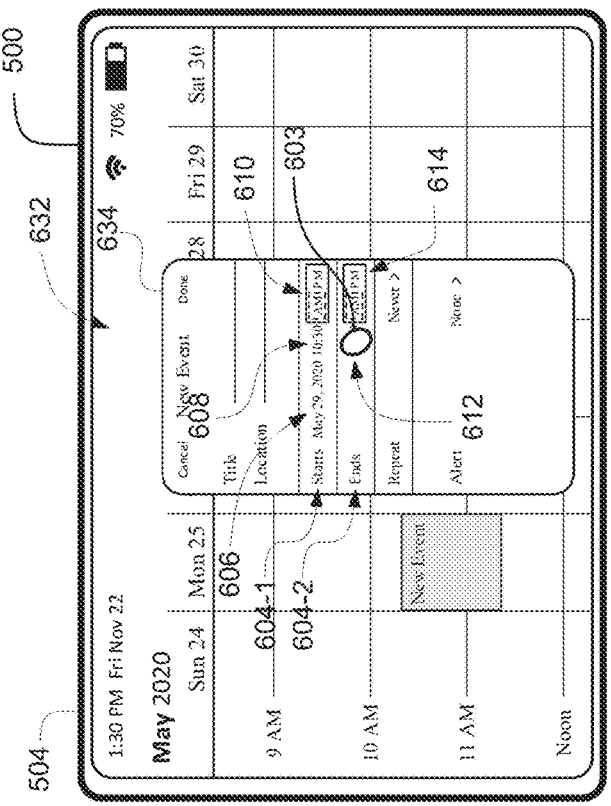
Figure 6Q:
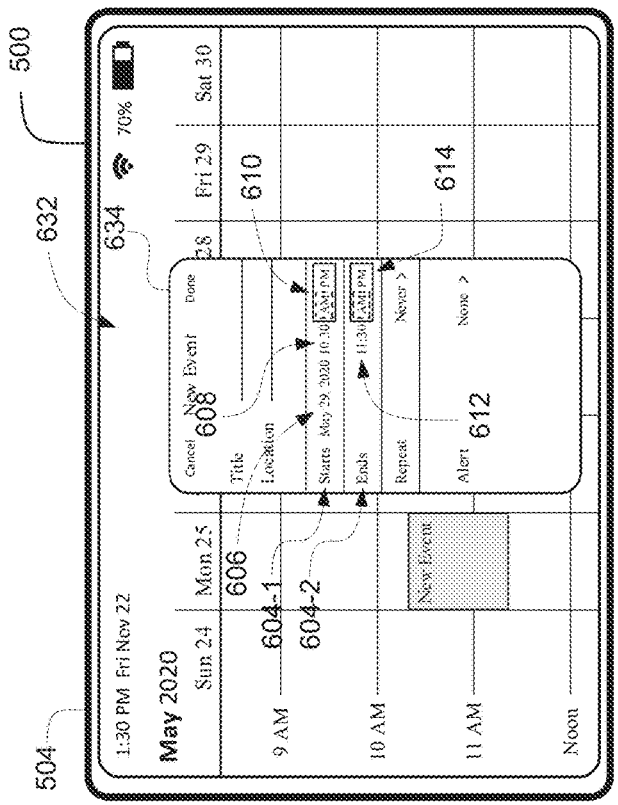
Figure 6S:
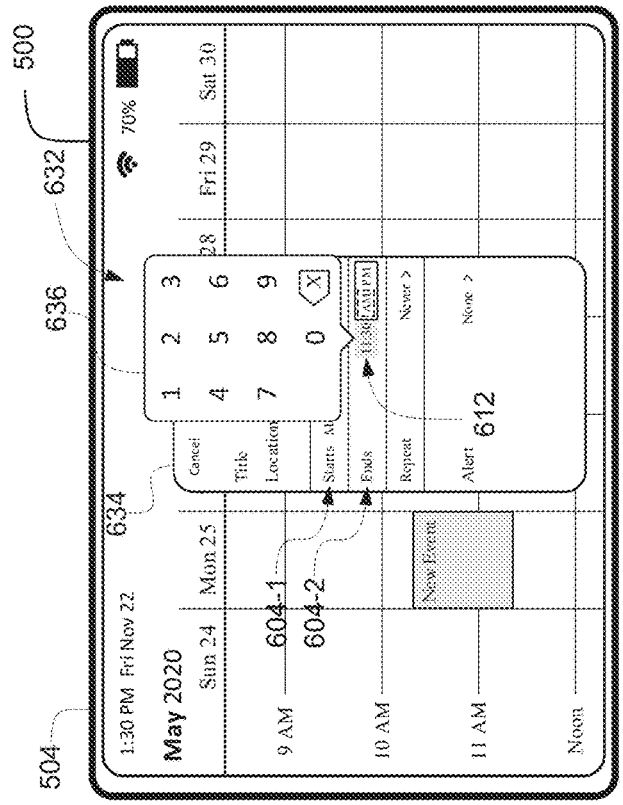
Figure 7A:
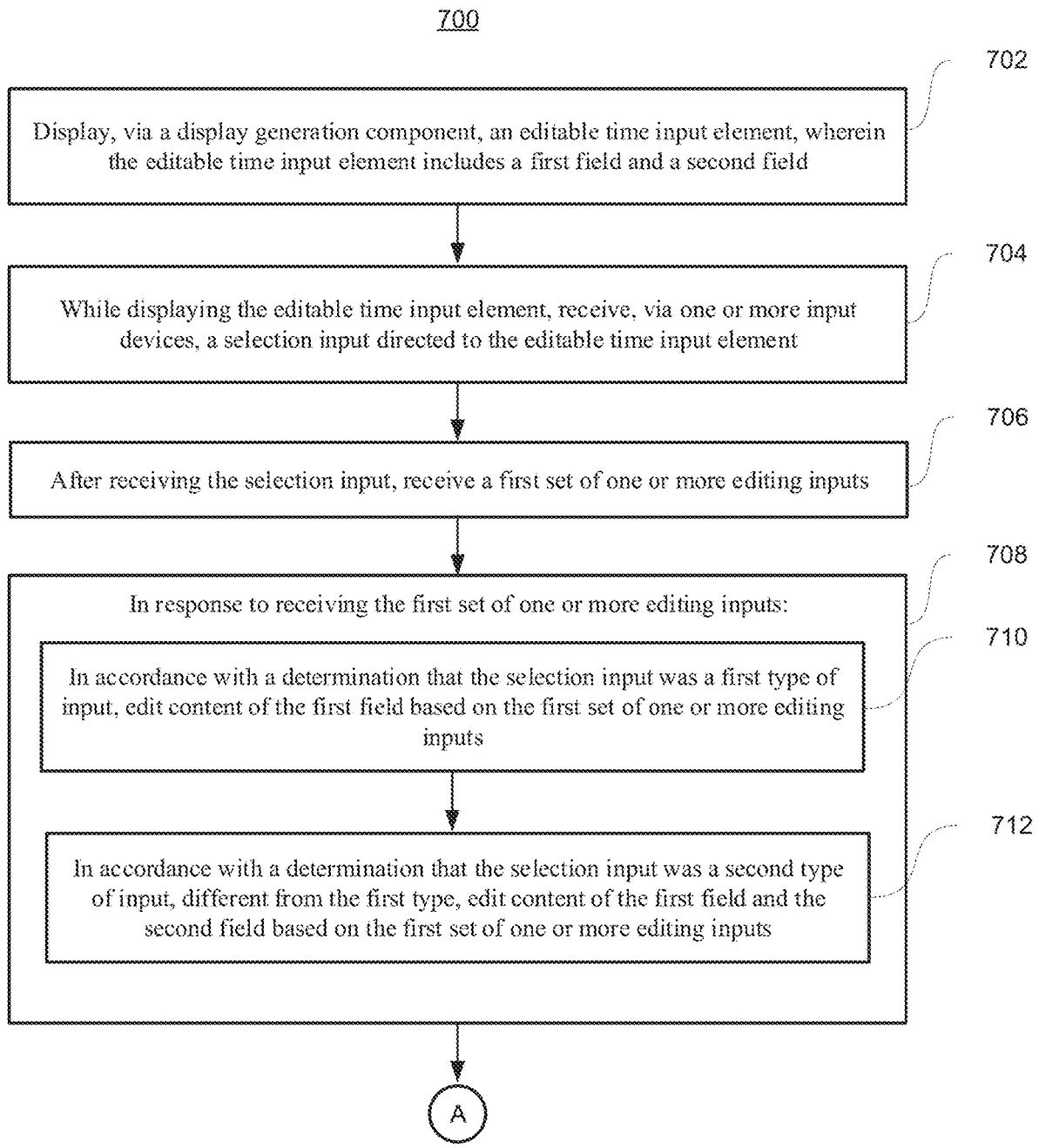
FIGS. 7A-7J are flow diagrams illustrating a method of providing for interaction with editable time and date input fields in accordance with some embodiments.
Figure 7B:
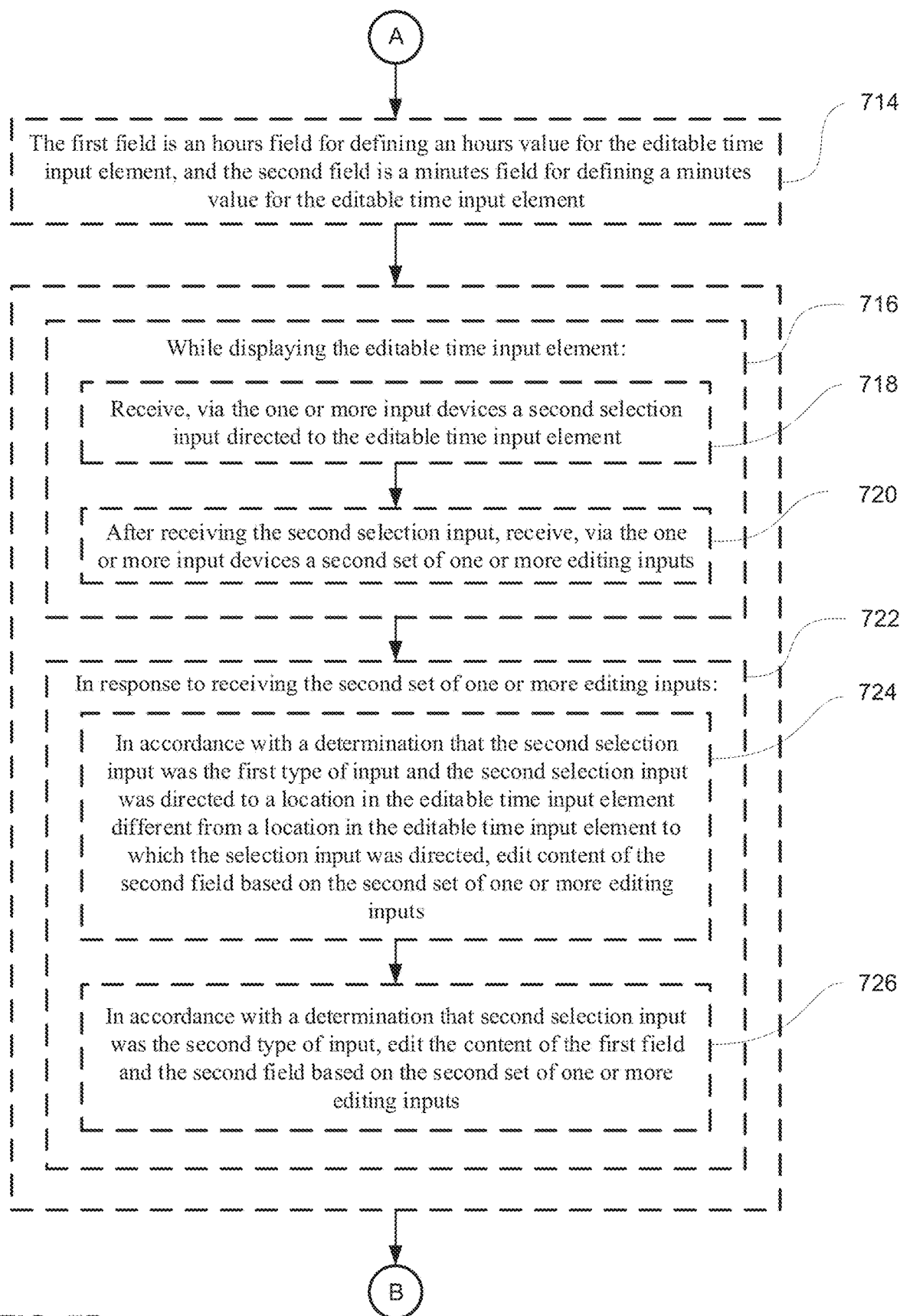
Figure 7C:
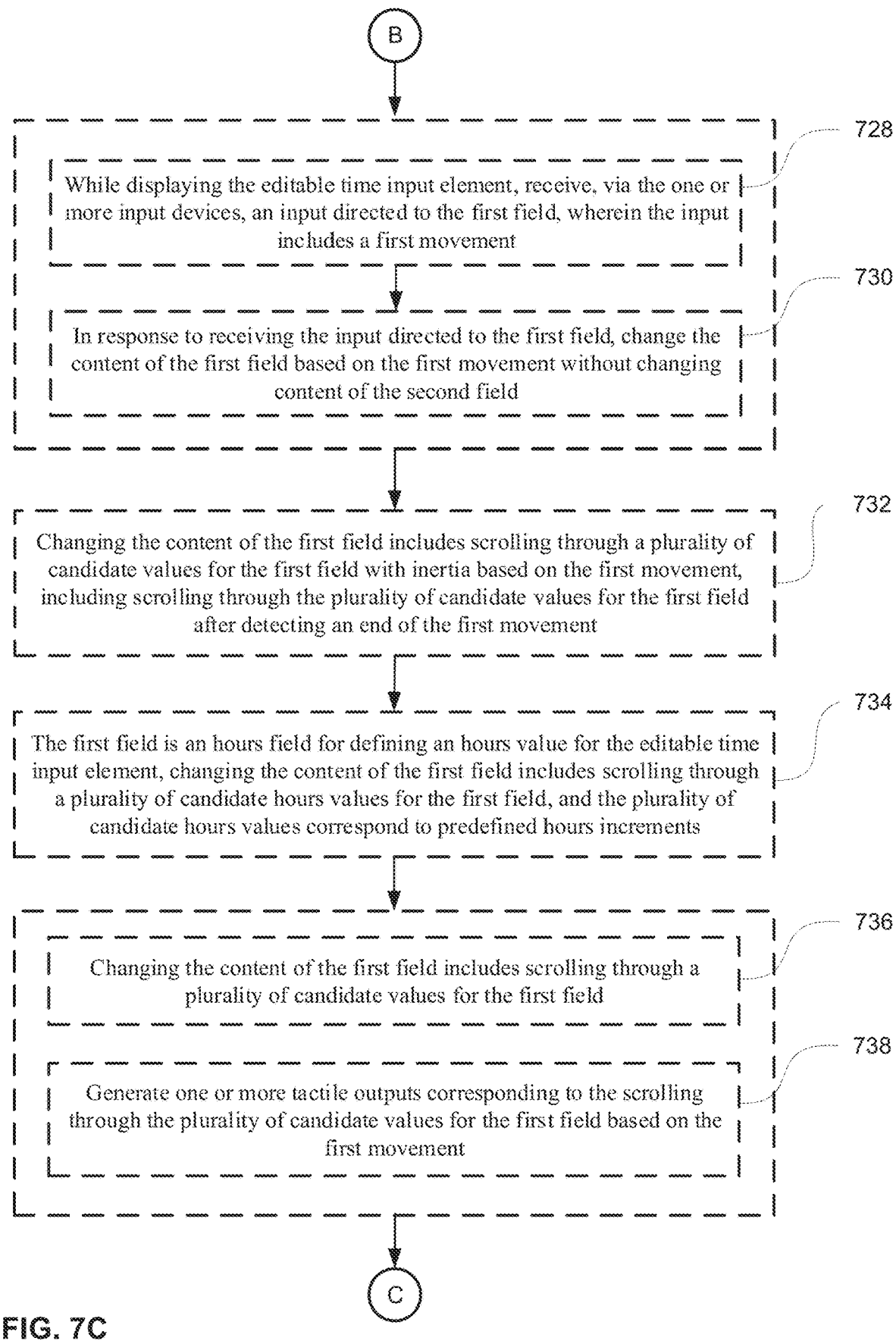
Figure 7D:
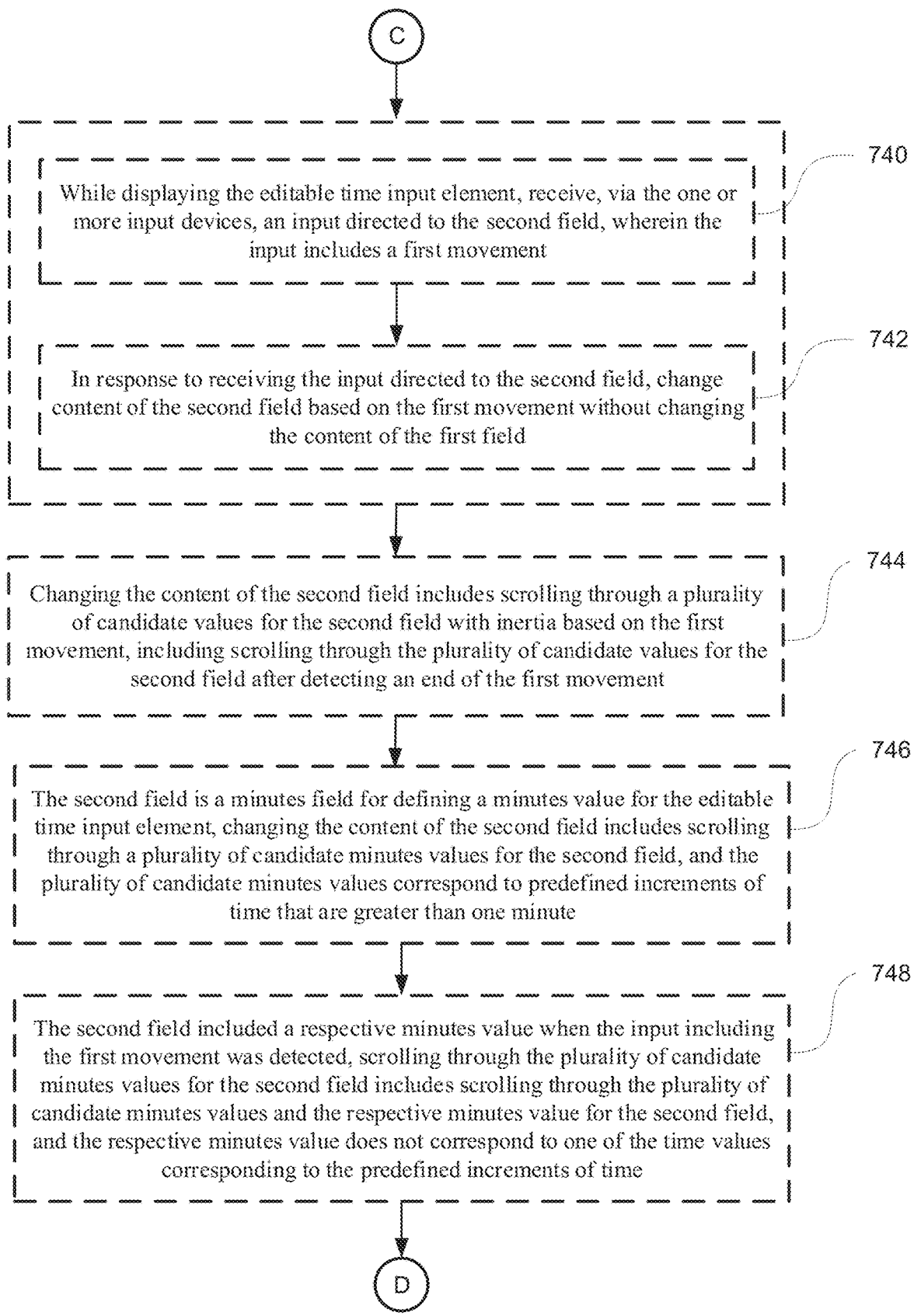
Figure 7E:
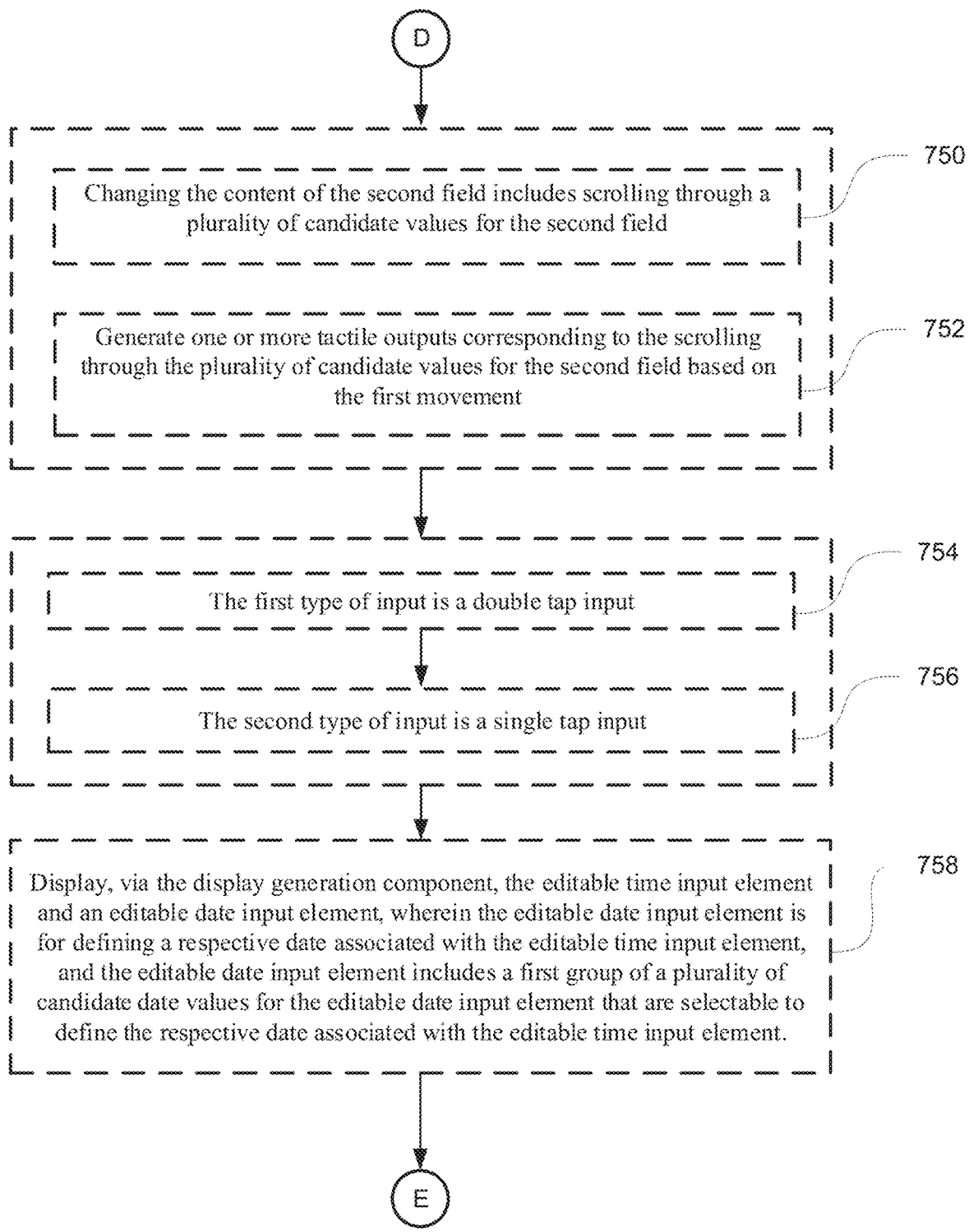
Figure 7F:
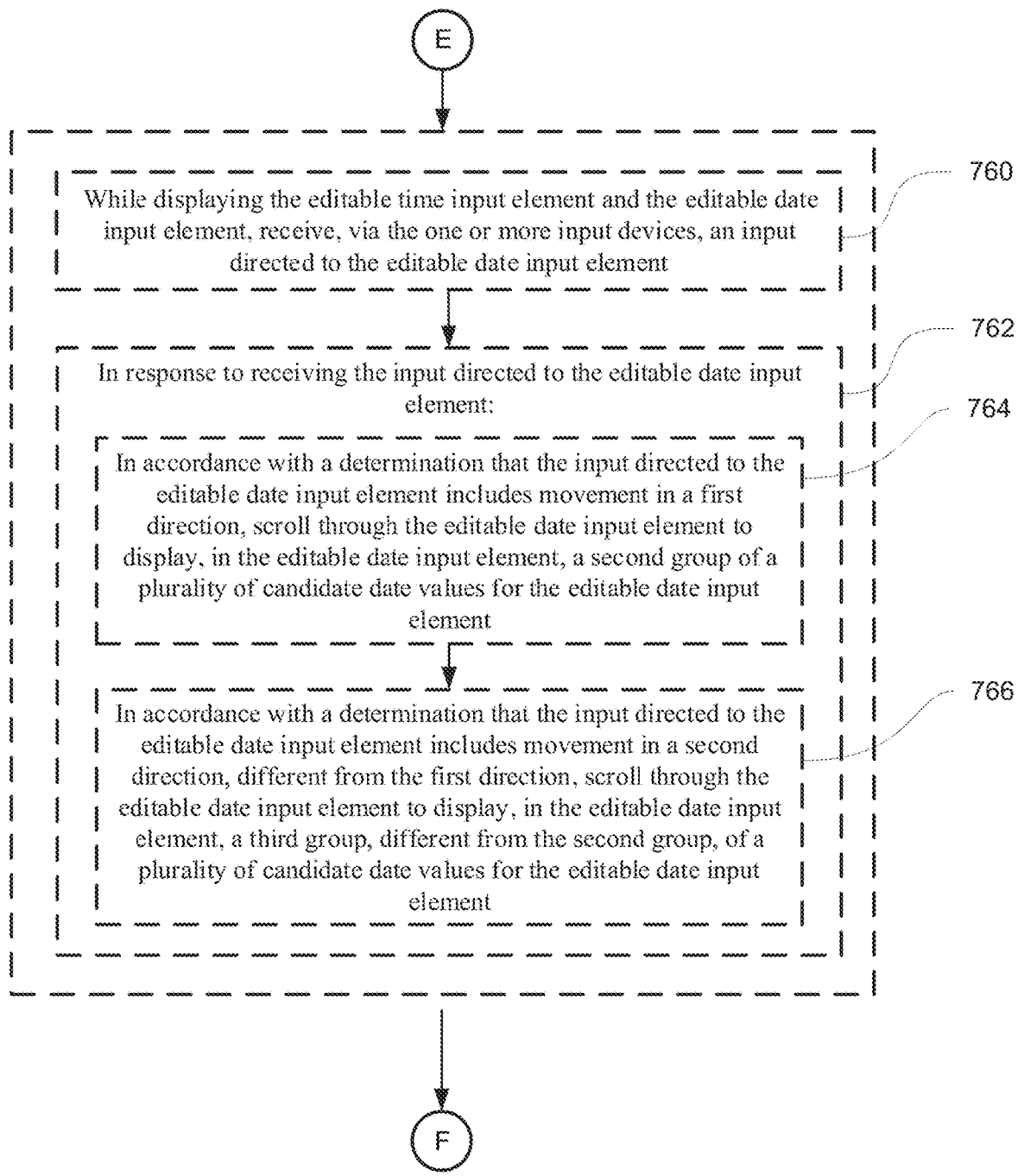
Figure 7G:
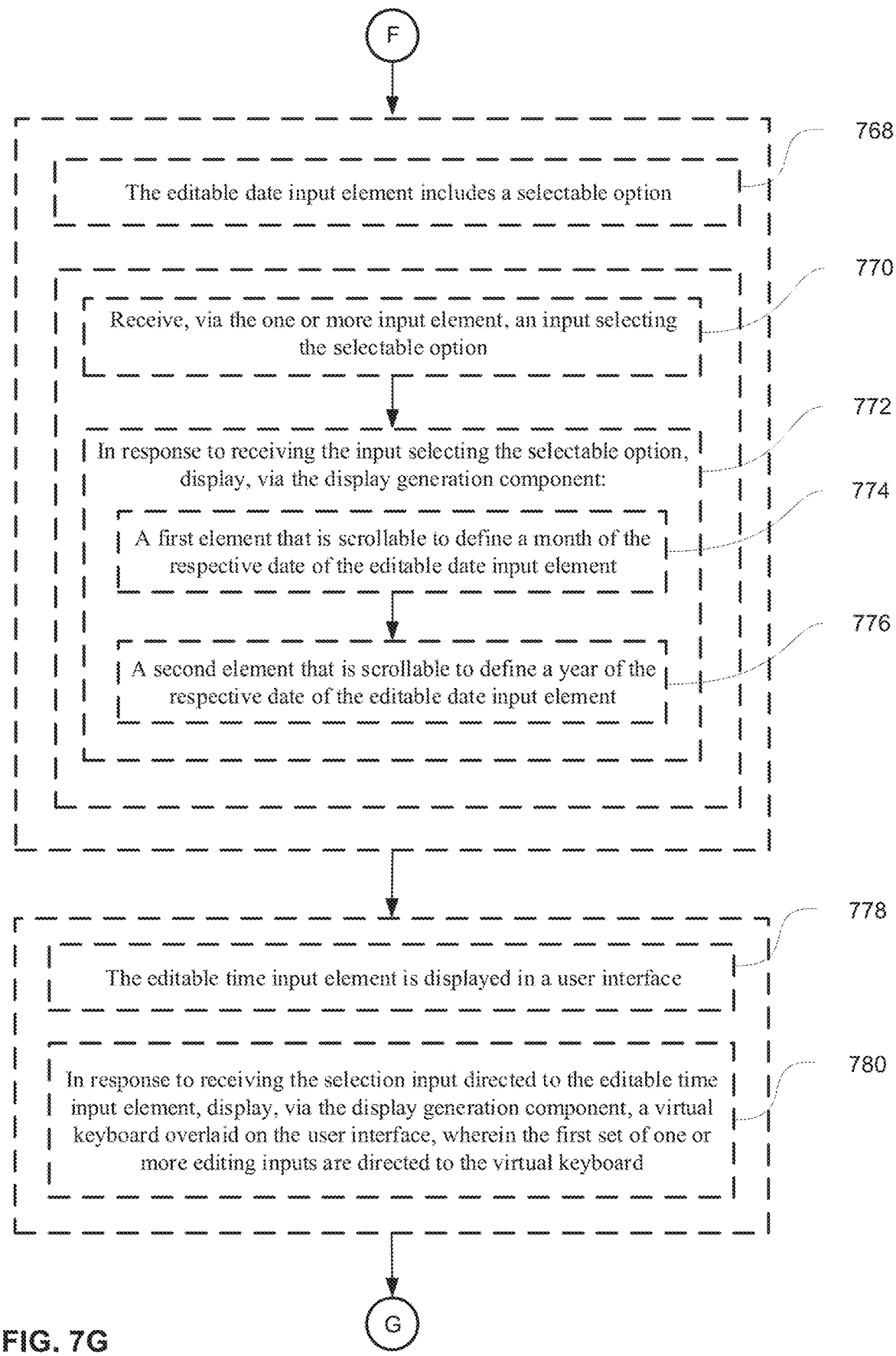
Figure 7H:
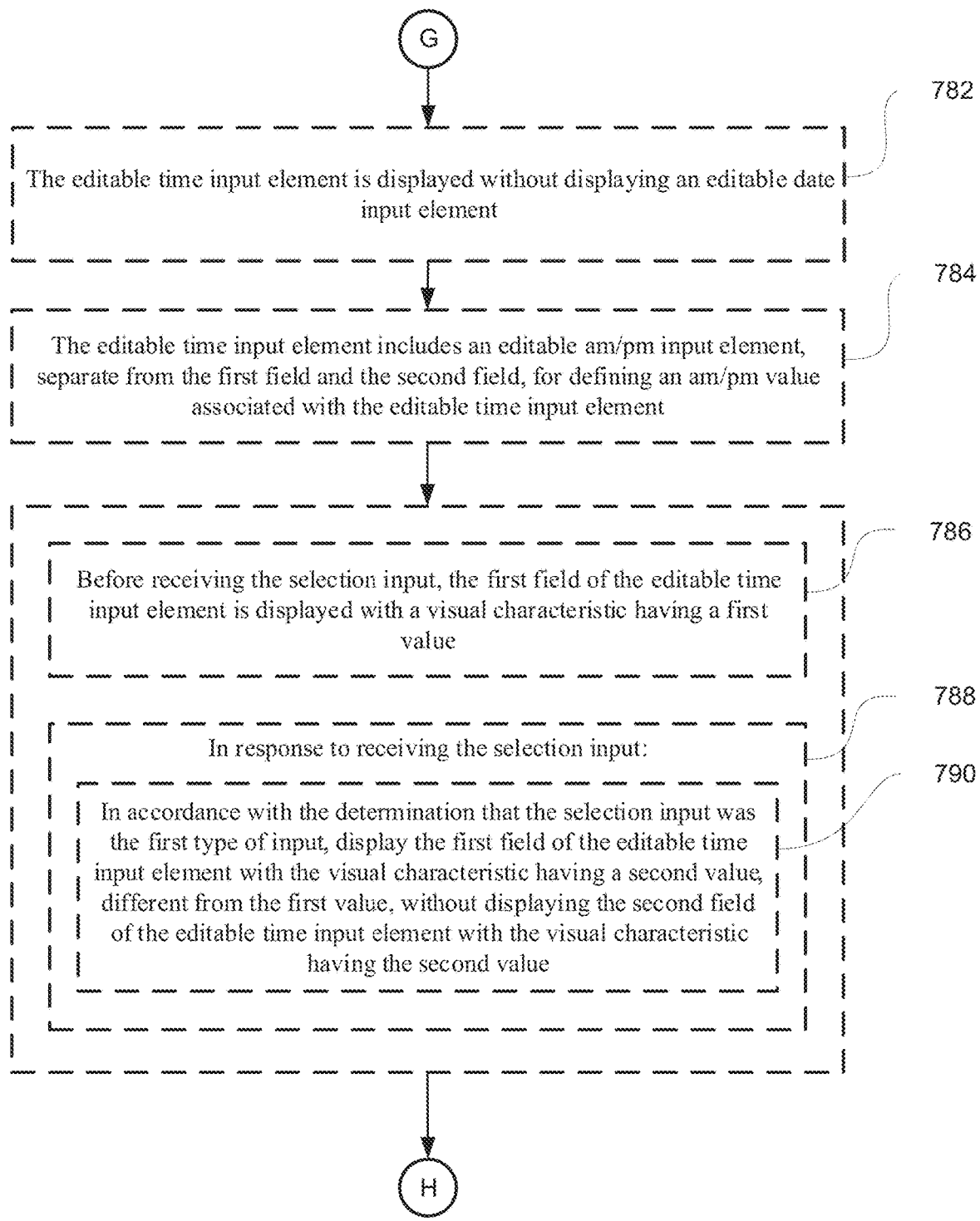
Figure 7I:
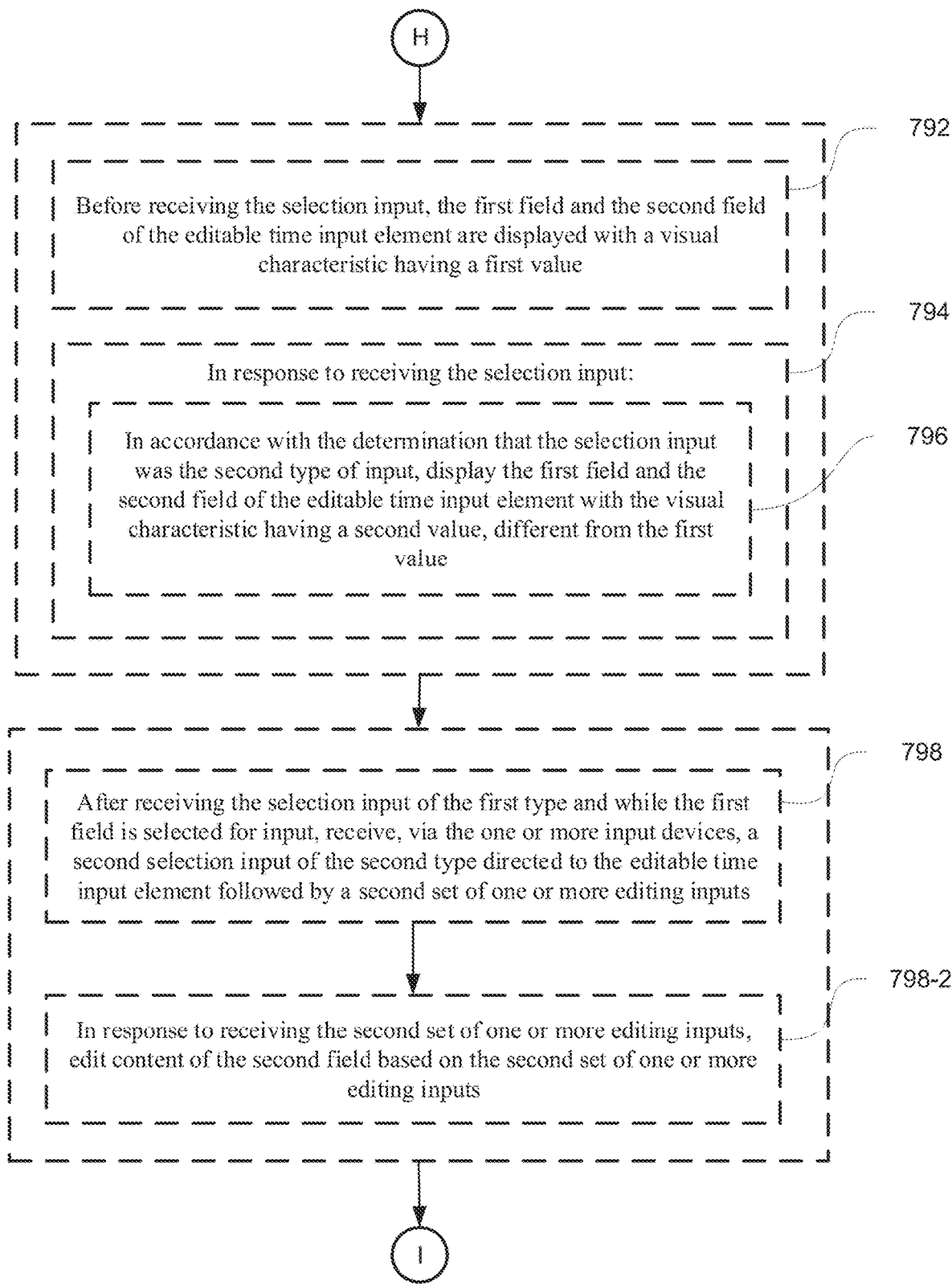
Figure 7J:
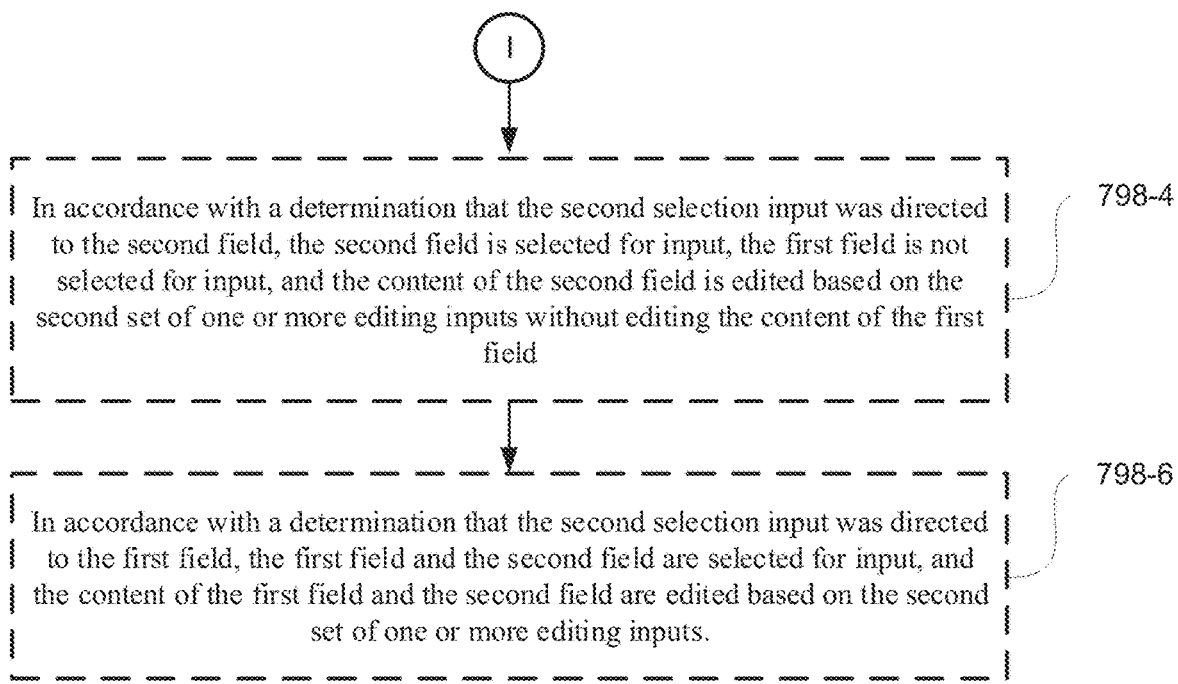

FIGS. 6A-6SS illustrate exemplary ways in which an electronic device provides for interaction with editable time and/or date input fields. The embodiments in these figures are used to illustrate the processes described below, including the processes described with reference to FIGS. 7A-7J.

FIGS. 6A-6SS illustrate the operation of the electronic device 500 in providing for interaction with editable time and/or date input fields. FIG. 6A illustrates electronic device 500 displaying user interface 600 (e.g., via a display device, via a display generation component, etc.). In some embodiments, user interface 600 is displayed via a display generation component. In some embodiments, a display generation component is a hardware component (e.g., including electrical components) capable of receiving display data and displaying a user interface. In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc. Examples of a display generation component include a touch screen display (such as touch screen 504), a monitor, a television, a projector, an integrated, discrete, or external display device, or any other suitable display device that is in communication with device 500.

In some embodiments, user interface 600 is a user interface of a calendar application (e.g., for viewing, creating, and/or managing events in a calendar). In some embodiments, the calendar application installed on device 500. It is understood that although the figures herein illustrate the editable time and date input fields in the context of a calendar application, this is merely exemplary and the scope of the disclosure is not so limited and the features described herein are applicable to any user interface for any application.

In FIG. 6A, a user input 603 is received selecting a respective time in the representation of a calendar in user interface 600. In some embodiments, user input 603 corresponds to a request to add a new calendar event to user interface 600 at the selected time (e.g., 10:30 AM). In some embodiments, in response to user input 603, device 500 displays user interface 602, as shown in FIG. 6B. In FIG. 6B, user interface 602 is a user interface for creating a new calendar event to be added to user interface 600. In some embodiments, user interface 602 is displayed over user interface 600.

In FIG. 6B, user interface 602 includes entry 604-1 corresponding to the start time of the event and entry 604-2 corresponding to the end time of the event. In some embodiments, user interface 602 includes more or fewer entries associated with other options for the event. In some embodiments, entry 604-1 includes editable date input field 606, editable time input field 608, and am/pm selection element 610. In some embodiments, entry 604-2 includes editable time input field 12 and am/pm selection element 614. As used herein, an editable date input field is a field that a user is able to interact with to select one or more dates and an editable time input field is a field that a user is able to interact with to select one or more times. In some embodiments, an editable date input field and an editable time input field are configurable to display dates and times in various formats. In one example, an editable date input field displays the date in a Month-Date-Year format. In another example, an editable date input field displays the date in a Year-Month-Date format. In yet another example, an editable date input field displays the date in a Month-Date format (e.g., without the "Year" field). Similarly, an editable time input field can display times in a Hour:Minutes format, a Minutes: Seconds format, a Hours:Minutes:Seconds format, in either a 12-hour or 24-hour format, etc.

As discussed, the editable date input field optionally includes a plurality of sub-fields, which in combination, form the editable date input field. For example, in FIG. 6B, editable date input field 606 includes a month field (with a current value of "May"), a date field (with a current value of "29"), and a year field (with a current value of "2020"). Similarly, an editable time input field optionally includes a plurality of sub-fields. For example, in FIG. 6B, editable time input field 612 includes an hours field (with a current value of "11") and a minutes field (with a current value of "30"). Interaction with and modification of the values displayed in editable date input fields and editable time input fields are described below.

In some embodiments, am/pm selection element 610 is interactable to toggle the selection of am/pm selection element 610 from selecting the "am" option to selecting the "pm" option (and vice versa). For example, a tap input on am/pm selection element 610 at a respective option causes the respective to be selected (e.g., selecting the "am" option causes the "am" option to be selected and selecting the "pm" option causes the "pm" option to be selected). In some embodiments, a leftward or rightward swipe input on am/pm selection element 610 causes selection to change either the "am" option or the "pm" option. For example, a leftward swipe causes selection of the "am" option and a rightward swipe causes selection of the "pm" option.

In FIG. 6C, a user input 603 is received selecting editable time input field 612. In FIG. 6C, user input 603 is a single tap of editable time input field 612. In some embodiments, user input 603 is received on either the hours field, the minutes field, or on the colon of editable time input field 612. In some embodiments, in response to user input 603, device 500 selects editable time input field 612 for editing, as shown in FIG. 6D. In FIG. 6D, device 500 displays virtual numpad 616 (e.g., virtual keyboard dedicated for selecting numbers). In some embodiments, alternatively to virtual numpad 616, device 500 displays a virtual keyboard (e.g., which optionally includes letters and numbers). Selecting editable time input field 612 for editing allows the values in editable time input field 612 to be changed in accordance with editing inputs. For example, selection of respective keys on virtual numpad 616 optionally causes the respective value corresponding to the selected key to be inserted into editable time input field 612.

In some embodiments, when editable time input field 612 is selected for input, device 500 displays editable time input field 612 with a first visual characteristic. For example, as shown in FIG. 6D, editable time input field 612 is highlighted. In some embodiments, editable time input field 612 is displayed with a background color different than the background color when editable time input field 612 was not selected for input or displayed with any other suitable visual characteristic that distinguishes time input field 612 from other fields that are not selected for input. As shown in FIG. 6D, when editable time entry field 612 is selected for input, both the hours field and the minutes field are selected for edit. Thus, editing editable time entry field 612 causes the hours field and the minutes field to be edited, as will be described in more detail below.

In FIG. 6D, a user input 603 is received selecting the "5" key on virtual numpad 616. In some embodiments, in response to user input 603, the value "5" is inserted into editable time entry field 612, as shown in FIG. 6E. In some embodiments, the previous values in editable time entry field 612 are removed, and the value "5" is initially inserted as the right-most digit of editable time entry field 612 (e.g., into the minutes field). In FIG. 6E, user input 603 is received selecting the "2" key on virtual numpad 616. In some embodiments, in response to user input 603, the value "2" is inserted into editable time entry field 612 to the right of the "5" that was previously inserted, as shown in FIG. 6F. Thus, in some embodiments, new values are inserted to the right of previously inserted values, causing the previously inserted values to shift leftward. It is understood that editing inputs can cause values to be inserted to the left and for previously inserted values to shift rightwards (e.g., first into the hours field, then into the minutes field).

In FIG. 6F, user input 603 is received selecting the "5" key on virtual numpad 616. In some embodiments, in response to user input 603, the value "5" is inserted into editable time entry field 612 to the right of the previously inserted values "5" and "2", as shown in FIG. 6G. In some embodiments, the previously inserted values "5" and "2" are shifted leftward such that the previously inserted value "5" is shifted into the hours field and the minutes field is updated to read "25". Thus, as shown in FIG. 6G, while editable time input field 612 is selected for input, both the minutes field and the hours field can be edited in accordance with the user's editing inputs.

In FIG. 6H, while device 500 is displaying editable time input field 612 (e.g., in a state similar to FIG. 6B), user input 603 is received on minutes field 612-2 of editable time input field 612. In some embodiments, user input 603 is a double tap (e.g., as opposed to a single tap shown in FIG. 6C). In some embodiments, in response to user input 603, minutes field 612-2 is selected for input and hours field 612-1 is not selected for input, as shown in FIG. 6I. In some embodiments, minutes field 612-2 is visually emphasized (e.g., visually distinguished), as compared to the other fields that are not selected for input (e.g., highlighted, etc.). In some embodiments, hours field 612-1 is visually de-emphasized as compared to minutes field 612-2. In some embodiments, visually de-emphasizing hours field 612-1 includes greying out hours field 612-1, displaying hours field 612-1 with a dark background, shading hours field 612-1 or otherwise indicating that hours field 612-1 will not be edited in response to editing inputs. In some embodiments, hours field 612-1 is visually de-emphasized because it is a sub-field of editable time input element 612 which includes minutes field 612-2, which is currently selected for input. Thus, because editable time input element 612 includes two sub-fields: hours field 612-1 and minutes field 612-2, when one of the fields is selected for editing but the other field is not, the field that is not selected for editing is de-emphasized to avoid confusion over which field is selected for editing.

In FIG. 6I, a user input 603 is received selecting the "5" key on virtual numpad 616. In some embodiments, in response to user input 603, the value "5" is inserted into minutes field 612-2, as shown in FIG. 6J. In some embodiments, the previous values in minutes field 612-2 are removed, and the value "5" is inserted as the right-most digit of minutes field 612-2. In some embodiments, the previous values of hours field 612-1 are not removed or edited. In FIG. 6J, user input 603 is received selecting the "2" key on virtual numpad 616. In some embodiments, in response to user input 603, the value "2" is inserted into minutes field 612-1 to the right of the "5" that was previously inserted, as shown in FIG. 6K. Thus, in some embodiments, new values are inserted to the right of previously inserted values, causing the previously inserted values to shift leftward. It is understood that editing inputs can cause values to be inserted to the left and for previously inserted values to shift rightwards.

In FIG. 6K, user input 603 is received selecting the "5" key on virtual numpad 616. In some embodiments, in response to user input 603, the value "5" is not inserted into minutes field 612-2, as shown in FIG. 6L. In some embodiments, the value "5" is not inserted into minutes field 612-2 because minutes field 612-2 is already fully populated. Thus, in some embodiments, minutes field 612-2 is not able to accept any more digits and further selection of keys on virtual keyboard 616 do not cause insertion of the respective values into minutes field 612-2. In some embodiments, further selection of keys on virtual keyboard 616 do cause insertion of the respective values into minutes field 612-2 (e.g., to the right of the previously entered values, optionally causing the left-most digit that overflows the two available digits of minutes field 612-2 to be removed from minutes field 612-2). In some embodiments, neither the previously entered values nor the newly selected value (e.g., "5") are added to hours field 612-1. Thus, as shown in FIG. 6G, while minutes field 612-2 is selected for input, the minutes field can be edited in accordance with the user's editing inputs, but the hours field is not edited in accordance with the user's editing inputs.

In FIG. 6M, while device 500 is displaying editable time input field 612 (e.g., in a state similar to FIG. 6B in which no fields are selected for input), user input 603 is received on hours field 612-1 of editable time input field 612. In some embodiments, user input 603 is a double tap (e.g., as opposed to a single tap shown in FIG. 6C). In some embodiments, in response to user input 603, hours field 612-1 is selected for input and minutes field 612-2 is not selected for input, as shown in FIG. 6N. In some embodiments, hours field 612-1 is visually emphasized as compared to the other fields that are not selected for input and minutes field 612-2 is visually de-emphasized as compared to hours field 612-1. In some embodiments, minutes field 612-2 is visually de-emphasized because it is a sub-field of editable time input element 612 which includes hours field 612-1, which is currently selected for input. Thus, because editable time input element 612 includes two sub-fields: hours field 612-1 and minutes field 612-2, when one of the fields is selected for editing but the other field is not, the field that is not selected for editing is de-emphasized to avoid confusion over which field is selected for editing.

In FIG. 6N, a user input 603 is received selecting the "4" key on virtual numpad 616. In some embodiments, in response to user input 603, the value "4" is inserted into hours field 612-1, as shown in FIG. 6O. In some embodiments, the previous values in hours field 612-1 are removed, and the value "4" is inserted as the right-most digit of hours field 612-1. In some embodiments, the previous values of minutes field 612-2 are not removed or edited. In FIG. 6O, user input 603 is received selecting the "1" key on virtual numpad 616. In some embodiments, in response to user input 603, the value "1" is not inserted into hours field 612-1, as shown in FIG. 6P. In some embodiments, the value "1" is not inserted into hours field 612-1 because inserting "1" to the right of the previously inserted value "4" results in an invalid hours value (e.g., "41"). Thus, in some embodiments, hours field 612-1 is not able to be edited in such a way that results in an invalid value. It is understood that minutes field 612-2 and other editable fields can have the same behavior. In some embodiments, the value "1" is also not inserted into the minutes field 612-2. Thus, when hours field 612-1 is selected for edit, editing inputs do not cause minutes field 612-2 to be edited.

In FIG. 6Q, while hours field 612-1 is selected for input and minutes field 612-2 is not selected for input, a user input 603 (e.g., a single tap) is received selecting hours field 612-1. In some embodiments, in response to user input 603, device 500 switches from selecting only hours field 612-1 for input to selecting editable time entry field 612 for input (e.g., the entirety of editable time entry field 612 including hours field 612-1 and minutes field 612-2), as shown in FIG.

6R. In some embodiments, editable time entry field 612 is editable in a way similar to described above with respect to FIGS. 6D-6G. Thus, selection of a sub-field that is currently selected for input optionally causes the entire field (of which the sub-field is a part) to be selected for input.

In FIG. 6S, while editable time entry field 612 is selected for input, a user input 603 (e.g., a single tap) is received selecting hours field 612-1. In some embodiments, in response to user input 603, device 500 switches from selecting editable time entry field 612 for input to selecting only hours field 612-1 for input (e.g., and not selecting minutes field 612-2 for input), as shown in FIG. 6T. Thus, while a field that has a plurality of sub-fields is selected for input, selection of a particular sub-field causes the selected sub-field to be selected for input and the other sub-fields to not be selected for input.

In FIG. 6U, while hours field 612-1 is selected for input and minutes field 612-2 is not selected for input, a user input 603 (e.g., a single tap) is received selecting minutes field 612-2. In some embodiments, in response to user input 603, device 500 switches from selecting hours field 612-1 for input and not selecting minutes field 612-2 for input to selecting minutes field 612-2 for input and not selecting hours field 612-1 for input, as shown in FIG. 6V. Thus, while a particular sub-field is selected for input, selecting the other sub-field that is not currently selected for input causes the newly selected sub-field to become selected for input and the sub-field that was originally selected for input to no longer be selected for input.

In FIG. 6W, while device 500 is displaying editable time input field 612 (e.g., in a state similar to FIG. 6B in which no fields are selected for input), a contact 603 is received on hours field 612-1 (e.g., a touch-down of a finger on touch screen 504 at the location of hours field 612-1). In FIG. 6W, a downward swipe of contact 603 is detected while maintaining contact with touch screen 504. In some embodiments, in response to the downward swipe of contact 603, device 500 displays hours list 618 and decrements hours field 612-1 by one increment (e.g., decrements by one from "4" to "3", decrements by two, three, six, twelve, etc.), as shown in FIG. 6X. In some embodiments, device 500 generates a haptic output (e.g., a tap output, a vibration output, etc.) when hours field 612-1 is incremented or decremented (e.g., each time hours field 612-1 is incremented or decremented). In some embodiments, hours list 618 includes one or more valid values for hours field 612-1. For example, in FIG. 6X, hours list 618 includes value 620-1 through value 620-5. In some embodiments, the values displayed in hours list 618 is sorted in increasing order. In some embodiments, an upward or downward swipe of contact 603 causes the values in hours list 618 to scroll upwards or downwards, respectively. In some embodiments, the value at the middle of hours list 618 (e.g., value 620-3, displayed at the same location of hours field 612-1) is the currently selected value such that upon terminating contact 603 (e.g., upon lift-off of contact 603 with touch screen 504), the value at the middle of hours list 618 is selected as the value displayed in hours field 612-1.

In FIG. 6Y, a further downward swipe of contact 603 is detected while maintaining contact with touch screen 504. In some embodiments, in response to the downward swipe of contact 603, device 500 decrements hours field 612-1 by one increment (e.g., decrements by one from "3" to "2", decrements by two, three, six, twelve, etc.), as shown in FIG. 6Y. In some embodiments, device 500 generates another haptic output (e.g., a tap output, a vibration output, etc.). In some embodiments, the values listed in hours list 618 scrolls downwards (e.g., value 620-1 becomes a "12", value 620-2 becomes a "1", value 620-3 becomes a "2", etc.), thus revealing a new value at the top of hours list 618 that was not previously displayed (e.g., "12") and ceasing display of a value that was previously at the bottom of hours list 618 (e.g., "5"). As shown, the values in hours list 618 wraps around (e.g., continues to the maximum value when the list reaches the minimum value or continues to the minimum value when the list reaches the maximum value).

Thus, as shown above, in some embodiments, every time the movement of contact 603 moves by a threshold amount (e.g., 0.1 mm, 0.5 mm, 1 cm, 3 cm, 5 cm, etc.), the values in hours list 618 scrolls by one increment (e.g., such that release of contact 603 would cause hours field 612-1 to increment or decrement by one increment). Accordingly, the speed of the movement of the user input affects the speed of the scrolling amongst the values in hours list 618. In some embodiments, scrolling the values in hours list 618 has an inertial effect. For example, if the speed of the movement of contact 603 is fast, then upon termination of contact 603 (e.g., lift-off of contact 603), the values in hours list 618 optionally continues to scroll in the respective direction. In some embodiments, the number of increments and speed of the scrolling depends on the speed of the movement of contact 603 at the time that the contact was terminated. Thus, device 500 is able to simulate an inertial scrolling effect, similar to if a user spun a wheel quickly.

For example, in FIG. 6Y, if the speed of the downward swipe of contact 603 was fast, then in FIG. 6Z, in response to detecting a termination of contact 603, the values in hours list 618 continues to scroll by one increment, as shown in FIG. 6Z. In some embodiments, device 500 generates another haptic output (e.g., tap output, vibration output, etc.) even though contact with the touch screen 504 is no longer detected. In some embodiments, while the values in hours list 618 continues to scroll, hours list 618 continues to be displayed. In some embodiments, hours list 618 ceases to be displayed after a threshold amount of time after the values in hours list 618 stops scrolling (e.g., after 0.1 seconds, 0.5 seconds, 1 second, 3 seconds, 5 seconds, etc.). In some embodiments, hours list 618 ceases to be displayed in response to detecting the termination of contact 603 (e.g., even if hours field 612-1 continues to be incremented or decremented). In some embodiments, when hours list 618 ceases to be displayed, the value at the center of hours list 618 (e.g., value 620-3) is selected as the value displayed in hours field 612-2. For example, in FIG. 6AA, after hours list 618 ceases to be displayed, the value "1" is inserted into hours field 612-1.

In FIG. 6AA, while minutes field 612-2 is not selected for input, a contact 603 is received on minutes field 612-2. In FIG. 6BB, an upward swipe of contact 603 is detected while maintaining contact with touch screen 504. In some embodiments, in response to the upward swipe of contact 603, device 500 displays minutes list 622 and increments minutes field 612-2 by one increment, as shown in FIG. 6BB. In some embodiments, device 500 generates a haptic output (e.g., a tap output, a vibration output, etc.). In some embodiments, the increments for the hours field and the minutes field is different. For example, minutes field 612-2 is incremented or decremented in five minute increments (although it is understood that other increments are possible, such as 1 minute, 10 minutes, 15 minutes, 30 minutes, etc.). Thus, as shown in FIG. 6BB, minutes list 622 includes values that are multiples of five (e.g., the increment by which minutes field 612-2 is incremented or decremented). For example, value 624-1 is 50, value 624-3 is "55", value 624-4 is "00" and value 624-5 is "05". In some embodiments, if a respective field is not incremented or decremented by increments of 1, then the list of values includes the original value of the field. For example, in FIG. 6BB, the original value of minutes field 612-2 is "52", which is not a multiple of five. Thus, minutes list 622 includes the value "52" such that a user is able to scroll upwards and/or downwards to select the original value of minutes field 612-2 (e.g., and thus forgoing changing the value of minutes field 612-2). As shown, the values in minutes list 622 wraps around (e.g., continues to the minimum value when the list reaches the maximum value or continues to the maximum value when the list reaches the minimum value).

In FIG. 6CC, a further upward swipe of contact 603 is detected while maintaining contact with touch screen 504. In some embodiments, in response to the upward swipe of contact 603, device 500 increments minutes field 612-2 by one increment (e.g., increments by five from "55" to "00"), as shown in FIG. 6CC. In some embodiments, device 500 generates another haptic output (e.g., a tap output, a vibration output, etc.). In some embodiments, the values listed in minutes list 622 scrolls upwards (e.g., value 624-1 becomes "52", value 620-2 becomes "55", value 620-3 becomes "00", etc.), thus revealing a new value at the bottom of minutes list 622 that was not previously displayed (e.g., "10") and ceasing display of a value that was previously at the top of minutes list 622 (e.g., "50").

In FIG. 6CC, the upward swipe of contact 603 is slow or the upward movement of contact 603 stopped before termination of contact 603. Thus, in FIG. 6DD, in response to detecting a termination of contact 603, minutes list 622 does not continue to scroll with an inertial effect (e.g., the effect of the inertial was minimal such that minutes list 622 did not scroll) and ceases to be displayed. Thus, in FIG. 6DD, minutes field 612-2 is populated with "00" (e.g., the value at the center of minutes list 622 when minutes list 622 ceased to be displayed.

Thus, as discussed above, an upward or downward swipe on a respective sub-field optionally causes the sub-field to increment or decrement in accordance with the direction of the swipe (e.g., downward to decrement and upward to increment or vice versa). In some embodiments, the respective sub-field need not be selected for input and the sub-field that is edited is based on the sub-field that received the initial contact (e.g., the initial touch-down of the user input). In some embodiments, the sub-field that is incremented or decremented in response to an upward or downward swipe is the sub-field that is selected for input when the upward or downward swipe was received (e.g., if a sub-field is selected for input when the contact was received, without regard to which sub-field received the initial touch-down of the user input and optionally even if the contact is not received on any of the sub-fields or the field itself).

FIGS. 6EE-6OO illustrate embodiments of editing an editable date entry field. In FIG. 6EE, user input 603 (e.g., a single tap input) is received selecting editable date entry field 606. In some embodiments, in response to user input 603, editable date entry field 606 is selected for input and representation 628 of a calendar is displayed on user interface 602, as shown in FIG. 6FF. In some embodiments, editable date entry field 606 includes sub-fields (e.g., month field, date field, hours field) which can be edited individually similarly to the process described above (e.g., in response to a double-tap input on a respective sub-field, for example). In some embodiments, representation 628 of a calendar is integrated with the contents on user interface 602 and displaces entry 604-2 downwards to provide room for representation 628, as shown in FIG. 6FF.

In some embodiments, representation 628 displays the days for a particular month (optionally for a particular year). For example, in FIG. 6FF, May 2020 is the currently selected month 626 and representation 628 displays the dates in May 2020. As shown in FIG. 6FF, May 29 is currently selected in representation 628 (e.g., "29" is highlighted). In some embodiments, a user is able to select one of the dates displayed in representation 628 to cause the date to be selected for and displayed in editable date entry field 606.

In FIG. 6GG, a leftward swipe of contact 603 is received across representation 628. In some embodiments, in response to the leftward swipe of contact 603, representation 628 is updated to display the next month (e.g., June 2020), as shown in FIG. 6GG. Thus, in some embodiments, representation 628 is horizontally swipe-able to scroll to the next or previous month.

In FIG. 6HH, a user input 603 is received selecting current month 626. In some embodiments, in response to user input 603, representation 628 of a calendar is replaced with months list 630-1 and years list 630-2. In some embodiments, months list 630-1 includes a plurality of months and is selectable and/or scrollable to quickly select a respective month to be displayed in representation 628 (e.g., as the current month 626). In some embodiments, years list 630-2 includes a plurality of months and is selectable and/or scrollable to quickly select a respective year to be displayed in representation 628 (e.g., as the year for current month 626). In FIG. 6JJ, an upward swipe gesture of contact 603 is received on months list 630-1.

In some embodiments, in response to the upward swipe of contact 603, months list 630-1 is scrolled upwards, moving "July" to the center of months list 630-1, as shown in FIG. 6JJ. In some embodiments, the month and year displayed at the middle of the respective list is the selected month and year. Thus, in FIG. 6JJ, current month 626 becomes July 2020. It is understood that years list 630-2 can also be scrolled similarly to months list 630-1 to select a different year for current month 626.

In FIG. 6KK, a user input 603 is received selecting current month 626, thus causing dismissal of months list 630-1 and years list 630-2 and restoring display of representation 628 of a calendar, as shown in FIG. 6LL. In FIG. 6LL, representation 628 has been updated to display the days for July 2020, the month and year selected in FIG. 6JJ.

In FIG. 6LL, a user input 603 is received selecting the date July 23 from representation 628. In some embodiments, in response to user input 603, Jul. 23, 2020 is selected as the date for editable date input field 606, as shown in FIG. 6MM.

FIGS. 6NN-6OO illustrate an alternative embodiment of displaying the representation of a calendar. In FIG. 6NN, a user input 603 is received selecting editable date entry field 606 while editable date entry field 606 is not selected for input. In some embodiments, in response to user input 603, device 500 displays user interface 630, as shown in FIG. 6OO. In some embodiments, user interface 630 includes a representation of a calendar, similar to representation 628 described above. In some embodiments, user interface 630 is an overlay user interface that is displayed overlaid over at least a portion of the user interface 602. In some embodiments, because user interface 630 is displayed overlaid over user interface 620, rather than integrated into user interface 620, entry 604-2 is not displayed by the representation of the calendar. In some embodiments, similarly to representation 628, user interface 630 is interactable to display the next or previous month and the dates in user interface 630 is selectable to cause the respective date to be selected for editable date entry field 606.

FIGS. 6PP-6SS illustrate an alternative embodiment of displaying a virtual numpad. In FIG. 6PP, device 500 is a device with a large display area such as a tablet computer and is displaying user interface 632 corresponding to a calendar application (e.g., similar to user interface 600). In FIG. 6PP, a user input 603 is received corresponding to a request to add an event to the calendar. In some embodiments, in response to user input 603, device 500 displays user interface 634. In some embodiments, user interface 634 is a user interface for adding a new event into the calendar. In FIG. 6QQ, user interface 634 includes editable date entry field 606 and editable time entry field 612. In FIG. 6RR, a user input 603 is received selectable editable time entry field 612. In some embodiments, in response to user input 603, device 500 displays virtual numpad 636, as shown in FIG. 6SS. In FIG. 6SS, virtual numpad 636 is displayed as an overlay at or near the location of editable time entry field 612 (e.g., instead of at or near the bottom of the touch screen 504 as in FIG. 6D).

FIGS. 7A-7J are flow diagrams illustrating a method 700 of providing for interaction with editable time and/or date input fields. The method 700 is optionally performed at an electronic device such as device 100, device 300, and device 500 as described above with reference to FIGS. 1A-1B, 2-3, 4A-4B and 5A-5I. Some operations in method 700 are, optionally combined and/or order of some operations is, optionally, changed.

As described below, the method 700 provides ways to interact with editable time and/or date input fields. The method reduces the cognitive burden on a user when interacting with a user interface of the device of the disclosure, thereby creating a more efficient human-machine interface. For battery-operated electronic devices, increasing the efficiency of the user's interaction with the user interface conserves power and increases the time between battery charges.

In some embodiments, an electronic device in communication with a display generation component and one or more input devices (e.g., a mobile device (e.g., a tablet, a smartphone, a media player, or a wearable device), or a computer, optionally in communication with one or more of a mouse (e.g., external), trackpad (optionally integrated or external), touchpad (optionally integrated or external), remote control device (e.g., external), another mobile device (e.g., separate from the electronic device), a handheld device (e.g., external), and/or a controller (e.g., external), etc.) displays (702), via the display generation component, an editable time input element (e.g., a user interface element for selecting a time and/or a date), wherein the editable time input element includes a first field (e.g., a first time or date field in the editable time input element) and a second field, such as hours field 612-1 and minutes field 612-2 of editable time entry field 612 in FIG. 6H (e.g., a second time or date field in the editable time input element different from the first field).

In some embodiments, the display generation component is a display integrated with the electronic device (optionally a touch screen display), external display such as a monitor, projector, television, or a hardware component (optionally integrated or external) for projecting a user interface or causing a user interface to be visible to one or more users, etc.

In some embodiments, the editable time input element is a textual indication of a respective time (e.g., 10:30 AM, 5:30 PM, etc.). In some embodiments, the editable time input element includes a plurality of fields corresponding to the constituent parts of the time and/or date. For example, a time element optionally has an hours, minutes, and/or seconds constituent part and a date element optionally has a month, day, and/or years constituent part. In some embodiments, the editable time input element is selectable to edit one or more of the fields within the editable time input element (e.g., the hours field, the minutes field, the morning or evening notations for 12-hour clocks (e.g., AM/PM notation), etc.). In some embodiments, the editable time input element is a textual indication of a respective date (e.g., March 28, August 17, etc.). In some embodiments, the editable time input element is any value with two sub-values, two constituent parts, or two portions that are able to be independently edited, etc.

In some embodiments, if the editable time input element is a time element, then the first field is the hour, minute, or second field. In some embodiments, if the editable time input element is a date element, then the first field is the month, day, or year field. In some embodiments, if the first field is the hour field, then the second field is optionally the minute field or optionally the seconds field. In another example, if the first field is the month field, then the second field is optionally the day field or the year field.

In some embodiments, while displaying the editable time input element, the electronic device receives (704), via the one or more input devices, a selection input directed to the editable time input element, such as user input 603 in FIG. 6C on editable time entry field 612 (e.g., receiving a selection input, such as a tap input, on the editable time input element or, optionally, specifically on the first field of the editable time input element). In some embodiments, the selection input is on the first field or the second field.

In some embodiments, after receiving the selection input, the electronic device receives (706) a first set of one or more editing inputs, such as selection of keys on virtual keyboard 616 in FIGS. 6D-6F (e.g., one or more key presses on a physical keyboard or touch inputs corresponding to selection of virtual keys on a soft keyboard).

In some embodiments, in response to receiving the first set of one or more editing inputs (708), in accordance with a determination that the selection input was a first type of input, such as double tap input 603 in FIG. 6H, the electronic device edits (710) content of the first field based on the first set of one or more editing inputs, such as the insertion of "5" and "2", and "5" into minutes field 612-2 in FIGS. 6J-6K (e.g., if the selection input is a double tap input, then select the first field for editing and subsequent editing inputs edits the content in the first field). In some embodiments, in response to the selection input, a soft keyboard (e.g., a keyboard or a numpad) or a scrollable element is displayed to enable a user to select a respective value to insert as the value for the first field (thus enabling the user to edit the value of the first field). In some embodiments, the editing input includes selecting a letter or number on the soft keyboard, a selection of a letter or number from the scrollable element, and/or a scrolling gesture on the scrollable element. In some embodiments, the first field is selected for editing without regard to the field on which the user input was received (e.g., a double tap on the first field and the second field optionally both result in the first field being selected for editing). In some embodiments, the first type of input does not cause the second field to be selected for editing. In some embodiments, when the first field is selected for editing in response to the input of the first type, then the second field is not editable (e.g., editing inputs do not edit the contents in the second field).

In some embodiments, in response to receiving the first set of one or more editing inputs, in accordance with a determination that the selection input was a second type of input, different from the first type, such as single tap input 603 in FIG. 6C, the electronic device edits (712) content of the first field and the second field based on the first set of one or more editing inputs, such as the insertion of "5", "2", and "5" into editable time entry field 612 in FIGS. 6E-6G (e.g., if the selection input is a single tap, then subsequent editing inputs edit both the first and the second fields).

In some embodiments, in response to the selection input, a soft keyboard (e.g., a keyboard or a numpad) or a scrollable element is displayed to enable a user to select a respective value to insert as the value for the first and/or second field (thus enabling the user to edit the values of the first and second field). In some embodiments, the editing input includes selecting a letter or number on the soft keyboard, a selection of a letter or number from the scrollable element, and/or a scrolling gesture on the scrollable element. In some embodiments, editing inputs cause respective content (e.g., letters and/or numbers) to be inserted first into the first field and then into the second field (or vice versa). In some embodiments, the first and second fields are selected for editing without regard to the field on which the user input was received (e.g., a single tap on the first field and the second field optionally both result in the first and second fields being selected for editing). In some embodiments, the second type of input causes all fields of the editable time input element to be selected (e.g., three fields if the editable time input element includes three fields, etc.). It is understood that the first type of input and second type of input can be any two types of inputs. In some embodiments, the first type of input is a single tap and the second type of input is a double tap. In some embodiments, the first type of input is a single tap with one finger and the second type of input is a single tap with two fingers. In some embodiments, the first type of input is an upward swipe and the second type of input is a downward swipe. Other types of inputs and/or combinations of inputs are contemplated.

The above-described manner of selecting particular fields of an editable time input element (e.g., by selecting the first field of the element in response to a first type of selection input and by selecting the first and the second fields of the element in response to a second type of selection input) provides the user with a quick and efficient way of selecting between editing a single field or multiple fields of a editable time input element (e.g., automatically selecting one field or the other based on the type of user input, without requiring the user to perform additional inputs to switch from editing a single field or editing both fields or perform additional inputs to edit one field and then switch to editing another field), which simplifies the interaction between the user and the electronic device and enhances the operability of the electronic device and makes the user-device interface more efficient (e.g., providing the ability to intelligently edit a single or multiple fields of the editable time input element), which additionally reduces power usage and improves battery life of the electronic device by enabling the user to use the electronic device more quickly and efficiency, while reducing errors in usage.

In some embodiments, the first field is an hours field for defining an hours value for the editable time input element, and the second field is a minutes field for defining a minutes value for the editable time input element (714), such as hours field 612-1 and minutes field 612-2 in FIG. 6H (e.g., the editable time input element includes an hours and minutes field (such as for a clock or alarm function)).

In some embodiments, the editable time input element includes a minutes field and a seconds field (such as for a timer function). In some embodiments, the editable time input element includes the first, the second, and a third field (e.g., hours, minutes, seconds, etc.). In some embodiments, each field is individually editable (e.g., via a selection input of a first type) or the fields are able to be edited together (e.g., via a selection input of a second type).

The above-described manner of selecting either the hours or minutes field or both the hours and minutes field of the editable time input element (e.g., by selecting the hours field of the element in response to a first type of selection input and by selecting both the hours and minutes field fields of the element in response to a second type of selection input) provides the user with a quick and efficient way of selecting between editing a single field or multiple fields of a editable time input element (e.g., automatically selecting one field or the other based on the type of user input, without requiring the user to perform additional inputs to switch from editing a single field or editing both fields or perform additional inputs to edit one field and then switch to editing another field), which simplifies the interaction between the user and the electronic device and enhances the operability of the electronic device and makes the user-device interface more efficient (e.g., providing the ability to intelligently edit a single or multiple fields of the editable time input element), which additionally reduces power usage and improves battery life of the electronic device by enabling the user to use the electronic device more quickly and efficiency, while reducing errors in usage.

In some embodiments, while displaying the editable time input element (716), such as editable time entry field 612 in FIG. 6B, the electronic device receives (718), via the one or more input devices a second selection input directed to the editable time input element, such as user input 603 in FIG. 6C (e.g., a selection input, such as a tap input, on the editable time input element).

In some embodiments, after receiving the second selection input, the electronic device receives (720), via the one or more input devices a second set of one or more editing inputs, such as selection of keys on virtual keyboard 616 in FIGS. 6D-6F (e.g., one or more key presses on a physical keyboard or touch inputs corresponding to selection of virtual keys on a soft keyboard). In some embodiments, in response to the selection input, a soft keyboard (e.g., a keyboard or a numpad) or a scrollable element is displayed to enable a user to select a respective value to insert as the value for the first field (thus enabling the user to edit the value of the first field). In some embodiments, the editing input includes selecting a letter or number on the soft keyboard, a selection of a letter or number from the scrollable element, and/or a scrolling gesture on the scrolling element.

In some embodiments, in response to receiving the second set of one or more editing inputs (722), in accordance with a determination that the second selection input was the first type of input (e.g., the selection input was a double tap input) and the second selection input was directed to a location in the editable time input element different from a location in the editable time input element to which the selection input was directed (e.g., if the first selection input was directed to the first field, the second selection input is directed to the second field or optionally if the first selection input was directed to the second field, the second selection input is directed to the first field), the electronic device edits (724)

content of the second field based on the second set of one or more editing inputs, such as the insertion of "4" into hours field 612-1 in FIG. 6O after receiving a double tap user input 603 in FIG. 6M (e.g., editing the content in the second field).

Thus, in some embodiments, if the user input is a first type and directed to the first field, then the first field is selected for editing (e.g., such that editing inputs edits the contents in the first field) and if the user input is a first type and directed to the second field, then the second field is selected for editing (e.g., such that editing inputs edits the contents in the second field). In some embodiments, when the second field is selected for editing in response to the input of the first type, then the first field is not editable (e.g., editing inputs do not edit the contents in the first field).

In some embodiments, in response to receiving the second set of one or more editing inputs, in accordance with a determination that second selection input was the second type of input, the electronic device edits (726) the content of the first field and the second field based on the second set of one or more editing inputs, such as the insertion of "5", "2", and "5" into editable time entry field 612 in FIGS. 6E-6G (e.g., if the selection input is a single tap on the second field, then subsequent editing inputs edit both the first and the second fields). Thus, in some embodiments, a double tap on the first field causes the first field to be edited and a double tap on the second field causes the second field to be edited while a single tap on either the first or second field causes both fields to be edited together.

The above-described manner of selecting the second field of an editable time input element (e.g., by performing a selection input of the first type on the second field of the element) provides the user with a quick and efficient way of selecting between editing the first field, the second field, or both fields of a editable time input element (e.g., automatically selecting one field or the other based on whether the selection input of the first type is on the first field or the second field, without requiring the user to perform additional inputs to switch from editing a single field or editing both fields or perform additional inputs to edit one field and then switch to editing another field), which simplifies the interaction between the user and the electronic device and enhances the operability of the electronic device and makes the user-device interface more efficient (e.g., providing the ability to intelligently edit the first field, the second field, or multiple fields of the editable time input element), which additionally reduces power usage and improves battery life of the electronic device by enabling the user to use the electronic device more quickly and efficiency, while reducing errors in usage.

In some embodiments, while displaying the editable time input element, the electronic device receives (728), via the one or more input devices, an input directed to the first field, wherein the input includes a first movement, such as the downward swipe of contact 603 in FIG. 6X (e.g., an input with a movement component, different from the first type or second type of input). In some embodiments, the input is a touchdown of a contact on the first field followed by an upward or downward swipe gesture. In some embodiments, the input directed to the first field that includes the first movement is received while the first field is not selected for editing (optionally while neither the first nor the second fields are selected for editing). In some embodiments, the input is received while the first field is selected for editing (e.g., in response to a selection input of a first type on the first field).

In some embodiments, in response to receiving the input directed to the first field, the electronic device changes (730) the content of the first field based on the first movement without changing content of the second field, such as decrementing hours field 612-1 from "4" to "3" in FIG. 6X (e.g., editing the contents of the first field based on the movement component of the user input).

For example, an upward swipe gesture optionally causes first field to be decremented and an upward swipe gesture optionally causes the first field to be incremented. In some embodiments, an upward swipe gesture optionally causes first field to be incremented and an upward swipe gesture optionally causes the first field to be decremented. In some embodiments, the first field is incremented or decremented by increments of 1, 5, 10, 30, etc. In some embodiments, the distance (e.g., magnitude) of the swipe input determines the amount that the first field is incremented or decremented. In some embodiments, the first field is incremented or decremented by one increment when (e.g., each time) time the swipe input moves by a predefined distance (e.g., 0.1 mm, 0.5 mm, 1 mm, 2 cm, 5 cm, etc.). In some embodiments, the speed of the incrementing or decrementing depends on the speed of the swipe input (e.g., due to traversing the predefined distance faster). Thus, in some embodiments, the direct, distance, and speed of the swipe input determines whether to increment or decrement and how much and how fast to increment or decrement. In some embodiments, while the first field is being incremented or decremented, the second field is not edited or otherwise modified. In some embodiments, in response to detecting the first movement, the device displays a user interface element that includes a list of candidate values that is scrollable to select a value from the list of candidate values. In some embodiments, the list of candidate values scrolls based on the swipe input, as described above. For example, if the input is an upward swipe, then the list of candidate values scrolls upwards to select larger values, and if the input is a downward swipe, then the list of candidate values scrolls downwards to select smaller values. In some embodiments, the list of candidates wraps to the bottom of the list if the list reaches the top of the list, and vice versa. For example, in a 12-hour clock, if the list of values reaches 12 (the maximum value) when scrolling upwards, then the next candidate value after 12 is 1 (e.g., the minimum value), then 2, then 3, etc. In some embodiments, after detecting the termination of the first movement and/or after detecting termination of the input (e.g., lift-off of the contact with the touch-screen), the list of candidate values is ceased to be displayed. In some embodiments, the field that is incremented or decremented in response to the swipe input is based on the field that is edited for input when the swipe input is received. For example, the contents of the first field are incremented or decremented in response to the swipe input if the first field is selected for input when the swipe input was received (e.g., optionally even if the swipe input was received on the second field). In another example, the contents of both the first and second field are incremented or decremented in response to the swipe input if both the first and second field are selected for input when the swipe input was received (e.g., regardless of whether the swipe input was received on the first field or the second field). In some embodiments, the field that is incremented or decremented in response to the swipe input is based on which field the swipe input is received on. For example, the contents of the first field are incremented or decremented in response to the swipe input if the swipe input is received on the first field (e.g., optionally even if the first field was not selected for input when the swipe input was received).

The above-described manner of editing a particular field of an editable time input element (e.g., in response to an upward or downward swipe) provides the user with a quick and efficient way of editing the fields of the editable time input element (e.g., without requiring a separate selection input or the use of a physical or virtual keyboard), which simplifies the interaction between the user and the electronic device and enhances the operability of the electronic device and makes the user-device interface more efficient (e.g., by providing an additional and simple way to perform minor edits to increment or decrement the value in a particular field of the editable time input element), which additionally reduces power usage and improves battery life of the electronic device by enabling the user to use the electronic device more quickly and efficiency, while reducing errors in usage.

In some embodiments, changing the content of the first field includes scrolling through a plurality of candidate values for the first field with inertia based on the first movement, including scrolling through the plurality of candidate values for the first field after detecting an end of the first movement (732), such as the continued scrolling of hours list 618 after termination of contact 603 in FIG. 6ZZ (e.g., upon detecting an end of the user input, the first field continues to be incremented or decremented (as the case may be) to mimic the inertia or momentum of the input decreasing from the speed of the movement at the time that the input was terminated).

For example, after detecting the end of the user input (e.g., liftoff of the contact that defined the input), the first field increments or decrements one (or two, five, etc.) more times. In some embodiments, if the movement of the input ends without detecting the release of the contact, then the first field does not experience the inertial scrolling effect. In some embodiments, if the contact is released while the movement has a velocity, then the first field experiences the inertial scrolling effect In some embodiments, the amount of change in the first field after lift-off of the contact depends on the magnitude of the swipe input, the speed of the swipe input, and/or the acceleration of the swipe input. For example, if the speed of the swipe input is fast at the time of lift-off, then the first field optionally increments or decrements by multiple increments (e.g., two, three, five, etc. increments), but if the speed of the swipe input is slow at the time of lift-off, then the first field optionally increments or decrements once or twice. In some embodiments, the speed of the change (e.g., time between increments or decrements) after lift-off depends on the speed and/or acceleration of the swipe input at the time of lift-off. For example, the speed of the change is linearly decreasing from the speed at the time of lift-off to zero (or optionally logarithmically decreasing, exponentially decreasing, decreasing according to a polynomial function, etc.). In some embodiments, the list of candidates values remains displayed while the field continues to be incremented or decremented and is ceased to be displayed after a threshold amount of time after the first field stops to be incremented or decremented (e.g., after 0.1 seconds, 0.5 seconds, 1 second, 3 seconds, etc.).

The above-described manner of editing a particular field of an editable time input element (e.g., continuing to increment or decrement the field even after the user input has been terminated) provides the user with a quick and efficient way of editing the fields of the editable time input element, which simplifies the interaction between the user and the electronic device and enhances the operability of the electronic device and makes the user-device interface more efficient (e.g., by providing a way to perform quick edits based on the speed of the input), which additionally reduces power usage and improves battery life of the electronic device by enabling the user to use the electronic device more quickly and efficiency, while reducing errors in usage.

In some embodiments, the first field is an hours field for defining an hours value for the editable time input element, changing the content of the first field includes scrolling through a plurality of candidate hours values for the first field, and the plurality of candidate hours values correspond to predefined hours increments (734), such as changing hours field 612-1 by increments of one in FIGS. 6X-6Z (e.g., a scroll input on the hours field causes the hours field to increment or decrement in increments of one hour (or optionally two, three, five, six, twelve, etc.)).

For example, in response to an input movement of a predetermined distance (e.g., 0.1 mm, 0.5 mm, 1.0 mm, 3.0 mm, etc.), the hours field increases or decreases by one hour. In some embodiments, as the input movement continues, the hours field continues to increase or decrease by one hour every time the input movement traverses the predetermined distance.

The above-described manner of incrementing or decrementing the hours field of an editable time input element (e.g., by one, in response to a scrolling gesture) provides the user with a quick and efficient way of modifying the hours field of the editable time input element, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, changing the content of the first field includes scrolling through a plurality of candidate values for the first field (736), such as hours list 618 in FIGS. 6X-6Z. In some embodiments, the electronic device generates (738) one or more tactile outputs corresponding to the scrolling through the plurality of candidate values for the first field based on the first movement, such as in FIGS. 6X-6Z (e.g., while performing the scrolling input and incrementing or decrementing the first field, generate a tactile output indicative of the modification of the first field). In some embodiments, the tactile output is a single "tap" output. In some embodiments, the tactile output is a vibrational output. In some embodiments, the tactile output is generated every time the first field is scrolled to a different candidate value (e.g., each time the first field is incremented or decremented by one increment).

The above-described manner of providing feedback of the edit to the first field (e.g., by generating a tactile output when the first field is incremented or decremented in response to the scrolling input) provides the user with a physical feedback mechanism when the first field is edited, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, while displaying the editable time input element, the electronic device receives (740), via the one or more input devices, an input directed to the second field, wherein the input includes a first movement, such as the upward swipe of contact 603 in FIG. 6BB (e.g., an input with a movement component, different from the first type or second type of input). In some embodiments, the input is a contact on the second field followed by an upward or downward swipe gesture. In some embodiments, the input directed to the second field that includes the first movement is received while the second field is not selected for editing (optionally while neither the first nor the second fields are selected for editing). In some embodiments, the input is received while the second field is selected for editing (e.g., in response to a selection input of a first type on the second field).

In some embodiments, in response to receiving the input directed to the second field, the electronic device changes (742) content of the second field based on the first movement without changing the content of the first field, such as editing minutes field 612-2 in FIGS. 6BB-6CC (e.g., editing the contents of the second field based on the movement component of the user input).

For example, an upward swipe gesture optionally causes second field to be decremented and an upward swipe gesture optionally causes the second field to be incremented. In some embodiments, an upward swipe gesture optionally causes second field to be incremented and an upward swipe gesture optionally causes the second field to be decremented. In some embodiments, the second field is incremented or decremented by increments of 1, 5, 10, 30, etc. In some embodiments, the distance (e.g., magnitude) of the swipe input determines the amount that the second field is incremented or decremented. In some embodiments, the second field is incremented or decremented by one increment when (e.g., each time) time the swipe input moves by a predefined distance (e.g., 0.1 mm, 0.5 mm, 1 mm, 2 cm, 5 cm, etc.). In some embodiments, the speed of the incrementing or decrementing depends on the speed of the swipe input (e.g., due to traversing the predefined distance faster). Thus, in some embodiments, the direct, distance, and speed of the swipe input determines whether to increment or decrement and how much and how fast to increment or decrement. In some embodiments, in response to detecting the first movement, the device displays a user interface element that includes a list of candidate values that is scrollable to select a value from the list of candidate values. In some embodiments, the list of candidate values scrolls based on the swipe input, as described above. For example, if the input is an upward swipe, then the list of candidate values scrolls upwards to select larger values, and if the input is a downward swipe, then the list of candidate values scrolls downwards to select smaller values. In some embodiments, the list of candidates wraps to the bottom of the list if the list reaches the top of the list, and vice versa. For example, in a 12-hour clock, if the list of values reaches 12 (the maximum value) when scrolling upwards, then the next candidate value after 12 is 1 (e.g., the minimum value), then 2, then 3, etc. In some embodiments, while the second field is being incremented or decremented, the first field is not edited or otherwise modified. In some embodiments, the field that is incremented or decremented in response to the swipe input is based on the field that is edited for input when the swipe input is received. For example, the contents of the second field are incremented or decremented in response to the swipe input if the second field is selected for input when the swipe input was received (e.g., optionally even if the swipe input was received on the second field). In another example, the contents of both the first and second field are incremented or decremented in response to the swipe input if both the first and second field are selected for input when the swipe input was received (e.g., regardless of whether the swipe input was received on the first field or the second field). In some embodiments, the field that is incremented or decremented in response to the swipe input is based on which field the swipe input is received on. For example, the contents of the second field are incremented or decremented in response to the swipe input if the swipe input is received on the second field (e.g., optionally even if the second field was not selected for input when the swipe input was received).

The above-described manner of editing a particular field of an editable time input element (e.g., in response to an upward or downward swipe) provides the user with a quick and efficient way of editing the fields of the editable time input element (e.g., without requiring a separate selection input or the use of a physical or virtual keyboard), which simplifies the interaction between the user and the electronic device and enhances the operability of the electronic device and makes the user-device interface more efficient (e.g., by providing an additional and simple way to perform minor edits to increment or decrement the value in a particular field of the editable time input element), which additionally reduces power usage and improves battery life of the electronic device by enabling the user to use the electronic device more quickly and efficiency, while reducing errors in usage.

In some embodiments, changing the content of the second field includes scrolling through a plurality of candidate values for the second field with inertia based on the first movement, including scrolling through the plurality of candidate values for the second field after detecting an end of the first movement (744), similarly to the scrolling of hours list 618 illustrated in FIG. 6Z (e.g., upon detecting an end of the user input, the second field continues to be incremented or decremented (as the case may be) to mimic the inertia or momentum of the input decreasing from the speed of the movement at the time that the input was terminated).

For example, after detecting the end of the user input, the second field increments or decrements one (or two, five, etc.) more time. In some embodiments, if the movement of the input ends without detecting the release of the contact, then the second field does not experience the inertial scrolling effect. In some embodiments, if the contact is released while the movement has a velocity, then the second field experiences the inertial scrolling effect. In some embodiments, the amount of change in the second field after lift-off of the contact depends on the magnitude of the swipe input, the speed of the swipe input, and/or the acceleration of the swipe input. For example, if the speed of the swipe input is fast at the time of lift-off, then the second field optionally increments or decrements by multiple increments (e.g., two, three, five, etc. increments), but if the speed of the swipe input is slow at the time of lift-off, then the first field optionally increments or decrements once or twice. In some embodiments, the speed of the change (e.g., time between increments or decrements) after lift-off depends on the speed and/or acceleration of the swipe input at the time of lift-off. For example, the speed of the change is linearly decreasing from the speed at the time of lift-off to zero (or optionally logarithmically decreasing, exponentially decreasing, decreasing according to a polynomial function, etc.). In some embodiments, the list of candidates values remains displayed while the field continues to be incremented or decremented and is ceased to be displayed after a threshold amount of time after the second field stops to be incremented or decremented (e.g., after 0.1 seconds, 0.5 seconds, 1 second, 3 seconds, etc.).

The above-described manner of editing a particular field of an editable time input element (e.g., continuing to increment or decrement the field even after the user input has been terminated) provides the user with a quick and efficient way of editing the fields of the editable time input element, which simplifies the interaction between the user and the electronic device and enhances the operability of the electronic device and makes the user-device interface more efficient (e.g., by providing a way to perform quick edits based on the speed of the input), which additionally reduces power usage and improves battery life of the electronic device by enabling the user to use the electronic device more quickly and efficiency, while reducing errors in usage.

In some embodiments, the second field is a minutes field for defining a minutes value for the editable time input element, changing the content of the second field includes scrolling through a plurality of candidate minutes values for the second field, and the plurality of candidate minutes values correspond to predefined increments of time that are greater than one minute (746), such as minutes field 612-2 changing in increments of five in FIGS. 6BB-6CC (e.g., a scroll input on the minutes field causes the minutes field to increment or decrement in increments of five minutes (or optionally one, ten, fifteen, thirty, etc.)).

For example, in response to an input movement of a predetermined distance (e.g., 0.1 mm, 0.5 mm, 1.0 mm, 3.0 mm, etc.), the minutes field increases or decreases by five minutes. In some embodiments, as the input movement continues, the minutes field continues to increase or decrease by five number every time the movement traverses the predetermined distance. In some embodiments, the original value of the minutes field, which is optionally a value that does not match the increments displayed in the scrolling user interface, is included in the plurality of candidate minutes such that the user is able to select the original value of the minutes field while scrolling (e.g., forgo editing the minutes field).

The above-described manner of incrementing or decrementing the minutes field of an editable time input element (e.g., by five, in response to a scrolling gesture) provides the user with a quick and efficient way of modifying the minutes field of the editable time input element, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, the second field included a respective minutes value when the input including the first movement was detected, scrolling through the plurality of candidate minutes values for the second field includes scrolling through the plurality of candidate minutes values and the respective minutes value for the second field, and the respective minutes value does not correspond to one of the time values corresponding to the predefined increments of time (748), such as the inclusion of the value "52" in minutes list 622 in FIGS. 6BB-6CC (e.g., the original value of the minutes field is included in the list of candidate minutes that the user is able to select via the upward or downward scrolling gesture).

In some embodiments, even if the original value is not a multiple of the predefined increments (e.g., not in multiples of five, ten, fifteen, etc.), the original value is included in the list of candidates. For example, if the second field displayed "52" when the scrolling input was received, then in response to the scrolling input, the list of candidate minutes values includes "45", "50", and "55" (e.g., multiples of five), as well as "52" (e.g., the original value of the second field). Thus, the user is able to select the original value of the second field (e.g., "52") or any of the other candidate minutes values. In some embodiments, after detecting the termination of the first movement and/or after detecting termination of the input (e.g., lift-off of the contact with the touch-screen), the plurality of candidate minutes values is ceased to be displayed.

The above-described manner of displaying candidate values for a respective field of the editable time input element (e.g., by including the original value of the respective field in the list of candidate values) provides the user with a quick and efficient way of not modifying the respective field of the editable time input element (e.g., by selecting the original value of the field, even if the original value is not a multiple of the predefined increments), which simplifies the interaction between the user and the electronic device and enhances the operability of the electronic device and makes the user-device interface more efficient (e.g., without requiring the user to select one of the predefined increments and then perform additional inputs to change the value back to its original value), which additionally reduces power usage and improves battery life of the electronic device by enabling the user to use the electronic device more quickly and efficiency, while reducing errors in usage.

In some embodiments, changing the content of the second field includes scrolling through a plurality of candidate values for the second field (750), such as in FIGS. 6BB-6CC. In some embodiments, the electronic device generates (752) one or more tactile outputs corresponding to the scrolling through the plurality of candidate values for the second field based on the first movement, such as in FIGS. 6BB-6CC (e.g., while performing the scrolling input and incrementing or decrementing the second field, generate a tactile output indicative of the modification of the second field).

In some embodiments, the tactile output is a single "tap" output. In some embodiments, the tactile output is a vibrational output. In some embodiments, the tactile output is generated every time the second field is scrolled to a different candidate value (e.g., each time the second field is incremented or decremented by one increment).

The above-described manner of providing feedback of the edit to the second field (e.g., by generating a tactile output when the second field is incremented or decremented in response to the scrolling input) provides the user with a physical feedback mechanism when the second field is edited, which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, the first type of input is a double tap input (754), such as double tap input 603 in FIG. 6H (e.g., a short contact with the touch screen (e.g., a contact of duration less than 0.1 seconds, 0.3 seconds, 0.5 seconds, 1 second, etc. between touchdown and liftoff of the contact, and having movement during that time less than a movement threshold, such as 0.1 mm, 0.3 mm, 1 mm, etc.) followed by a second short contact within a threshold amount of time of liftoff of the first contact (e.g., within 0.1 seconds, 0.5 seconds, 1 second, 3 seconds, 5 seconds, etc. and having movement during that time less than a movement threshold, such as 0.1 mm, 0.3 mm, 1 mm, etc.).

In some embodiments, the second type of input is a single tap input (756), such as single tap input 603 in FIG. 6C (e.g., a short contact with the touch screen (e.g., a contact of less than 0.1 seconds, 0.3 seconds, 0.5 seconds, 1 second, etc. between touchdown and liftoff of the contact, and having movement during that time less than a movement threshold, such as 0.1 mm, 0.3 mm, 1 mm, etc.) without a second short contact within the threshold amount of time).

The above-described manner of selecting particular fields of an editable time input element (e.g., by performing a double tap or a single tap on the editable time input element) provides the user with a quick and efficient way of selecting between editing a single field or multiple fields of a editable time input element (e.g., automatically selecting one field or the other based on whether the input is a single or double tap, without requiring the user to perform additional inputs to switch from editing a single field or editing both fields or perform additional inputs to edit one field and then switch to editing another field), which simplifies the interaction between the user and the electronic device and enhances the operability of the electronic device and makes the user-device interface more efficient (e.g., providing the ability to intelligently edit a single or multiple fields of the editable time input element), which additionally reduces power usage and improves battery life of the electronic device by enabling the user to use the electronic device more quickly and efficiency, while reducing errors in usage.

In some embodiments, the electronic device displays (758), via the display generation component, the editable time input element and an editable date input element, wherein the editable date input element is for defining a respective date associated with the editable time input element (e.g., a user interface element for selecting a date), and the editable date input element includes a first group of a plurality of candidate date values for the editable date input element that are selectable to define the respective date associated with the editable time input element, such as representation 628 of a calendar in FIG. 6FF (e.g., the editable date input element includes a representation of a calendar that is selectable to select a particular date for the editable date input element).

In some embodiments, the editable date input element includes a month, date, and/or year field. For example, if a user selects a particular date on the representation of the calendar, then the editable date input element is updated to display the selected date. In some embodiments, the representation of the calendar displays one month (e.g., the dates of the month arranged by week). In some embodiments, the representation of the calendar is displayed in the user interface below the editable date input element (and optionally displaces other elements in the user interface downwards). In some embodiments, the representation of the calendar is displayed as an overlay (e.g., a pop-up) that is displayed at or near the editable date input element. In some embodiments, the representation of the calendar is displayed in the user interface (e.g., as a pop-up overlay or integrated in the user interface) in response to a selection of the editable date input element. In some embodiments, the representation of the calendar is displayed in the user interface (e.g., below the editable date input element) without requiring a selection on the editable date input element (e.g., always displayed).

The above-described manner of displaying an editable date input element (e.g., concurrently with a representation of a calendar) provides the user with a quick and efficient way of modifying the date in the editable date input element (e.g., by selecting a respective date on the representation of the calendar), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, while displaying the editable time input element and the editable date input element, the electronic device receives (760), via the one or more input devices, an input directed to the editable date input element, such as leftward swipe of contact 603 in FIG. GG (e.g., receiving a user input interacting with the representation of the calendar).

In some embodiments, in response to receiving the input directed to the editable date input element (762), in accordance with a determination that the input directed to the editable date input element includes movement in a first direction (e.g., the user input is a horizontal swipe on the representation of the calendar in a first direction that includes touchdown of a contact within the calendar followed by movement of the contact in the first direction), the electronic device scrolls (764) through the editable date input element to display, in the editable date input element, a second group of a plurality of candidate date values for the editable date input element, such as the scrolling of representation 628 from "May 2020" to "June 2020" in FIG. 6GG (e.g., switching the month that is displayed in the representation of the calendar to the next month (e.g., before or after the month that was displayed when the user input was displayed, based on the direction of the horizontal swipe)).

In some embodiments, in response to receiving the input directed to the editable date input element, in accordance with a determination that the input directed to the editable date input element includes movement in a second direction, different from the first direction (e.g., the user input is a horizontal swipe on the representation of the calendar in a second direction that includes touchdown of a contact within the calendar followed by movement of the contact in the second direction), the electronic device scrolls (766) through the editable date input element to display, in the editable date input element, a third group, different from the second group, of a plurality of candidate date values for the editable date input element, such as if the swipe of contact 603 in FIG. 6GG was a rightwards swipe gesture, representation 628 would scroll from "May 2020" to "April 2020" (e.g., switching the month that is displayed in the representation of the calendar to the next month (e.g., before or after the month that was displayed when the user input was displayed, based on the direction of the horizontal swipe)).

For example, a leftward swipe causes the next month to be displayed and a rightward swipe causes the previous month to be displayed. In some embodiments, displaying the next or previous month includes displaying the dates of the respective month that are selectable to choose the selected date as the date displayed by the editable date input element.

The above-described manner of displaying different months in the representation of the calendar that is displayed with the editable date input element (e.g., displaying the next or previous month in response to a swipe gesture) provides the user with a quick and efficient way of selecting the month for the editable date input element, which simplifies the interaction between the user and the electronic device and enhances the operability of the electronic device and makes the user-device interface more efficient (e.g., without requiring the user to perform additional inputs to select a particular month), which additionally reduces power usage and improves battery life of the electronic device by enabling the user to use the electronic device more quickly and efficiency, while reducing errors in usage.

In some embodiments, the editable date input element includes a selectable option (768), such as current month 626 (e.g., the representation of the calendar includes a representation of the month that is being displayed by the representation of the calendar). For example, the representation of the calendar includes a textual label of the month that is being displayed. In some embodiments, the textual label is selectable to cause display of a scrollable list of months to display in the representation of the calendar.

In some embodiments, the electronic device receives (770), via the one or more input element, an input selecting the selectable option, such as user input 603 in FIG. 6HH (e.g., a tap input on the textual label of the month that is being displayed). In some embodiments, in response to receiving the input selecting the selectable option, the electronic device displays (772), via the display generation component, a first element that is scrollable to define a month of the respective date of the editable date input element (774), such as month list 630-1 in FIG. 6II (e.g., displaying a list of months (e.g., 1 month, 3 months, 5 months, 8 months, etc.)) and a second element that is scrollable to define a year of the respective date of the editable date input element (776), such as year list 630-2 in FIG. 6II (e.g., displaying a list of year (e.g., 1 year, 3 years, 5 years, 8 years, etc.)).

In some embodiments, the months in the list of months are selectable to select the selected month to be displayed in the representation of the calendar. In some embodiments, the list of months is scrollable to change the month that has focus (e.g., the month that is displayed in the representation of the calendar). In some embodiments, the years in the list of years are selectable to select the selected year as the year that is displayed in the representation of the calendar. In some embodiments, the list of years is scrollable to change the year that has focus (e.g., the year that is displayed in the representation of the calendar).

The above-described manner of selecting the month and year displayed in the representation of the calendar (e.g., by displaying a list of month and a list of years that is scrollable and selectable to select the month and year that is displayed by the representation of the calendar) provides the user with a quick and efficient way of selecting the month and year for the editable date input element, which simplifies the interaction between the user and the electronic device and enhances the operability of the electronic device and makes the user-device interface more efficient (e.g., by providing a way to quickly choose the month and year to display, without requiring the user to perform additional inputs to scroll through each month to arrive at the intended month and year), which additionally reduces power usage and improves battery life of the electronic device by enabling the user to use the electronic device more quickly and efficiency, while reducing errors in usage.

In some embodiments, the editable time input element is displayed in a user interface (778). In some embodiments, in response to receiving the selection input directed to the editable time input element, the electronic device displays (780), via the display generation component, a virtual keyboard overlaid on the user interface, such as virtual keyboard 636 in FIG. 6SS (e.g., displaying a virtual keyboard (e.g., an alphanumeric keyboard) or numpad (e.g., a virtual keyboard that includes numbers and does not include letters)), wherein the first set of one or more editing inputs are directed to the virtual keyboard (e.g., selection of a number key on the virtual keyboard causes insertion of the number into the respective field of the editable time input element).

In some embodiments, the virtual keyboard or numpad is displayed as a pop-up overlay over at least a portion of the user interface on which the editable time input is displayed (e.g., at or near the location of the editable time input element). In some embodiments, the virtual keyboard or numpad is displayed as an overlay if the user interface is larger than a threshold size (e.g., wider and/or taller than 2 inches, 3 inches, 5 inches, 8 inches, 10 inches, etc.). In some embodiments, the virtual keyboard or numpad is displayed as an overlay if the display area is larger than a threshold size (e.g., wider and/or taller than 2 inches, 3 inches, 5 inches, 8 inches, 10 inches, etc.). In some embodiments, if the user interface and/or display area is less than the threshold size, then the virtual keyboard and/or numpad is displayed at a predetermined location in the user interface (e.g., bottom of the user interface).

The above-described manner of displaying a virtual keyboard (e.g., overlaid on the user interface in response to the selection input on the editable time input element) provides the user with a quick and efficient way of modifying the fields of the editable time input element (e.g., by providing a virtual keyboard on which the user is able to enter times), which simplifies the interaction between the user and the electronic device and enhances the operability of the electronic device and makes the user-device interface more efficient (e.g., by providing a way to quickly enter values into the editable time input element, without requiring the user to scroll through different values to arrive at the intended time), which additionally reduces power usage and improves battery life of the electronic device by enabling the user to use the electronic device more quickly and efficiency, while reducing errors in usage.

In some embodiments, the editable time input element is displayed without displaying an editable date input element (782), such as editable time entry field 612 not having an accompanying editable date entry field as shown in FIG. 6B (e.g., the editable time input is optionally displayed without an accompanying editable date input element or optionally displayed with an accompanying editable date input element).

The above-described manner of displaying an editable time input element (e.g., separately from an accompanying editable date input element) provides the user with a quick and efficient way of editing the editable time input element without editing an accompanying date input element, which simplifies the interaction between the user and the electronic device and enhances the operability of the electronic device and makes the user-device interface more efficient (e.g., by providing a way to edit just the editable time input element without editing the date), which additionally reduces power usage and improves battery life of the electronic device by enabling the user to use the electronic device more quickly and efficiency, while reducing errors in usage.

In some embodiments, the editable time input element includes an editable am/pm input element, separate from the first field and the second field, for defining an am/pm value associated with the editable time input element (784), such as am/pm selection element 610 in FIG. 6B (e.g., the editable time input element includes a toggle switch for selecting between "am" and "pm" options).

In some embodiments, the am/pm selection element is only displayed if the time input element is displaying time in a 12 hour format (e.g., as opposed to a 24-hour format). In some embodiments, the am/pm selection element is a third field of the editable time input element (which is optionally editable in response to a selection input of a second type). In some embodiments, the am/pm input element is separate from the first field and second field and is not editable in response to a selection input of the first type or second type on the first or second field. In some embodiments, an input of the second type on any part of the am/pm element (e.g., on the "am" portion or the "pm" portion) causes the am/pm element to toggle from selecting one option to the other (e.g., switches from the "am" option to the "pm" option or from the "pm" option to the "am" option).

The above-described manner of displaying an am/pm input element (e.g., concurrently with the first field and second field of the editable time input element) provides the user with a quick and efficient way of selecting between the am hours and pm hours (e.g., by interacting with the am/pm input element), which simplifies the interaction between the user and the electronic device and enhances the operability of the electronic device and makes the user-device interface more efficient, which additionally reduces power usage and improves battery life of the electronic device by enabling the user to use the electronic device more quickly and efficiency, while reducing errors in usage.

In some embodiments, before receiving the selection input, the first field of the editable time input element is displayed with a visual characteristic having a first value (786), such as in FIG. 6B (e.g., the first field has a default background color or text color before and at the time that the input was received). In some embodiments, in response to receiving the selection input (788), in accordance with the determination that the selection input was the first type of input, the electronic device displays (790) the first field of the editable time input element with the visual characteristic having a second value, different from the first value, without displaying the second field of the editable time input element with the visual characteristic having the second value, such as minutes field 612-2 being visually emphasized and hours field 612-1 being visually de-emphasized in FIG. 6I (e.g., updating the first field to visually emphasize the first field as compared to the second field).

In some embodiments, the first field is highlighted (e.g., displayed with a background color different than the color of the user interface and/or the text of the first field or displayed with a text color that is different from the text color of the first field when the selection input was received). In some embodiments, the second field is updated to visually de-emphasize the second field as compared to the first field. In some embodiments, the second field is displayed with a grey background or the text of the second field is greyed out.

The above-described manner of visually distinguishing the field being edited (e.g., by updating a the visual characteristic of the field that's being edited in response to the selection input) provides a quick and efficient way of visually indicating which field is selected for editing, which simplifies the interaction between the user and the electronic device and enhances the operability of the electronic device and makes the user-device interface more efficient (e.g., without requiring the user to perform additional inputs to determine which field is the field that is currently being edited), which additionally reduces power usage and improves battery life of the electronic device by enabling the user to use the electronic device more quickly and efficiency, while reducing errors in usage.

In some embodiments, before receiving the selection input, the first field and the second field of the editable time input element are displayed with a visual characteristic having a first value (792) (e.g., the first field and second field have default background colors or text colors before and at the time that the input was received). In some embodiments, in response to receiving the selection input (794), in accordance with the determination that selection input was the second type of input, the electronic device displays (796) the first field and the second field of the editable time input element with the visual characteristic having a second value, different from the first value, such as visually emphasizing both hours field 612-1 and minutes field 612-2 in FIG. 6D (e.g., updating the visual characteristic of both the first and the second field to visually indicating that both the first and second fields are selected for editing). In some embodiments, both the first and second fields are highlighted together.

The above-described manner of visually distinguishing the field being edited (e.g., by updating a the visual characteristic of both the first and second field when both fields are selected for editing) provides a quick and efficient way of visually indicating that both fields are selected for editing, which simplifies the interaction between the user and the electronic device and enhances the operability of the electronic device and makes the user-device interface more efficient (e.g., without requiring the user to perform additional inputs to determine which field is the field that is currently being edited), which additionally reduces power usage and improves battery life of the electronic device by enabling the user to use the electronic device more quickly and efficiency, while reducing errors in usage.

In some embodiments, after receiving the selection input of the first type and while the first field is selected for input, the electronic device receives (798), via the one or more input devices, a second selection input of the second type directed to the editable time input element followed by a second set of one or more editing inputs, such as user input 603 in FIG. 6Q while hours field 612-1 is selected for input (e.g., after receiving a selection input of the first type such that the first field is selected for input (e.g., is edited in response to a subsequent editing input) and the second field is not selected for input (e.g., the second field is not edited in response to a subsequent editing input), receiving a second selection input of the second type).

For example, receiving a double tap on the hours field, causing the hours field to be selected for editing, and then receiving a single tap on the hours field. In some embodiments, the second selection input is on the first field (e.g., the same field that is selected for input). In some embodiments, the second selection input is on the second field (e.g., the field that is not selected for input).

In some embodiments, in response to receiving the second set of one or more editing inputs, the electronic device edits (798-2) content of the second field based on the second set of one or more editing inputs, such as editable time entry field 612 being selected for input in FIG. 6R and minutes field 612-2 being selected for input in FIG. 6V (e.g., causing the second field to be selected for input such that subsequent editing inputs edits the second field).

In some embodiments, the second field is selected and the first field is no longer selected. In some embodiments, both the second and first fields are selected for input together (e.g., as if the first selection input were of the second type). In some embodiments, whether both the first and second fields are selected for input together or just the second field is selected for input (e.g., and the first field is no longer selected for input) depends on whether the second selection input is received on the first field or the second field. In some embodiments, while a respective field is selected for input, receiving a selection input of the second type on that respective field causes the respective field and the other field to both be selected for input while receiving the selection input of the second type on the other field causes only the other field to be selected for input and the respective field to no longer be selected for input. In some embodiments, while a respective field is selected for input, receiving a selection input of the second type on the other field causes the other field to be selected for input and the respective input to no longer be selected for input. In some embodiments, if both the first and second field were selected for editing (e.g., in response to a selection input of a second type) when the second selection input of the second type was received, then in response, the field on which the second selection was received is selected for input and the other field is no longer selected for input (e.g., switching from editing both fields to just the field that received the second selection input).

The above-described manner of switching from editing one field of the editable time input element to editing a second field of the editable time input element (e.g., in response to receiving a selection input of the second type on the editable time input element while the first field is selected for input) provides a quick and efficient way of switching between editing one field to the other field or both fields, which simplifies the interaction between the user and the electronic device and enhances the operability of the electronic device and makes the user-device interface more efficient (e.g., without requiring the user to perform additional inputs to exit editing of the first field and perform additional inputs to begin editing the other field(s)), which additionally reduces power usage and improves battery life of the electronic device by enabling the user to use the electronic device more quickly and efficiency, while reducing errors in usage.

In some embodiments, in accordance with a determination that the second selection input was directed to the second field (e.g., while the first field is selected for input, receiving the selection input of the second type on the second field), the second field is selected for input, the first field is not selected for input, and the content of the second field is edited based on the second set of one or more editing inputs without editing the content of the first field (798-4), such as switching from hours field 612-1 being selected for input to minutes field 612-2 being selected for input in FIG. 6V (e.g., causing the second field to be selected for input and the first field to no longer be selected for input). Thus, in some embodiments, while the first field is selected for input, a selection input of the second type on the second field switches the field that's selected for input from the first field to the second field (e.g., switches to the field that received the selection input of the second type).

The above-described manner of switching from editing one field of the editable time input element to editing a second field of the editable time input element (e.g., in response to receiving a selection input of the second type on the second field of the editable time input element while the first field is selected for input) provides a quick and efficient way of switching between editing one field to the other field, which simplifies the interaction between the user and the electronic device and enhances the operability of the electronic device and makes the user-device interface more efficient (e.g., without requiring the user to perform additional inputs to exit editing of the first field and perform additional inputs to begin editing the other field), which additionally reduces power usage and improves battery life of the electronic device by enabling the user to use the electronic device more quickly and efficiency, while reducing errors in usage.

In some embodiments, in accordance with a determination that the second selection input was directed to the first field (e.g., while the first field is selected for input, receiving the selection input of the second type on the first field), the first field and the second field are selected for input, and the content of the first field and the second field are edited based on the second set of one or more editing inputs (798-6), such as switching from selecting only hours field 612-1 for input to selecting editable time entry field 612 for input in FIG. 6R (e.g., causing both the first and the second field to be selected for input). Thus, in some embodiments, while the first field is selected for input, a selection input of the second type on the first field causes both (e.g., all) fields to be selected for input (e.g., switches from editing just one field to editing multiple fields).

The above-described manner of switching from editing one field of the editable time input element to editing both the first and second fields of the editable time input element (e.g., in response to receiving a selection input of the second type on the first field of the editable time input element while the first field is selected for input) provides a quick and efficient way of switching between editing one field to editing both fields, which simplifies the interaction between the user and the electronic device and enhances the operability of the electronic device and makes the user-device interface more efficient (e.g., without requiring the user to perform additional inputs to exit editing of the first field and perform additional inputs to begin editing both fields), which additionally reduces power usage and improves battery life of the electronic device by enabling the user to use the electronic device more quickly and efficiency, while reducing errors in usage.

It should be understood that the particular order in which the operations in FIGS. 7A-7J have been described is merely exemplary and is not intended to indicate that the described order is the only order in which the operations could be performed. One of ordinary skill in the art would recognize various ways to reorder the operations described herein. Additionally, it should be noted that details of other processes described herein with respect to other methods described herein are also applicable in an analogous manner to method 700 described above with respect to FIGS. 7A-7J.

The operations in the information processing methods described above are, optionally, implemented by running one or more functional modules in an information processing apparatus such as general purpose processors (e.g., as described with respect to FIGS. 1A-1B, 3, 5A-5H) or application specific chips. Further, the operations described above with reference to FIGS. 7A-7J are, optionally, implemented by components depicted in FIGS. 1A-1B. For example, displaying operations 702, 758, 772, 780, 790, and 796, and receiving operations 704, 706, 718, 720, 728, 740, 760, 770, 798, are, optionally, implemented by event sorter 170, event recognizer 180, and event handler 190. When a respective predefined event or sub-event is detected, event recognizer 180 activates an event handler 190 associated with the detection of the event or sub-event. Event handler 190 optionally utilizes or calls data updater 176 or object updater 177 to update the application internal state 192. In some embodiments, event handler 190 accesses a respective GUI updater 178 to update what is displayed by the application. Similarly, it would be clear to a person having ordinary skill in the art how other processes can be implemented based on the components depicted in FIGS. 1A-1B.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best use the invention and various described embodiments with various modifications as are suited to the particular use contemplated.

The invention claimed is:

1. A method comprising:
at an electronic device in communication with a display generation component and one or more input devices:
displaying, via the display generation component, an editable time input element, wherein the editable time input element includes a first field and a second field;
while displaying the editable time input element and while the first field and the second field are not selected for input, receiving, via the one or more input devices, a selection input directed to the first field;
after receiving the selection input, receiving a first set of one or more editing inputs; and
in response to receiving the first set of one or more editing inputs:
in accordance with a determination that the selection input was a first type of input, editing content of the first field and not the second field based on the first set of one or more editing inputs; and
in accordance with a determination that the selection input was a second type of input, different from the first type, editing content of the first field and the second field based on the first set of one or more editing inputs;
after editing content of the first field and while displaying the editable time input element with the first field selected for input and the second field not selected for input:
receiving, via the one or more input devices, a second selection input directed to the editable time input element, wherein the second selection input is the second type of input; and
after receiving the second selection input, receiving, via the one or more input devices a second set of one or more editing inputs; and
in response to receiving the second set of one or more editing inputs:
in accordance with a determination that the second selection input was directed to the second field, editing content of the second field and not the first field based on the second set of one or more editing inputs; and
in accordance with a determination that second selection input was directed to the first field, editing the content of the first field and the second field based on the second set of one or more editing inputs.

2. The method of claim 1, wherein the first field is an hours field for defining an hours value for the editable time input element, and the second field is a minutes field for defining a minutes value for the editable time input element.

3. The method of claim 1, further comprising:
while displaying the editable time input element, receiving, via the one or more input devices, an input directed to the first field, wherein the input includes a first movement; and
in response to receiving the input directed to the first field, changing the content of the first field based on the first movement without changing content of the second field.

4. The method of claim 3, wherein changing the content of the first field includes scrolling through a plurality of candidate values for the first field with inertia based on the first movement, including scrolling through the plurality of candidate values for the first field after detecting an end of the first movement.

5. The method of claim 3, wherein the first field is an hours field for defining an hours value for the editable time input element, changing the content of the first field includes scrolling through a plurality of candidate hours values for the first field, and the plurality of candidate hours values correspond to predefined hours increments.

6. The method of claim 3, wherein changing the content of the first field includes scrolling through a plurality of candidate values for the first field, the method further comprising:
generating one or more tactile outputs corresponding to the scrolling through the plurality of candidate values for the first field based on the first movement.

7. The method of claim 1, further comprising:
while displaying the editable time input element, receiving, via the one or more input devices, an input directed to the second field, wherein the input includes a first movement; and
in response to receiving the input directed to the second field, changing content of the second field based on the first movement without changing the content of the first field.

8. The method of claim 7, wherein changing the content of the second field includes scrolling through a plurality of candidate values for the second field with inertia based on the first movement, including scrolling through the plurality of candidate values for the second field after detecting an end of the first movement.

9. The method of claim 7, wherein the second field is a minutes field for defining a minutes value for the editable time input element, changing the content of the second field includes scrolling through a plurality of candidate minutes values for the second field, and the plurality of candidate minutes values correspond to predefined increments of time that are greater than one minute.

10. The method of claim 9, wherein the second field included a respective minutes value when the input including the first movement was detected, scrolling through the plurality of candidate minutes values for the second field includes scrolling through the plurality of candidate minutes values and the respective minutes value for the second field, and the respective minutes value does not correspond to one of the candidate minutes values corresponding to the predefined increments of time.

11. The method of claim 7, wherein changing the content of the second field includes scrolling through a plurality of candidate values for the second field, the method further comprising:
generating one or more tactile outputs corresponding to the scrolling through the plurality of candidate values for the second field based on the first movement.

12. The method of claim 1, wherein:
the first type of input is a double tap input, and
the second type of input is a single tap input.

13. The method of claim 1, further comprising:
displaying, via the display generation component, the editable time input element and an editable date input element, wherein the editable date input element is for defining a respective date associated with the editable time input element, and the editable date input element includes a first group of a plurality of candidate date values for the editable date input element that are selectable to define the respective date associated with the editable time input element.

14. The method of claim 13, further comprising:
while displaying the editable time input element and the editable date input element, receiving, via the one or more input devices, an input directed to the editable date input element; and
in response to receiving the input directed to the editable date input element:
in accordance with a determination that the input directed to the editable date input element includes movement in a first direction, scrolling through the editable date input element to display, in the editable date input element, a second group of a plurality of candidate date values for the editable date input element; and
in accordance with a determination that the input directed to the editable date input element includes movement in a second direction, different from the first direction, scrolling through the editable date input element to display, in the editable date input element, a third group, different from the second group, of a plurality of candidate date values for the editable date input element.

15. The method of claim 13, wherein the editable date input element includes a selectable option, the method further comprising:
receiving, via the one or more input devices, an input selecting the selectable option; and
in response to receiving the input selecting the selectable option, displaying, via the display generation component:
a first element that is scrollable to define a month of the respective date of the editable date input element; and
a second element that is scrollable to define a year of the respective date of the editable date input element.

16. The method of claim 1, wherein the editable time input element is displayed in a user interface, the method further comprising:
in response to receiving the selection input directed to the editable time input element, displaying, via the display generation component, a virtual keyboard overlaid on the user interface, wherein the first set of one or more editing inputs are directed to the virtual keyboard.

17. The method of claim 1, wherein the editable time input element is displayed without displaying an editable date input element.

18. The method of claim 1, wherein the editable time input element includes an editable am/pm input element, separate from the first field and the second field, for defining an am/pm value associated with the editable time input element.

19. The method of claim 1, wherein before receiving the selection input, the first field of the editable time input element is displayed with a visual characteristic having a first value, the method further comprising:
in response to receiving the selection input:
in accordance with the determination that the selection input was the first type of input, displaying the first field of the editable time input element with the visual characteristic having a second value, different from the first value, without displaying the second field of the editable time input element with the visual characteristic having the second value.

20. The method of claim 1, wherein before receiving the selection input, the first field and the second field of the editable time input element are displayed with a visual characteristic having a first value, the method further comprising:
in response to receiving the selection input:
in accordance with the determination that the selection input was the second type of input, displaying the first field and the second field of the editable time input element with the visual characteristic having a second value, different from the first value.

21. An electronic device, comprising:
one or more processors;
memory; and
one or more programs, wherein the one or more programs are stored in the memory and configured to be executed by the one or more processors, the one or more programs including instructions for:
displaying, via a display generation component, an editable time input element, wherein the editable time input element includes a first field and a second field;
while displaying the editable time input element and while the first field and the second field are not selected for input, receiving, via one or more input devices, a selection input directed to the first field;
after receiving the selection input, receiving a first set of one or more editing inputs; and
in response to receiving the first set of one or more editing inputs:
in accordance with a determination that the selection input was a first type of input, editing content of the first field and not the second field based on the first set of one or more editing inputs; and
in accordance with a determination that the selection input was a second type of input, different from the first type, editing content of the first field and the second field based on the first set of one or more editing inputs;
after editing content of the first field and while displaying the editable time input element with the first field selected for input and the second field not selected for input:
receiving, via the one or more input devices, a second selection input directed to the editable time input element, wherein the second selection input is the second type of input; and
after receiving the second selection input, receiving, via the one or more input devices a second set of one or more editing inputs; and
in response to receiving the second set of one or more editing inputs:
in accordance with a determination that the second selection input was directed to the second field, editing content of the second field and not the first field based on the second set of one or more editing inputs; and
in accordance with a determination that second selection input was directed to the first field, editing the content of the first field and the second field based on the second set of one or more editing inputs.

22. The electronic device of claim 21, wherein the first field is an hours field for defining an hours value for the editable time input element, and the second field is a minutes field for defining a minutes value for the editable time input element.

23. The electronic device of claim 21, the one or more programs further including instructions for:
while displaying the editable time input element, receiving, via the one or more input devices, an input directed to the first field, wherein the input includes a first movement; and
in response to receiving the input directed to the first field, changing the content of the first field based on the first movement without changing content of the second field.

24. The electronic device of claim 23, wherein changing the content of the first field includes scrolling through a plurality of candidate values for the first field with inertia based on the first movement, including scrolling through the plurality of candidate values for the first field after detecting an end of the first movement.

25. The electronic device of claim 23, wherein the first field is an hours field for defining an hours value for the editable time input element, changing the content of the first field includes scrolling through a plurality of candidate hours values for the first field, and the plurality of candidate hours values correspond to predefined hours increments.

26. The electronic device of claim 23, wherein changing the content of the first field includes scrolling through a plurality of candidate values for the first field, the one or more programs further including instructions for:
generating one or more tactile outputs corresponding to the scrolling through the plurality of candidate values for the first field based on the first movement.

27. The electronic device of claim 21, the one or more programs further including instructions for:
while displaying the editable time input element, receiving, via the one or more input devices, an input directed to the second field, wherein the input includes a first movement; and
in response to receiving the input directed to the second field, changing content of the second field based on the first movement without changing the content of the first field.

28. The electronic device of claim 27, wherein changing the content of the second field includes scrolling through a plurality of candidate values for the second field with inertia based on the first movement, including scrolling through the plurality of candidate values for the second field after detecting an end of the first movement.

29. The electronic device of claim 27, wherein the second field is a minutes field for defining a minutes value for the editable time input element, changing the content of the second field includes scrolling through a plurality of candidate minutes values for the second field, and the plurality of candidate minutes values correspond to predefined increments of time that are greater than one minute.

30. The electronic device of claim 29, wherein the second field included a respective minutes value when the input including the first movement was detected, scrolling through the plurality of candidate minutes values for the second field includes scrolling through the plurality of candidate minutes values and the respective minutes value for the second field, and the respective minutes value does not correspond to one of the candidate minutes values corresponding to the predefined increments of time.

31. The electronic device of claim 27, wherein changing the content of the second field includes scrolling through a plurality of candidate values for the second field, the one or more programs further including instructions for:
generating one or more tactile outputs corresponding to the scrolling through the plurality of candidate values for the second field based on the first movement.

32. The electronic device of claim 21, wherein:
the first type of input is a double tap input, and the second type of input is a single tap input.

33. The electronic device of claim 21, the one or more programs further including instructions for:
displaying, via the display generation component, the editable time input element and an editable date input element, wherein the editable date input element is for defining a respective date associated with the editable time input element, and the editable date input element includes a first group of a plurality of candidate date values for the editable date input element that are selectable to define the respective date associated with the editable time input element.

34. The electronic device of claim 33, the one or more programs further including instructions for:
while displaying the editable time input element and the editable date input element, receiving, via the one or more input devices, an input directed to the editable date input element; and
in response to receiving the input directed to the editable date input element:
in accordance with a determination that the input directed to the editable date input element includes movement in a first direction, scrolling through the editable date input element to display, in the editable date input element, a second group of a plurality of candidate date values for the editable date input element; and
in accordance with a determination that the input directed to the editable date input element includes movement in a second direction, different from the first direction, scrolling through the editable date input element to display, in the editable date input element, a third group, different from the second group, of a plurality of candidate date values for the editable date input element.

35. The electronic device of claim 33, wherein the editable date input element includes a selectable option, the one or more programs further including instructions for:
receiving, via the one or more input devices, an input selecting the selectable option; and
in response to receiving the input selecting the selectable option, displaying, via the display generation component:
a first element that is scrollable to define a month of the respective date of the editable date input element; and
a second element that is scrollable to define a year of the respective date of the editable date input element.

36. The electronic device of claim 21, wherein the editable time input element is displayed in a user interface, the one or more programs further including instructions for:
in response to receiving the selection input directed to the editable time input element, displaying, via the display generation component, a virtual keyboard overlaid on the user interface, wherein the first set of one or more editing inputs are directed to the virtual keyboard.

37. The electronic device of claim 21, wherein the editable time input element is displayed without displaying an editable date input element.

38. The electronic device of claim 21, wherein the editable time input element includes an editable am/pm input element, separate from the first field and the second field, for defining an am/pm value associated with the editable time input element.

39. The electronic device of claim 21, wherein before receiving the selection input, the first field of the editable time input element is displayed with a visual characteristic having a first value, the one or more programs further including instructions for:
in response to receiving the selection input:
in accordance with the determination that the selection input was the first type of input, displaying the first field of the editable time input element with the visual characteristic having a second value, different from the first value, without displaying the second field of the editable time input element with the visual characteristic having the second value.

40. The electronic device of claim 21, wherein before receiving the selection input, the first field and the second field of the editable time input element are displayed with a visual characteristic having a first value, the one or more programs further including instructions for:
in response to receiving the selection input:
in accordance with the determination that the selection input was the second type of input, displaying the first field and the second field of the editable time input element with the visual characteristic having a second value, different from the first value.

41. A non-transitory computer readable storage medium storing one or more programs, the one or more programs comprising instructions, which when executed by one or more processors of an electronic device, cause the electronic device to perform a method comprising:
displaying, via a display generation component, an editable time input element, wherein the editable time input element includes a first field and a second field;
while displaying the editable time input element and while the first field and the second field are not selected for input, receiving, via one or more input devices, a selection input directed to the first field;
after receiving the selection input, receiving a first set of one or more editing inputs; and
in response to receiving the first set of one or more editing inputs:
in accordance with a determination that the selection input was a first type of input, editing content of the first field and not the second field based on the first set of one or more editing inputs; and
in accordance with a determination that the selection input was a second type of input, different from the first type, editing content of the first field and the second field based on the first set of one or more editing inputs;
after editing content of the first field and while displaying the editable time input element with the first field selected for input and the second field not selected for input:
receiving, via the one or more input devices, a second selection input directed to the editable time input element, wherein the second selection input is the second type of input; and
after receiving the second selection input, receiving, via the one or more input devices a second set of one or more editing inputs; and
in response to receiving the second set of one or more editing inputs:
in accordance with a determination that the second selection input was directed to the second field, editing content of the second field and not the first field based on the second set of one or more editing inputs; and
in accordance with a determination that second selection input was directed to the first field, editing the content of the first field and the second field based on the second set of one or more editing inputs.

42. The non-transitory computer readable storage medium of claim 41, wherein the first field is an hours field for defining an hours value for the editable time input element, and the second field is a minutes field for defining a minutes value for the editable time input element.

43. The non-transitory computer readable storage medium of claim 41, the method further comprising:
while displaying the editable time input element, receiving, via the one or more input devices, an input directed to the first field, wherein the input includes a first movement; and
in response to receiving the input directed to the first field, changing the content of the first field based on the first movement without changing content of the second field.

44. The non-transitory computer readable storage medium of claim 43, wherein changing the content of the first field includes scrolling through a plurality of candidate values for the first field with inertia based on the first movement, including scrolling through the plurality of candidate values for the first field after detecting an end of the first movement.

45. The non-transitory computer readable storage medium of claim 43, wherein the first field is an hours field for defining an hours value for the editable time input element, changing the content of the first field includes scrolling through a plurality of candidate hours values for the first field, and the plurality of candidate hours values correspond to predefined hours increments.

46. The non-transitory computer readable storage medium of claim 43, wherein changing the content of the first field includes scrolling through a plurality of candidate values for the first field, the method further comprising:
generating one or more tactile outputs corresponding to the scrolling through the plurality of candidate values for the first field based on the first movement.

47. The non-transitory computer readable storage medium of claim 41, method further comprising:
while displaying the editable time input element, receiving, via the one or more input devices, an input directed to the second field, wherein the input includes a first movement; and
in response to receiving the input directed to the second field, changing content of the second field based on the first movement without changing the content of the first field.

48. The non-transitory computer readable storage medium of claim 47, wherein changing the content of the second field includes scrolling through a plurality of candidate values for the second field with inertia based on the first movement, including scrolling through the plurality of candidate values for the second field after detecting an end of the first movement.

49. The non-transitory computer readable storage medium of claim 47, wherein the second field is a minutes field for defining a minutes value for the editable time input element, changing the content of the second field includes scrolling through a plurality of candidate minutes values for the second field, and the plurality of candidate minutes values correspond to predefined increments of time that are greater than one minute.

50. The non-transitory computer readable storage medium of claim 49, wherein the second field included a respective minutes value when the input including the first movement was detected, scrolling through the plurality of candidate minutes values for the second field includes scrolling through the plurality of candidate minutes values and the respective minutes value for the second field, and the respective minutes value does not correspond to one of the candidate minutes values corresponding to the predefined increments of time.

51. The non-transitory computer readable storage medium of claim 47, wherein changing the content of the second field includes scrolling through a plurality of candidate values for the second field, the method further comprising:
generating one or more tactile outputs corresponding to the scrolling through the plurality of candidate values for the second field based on the first movement.

52. The non-transitory computer readable storage medium of claim 41, wherein:
the first type of input is a double tap input, and the second type of input is a single tap input.

53. The non-transitory computer readable storage medium of claim 41, the method further comprising:
displaying, via the display generation component, the editable time input element and an editable date input element, wherein the editable date input element is for defining a respective date associated with the editable time input element, and the editable date input element includes a first group of a plurality of candidate date values for the editable date input element that are selectable to define the respective date associated with the editable time input element.

54. The non-transitory computer readable storage medium of claim 53, the method further comprising:
while displaying the editable time input element and the editable date input element, receiving, via the one or more input devices, an input directed to the editable date input element; and
in response to receiving the input directed to the editable date input element:
in accordance with a determination that the input directed to the editable date input element includes movement in a first direction, scrolling through the editable date input element to display, in the editable date input element, a second group of a plurality of candidate date values for the editable date input element; and
in accordance with a determination that the input directed to the editable date input element includes movement in a second direction, different from the first direction, scrolling through the editable date input element to display, in the editable date input element, a third group, different from the second group, of a plurality of candidate date values for the editable date input element.

55. The non-transitory computer readable storage medium of claim 41, wherein the editable date input element includes a selectable option, the method further comprising:
receiving, via the one or more input devices, an input selecting the selectable option; and
in response to receiving the input selecting the selectable option, displaying, via the display generation component:
a first element that is scrollable to define a month of the respective date of the editable date input element; and
a second element that is scrollable to define a year of the respective date of the editable date input element.

56. The non-transitory computer readable storage medium of claim 41, wherein the editable time input element is displayed in a user interface, the method further comprising:
in response to receiving the selection input directed to the editable time input element, displaying, via the display generation component, a virtual keyboard overlaid on the user interface, wherein the first set of one or more editing inputs are directed to the virtual keyboard.

57. The non-transitory computer readable storage medium of claim 41, wherein the editable time input element is displayed without displaying an editable date input element.

58. The non-transitory computer readable storage medium of claim 41, wherein the editable time input element includes an editable am/pm input element, separate from the first field and the second field, for defining an am/pm value associated with the editable time input element.

59. The non-transitory computer readable storage medium of claim 41, wherein before receiving the selection input, the first field of the editable time input element is displayed with a visual characteristic having a first value, the method further comprising:
in response to receiving the selection input:
in accordance with the determination that the selection input was the first type of input, displaying the first field of the editable time input element with the visual characteristic having a second value, different from the first value, without displaying the second field of the editable time input element with the visual characteristic having the second value.

60. The non-transitory computer readable storage medium of claim 41, wherein before receiving the selection input, the first field and the second field of the editable time input element are displayed with a visual characteristic having a first value, the method further comprising:
in response to receiving the selection input:
in accordance with the determination that the selection input was the second type of input, displaying the first field and the second field of the editable time input element with the visual characteristic having a second value, different from the first value.

* * * * *

UNITED STATES PATENT AND TRADEMARK OFFICE
CERTIFICATE OF CORRECTION

| | | |
|---|---|---|
| PATENT NO. | : 11,995,615 B2 | Page 1 of 1 |
| APPLICATION NO. | : 17/352145 | |
| DATED | : May 28, 2024 | |
| INVENTOR(S) | : Grant R. Paul et al. | |

It is certified that error appears in the above-identified patent and that said Letters Patent is hereby corrected as shown below:

In the Claims

In Column 70, Line 4, in Claim 55, please remove "claim 41," and insert --claim 53,--.

Signed and Sealed this
Thirtieth Day of September, 2025

John A. Squires
*Director of the United States Patent and Trademark Office*